US011861315B2

(12) United States Patent
Sethi et al.

(10) Patent No.: US 11,861,315 B2
(45) Date of Patent: Jan. 2, 2024

(54) CONTINUOUS LEARNING FOR NATURAL-LANGUAGE UNDERSTANDING MODELS FOR ASSISTANT SYSTEMS

(71) Applicant: Meta Platforms, Inc., Menlo Park, CA (US)

(72) Inventors: Pooja Sethi, Kent, WA (US); Denis Savenkov, Redmond, WA (US); Yue Liu, Belmont, MA (US); Alexander Kolmykov-Zotov, Sammamish, WA (US); Ahmed Aly, Kenmore, WA (US)

(73) Assignee: Meta Platforms, Inc., Menlo Park, CA (US)

( * ) Notice: Subject to any disclaimer, the term of this patent is extended or adjusted under 35 U.S.C. 154(b) by 343 days.

(21) Appl. No.: 17/351,501

(22) Filed: Jun. 18, 2021

(65) Prior Publication Data

US 2022/0374605 A1 Nov. 24, 2022

Related U.S. Application Data

(60) Provisional application No. 63/177,812, filed on Apr. 21, 2021.

(51) Int. Cl.
*G06F 17/00* (2019.01)
*G06F 40/30* (2020.01)
(Continued)

(52) U.S. Cl.
CPC ............ *G06F 40/30* (2020.01); *G06F 1/3206* (2013.01); *G06F 3/011* (2013.01);
(Continued)

(58) Field of Classification Search
USPC .......................................................... 704/9
See application file for complete search history.

(56) References Cited

U.S. PATENT DOCUMENTS 5,926,537 A 7/1999 Birze
6,014,439 A 1/2000 Walker et al.
(Continued)

FOREIGN PATENT DOCUMENTS

CA       3142624 A1 * 12/2020 ......... G06F 16/3329
WO   WO 2012/116241      8/2012
WO      2017027339 A1     2/2017

OTHER PUBLICATIONS

Huang J., et al., "An Augmented Reality Sign-Reading Assistant for Users with Reduced Vision," PLOS ONE, vol. 14, No. 1, Jan. 16, 2019, 9 pages.
(Continued)

*Primary Examiner* — Satwant K Singh
(74) *Attorney, Agent, or Firm* — Baker Botts L.L.P.

(57) ABSTRACT

In one embodiment, a method includes receiving a user request to automatically debug a natural-language understanding (NLU) model, accessing a plurality of predicted semantic representations generated by the NLU model, wherein the plurality of predicted semantic representations are associated with a plurality of dialog sessions, respectively, wherein each dialog session is between a user and an assistant xbot associated with the NLU model, generating a plurality of expected semantic representations associated with the plurality of dialog sessions based on an auto-correction model, wherein the auto-correction model is learned from dialog training samples generated based on active learning, identifying incorrect semantic representations of the predicted semantic representations based on a comparison between the predicted semantic representations and the expected semantic representations, and automatically correcting the incorrect semantic representations by replacing them with respective expected semantic representations generated by the auto-correction model.

19 Claims, 9 Drawing Sheets

(51) Int. Cl.
*G06F 1/3206* (2019.01)
*G06F 3/01* (2006.01)
*G06F 3/04815* (2022.01)
*G06N 5/02* (2023.01)
*G06N 5/046* (2023.01)
*G06T 19/00* (2011.01)
*G06T 19/20* (2011.01)

(52) U.S. Cl.
CPC ........... *G06F 3/04815* (2013.01); *G06N 5/02* (2013.01); *G06N 5/046* (2013.01); *G06T 19/006* (2013.01); *G06T 19/20* (2013.01); *G06T 2219/2004* (2013.01)

(56) References Cited

U.S. PATENT DOCUMENTS

| | | |
|---|---|---|
| 6,504,571 B1 | 1/2003 | Narayanaswami et al. |
| 7,124,123 B1 | 10/2006 | Roskind |
| 7,158,678 B2 | 1/2007 | Nagel |
| 7,397,912 B2 | 7/2008 | Aasman |
| 7,613,287 B1 | 11/2009 | Stifelman et al. |
| 7,889,853 B2 | 2/2011 | Sutcliffe |
| 8,027,451 B2 | 9/2011 | Arendsen |
| 8,204,200 B2 | 6/2012 | Wang et al. |
| 8,560,564 B1 | 10/2013 | Hoelzle |
| 8,660,247 B1 | 2/2014 | Brown |
| 8,677,377 B2 | 3/2014 | Cheyer |
| 8,935,192 B1 | 1/2015 | Ventilla |
| 8,983,383 B1 | 3/2015 | Haskin |
| 9,154,739 B1 | 10/2015 | Nicolaou |
| 9,251,471 B2 | 2/2016 | Pinckney et al. |
| 9,299,059 B1 | 3/2016 | Marra |
| 9,304,736 B1 | 4/2016 | Whiteley |
| 9,338,242 B1 | 5/2016 | Suchland |
| 9,338,493 B2 | 5/2016 | Van Os |
| 9,390,724 B2 | 7/2016 | List |
| 9,418,658 B1 | 8/2016 | David |
| 9,472,206 B2 | 10/2016 | Ady |
| 9,479,931 B2 | 10/2016 | Ortiz |
| 9,576,574 B2 | 2/2017 | van Os |
| 9,639,608 B2 | 5/2017 | Freeman |
| 9,659,577 B1 | 5/2017 | Langhammer |
| 9,720,955 B1 | 8/2017 | Cao |
| 9,747,895 B1 | 8/2017 | Jansche |
| 9,792,281 B2 | 10/2017 | Sarikaya |
| 9,858,925 B2 | 1/2018 | Gruber |
| 9,865,260 B1 | 1/2018 | Vuskovic |
| 9,875,233 B1 | 1/2018 | Tomkins |
| 9,875,741 B2 | 1/2018 | Gelfenbeyn |
| 9,881,077 B1 | 1/2018 | Alfonseca |
| 9,886,953 B2 | 2/2018 | Lemay |
| 9,990,591 B2 | 6/2018 | Gelfenbeyn |
| 10,042,032 B2 | 8/2018 | Scott |
| 10,127,220 B2 | 11/2018 | Bellegarda |
| 10,134,395 B2 | 11/2018 | Typrin |
| 10,199,051 B2 | 2/2019 | Binder |
| 10,241,752 B2 | 3/2019 | Lemay |
| 10,276,170 B2 | 4/2019 | Gruber |
| 10,311,833 B1 | 6/2019 | Qiu et al. |
| 10,453,454 B2 * | 10/2019 | Homma .................. G10L 15/30 |
| 10,462,422 B1 | 10/2019 | Harrison |
| 10,511,808 B2 | 10/2019 | Harrison |
| 10,521,185 B1 | 12/2019 | Kim et al. |
| 10,623,897 B1 | 4/2020 | Wu et al. |
| 10,685,669 B1 | 6/2020 | An et al. |
| 10,719,786 B1 | 7/2020 | Treseler et al. |
| 10,782,986 B2 | 9/2020 | Martin |
| 10,841,249 B2 | 11/2020 | Lim |
| 10,854,206 B1 | 12/2020 | Liu et al. |
| 10,878,805 B2 * | 12/2020 | Agarwal ............. G06F 16/3349 |
| 10,885,819 B1 | 1/2021 | Verbeke et al. |
| 10,896,295 B1 | 1/2021 | Shenoy |
| 10,949,616 B1 | 3/2021 | Shenoy et al. |
| 10,958,599 B1 | 3/2021 | Penov et al. |
| 10,977,258 B1 | 4/2021 | Liu et al. |
| 10,978,056 B1 * | 4/2021 | Challa .................... G06N 5/025 |
| 11,003,669 B1 | 5/2021 | Nelson et al. |
| 11,038,974 B1 | 6/2021 | Koukoumidis et al. |
| 11,042,554 B1 * | 6/2021 | Balakrishnan ........ H04L 67/535 |
| 11,086,858 B1 | 8/2021 | Koukoumidis et al. |
| 11,222,627 B1 * | 1/2022 | Qian .................... G10L 15/1822 |
| 11,308,284 B2 | 4/2022 | Huang et al. |
| 11,416,556 B2 * | 8/2022 | Misra ................. G06F 16/90332 |
| 11,437,027 B1 * | 9/2022 | Guo .......... G06F 40/30 |
| 2008/0240379 A1 | 10/2008 | Maislos |
| 2008/0300884 A1 | 12/2008 | Smith |
| 2009/0282033 A1 | 11/2009 | Alshawi |
| 2011/0246383 A1 | 10/2011 | Gibson |
| 2012/0245944 A1 | 9/2012 | Gruber |
| 2012/0246191 A1 | 9/2012 | Xiong |
| 2012/0265528 A1 | 10/2012 | Gruber |
| 2012/0311126 A1 | 12/2012 | Jadallah |
| 2013/0035930 A1 | 2/2013 | Ferrucci |
| 2013/0268839 A1 | 10/2013 | Lefebvre |
| 2013/0275138 A1 | 10/2013 | Gruber |
| 2013/0275164 A1 | 10/2013 | Gruber |
| 2013/0278634 A1 | 10/2013 | Xu et al. |
| 2014/0012926 A1 | 1/2014 | Narayanan et al. |
| 2014/0032659 A1 | 1/2014 | Marini et al. |
| 2014/0074483 A1 | 3/2014 | Van Os |
| 2014/0129266 A1 | 5/2014 | Perl et al. |
| 2014/0164506 A1 | 6/2014 | Tesch |
| 2014/0225918 A1 | 8/2014 | Mittal et al. |
| 2014/0244712 A1 | 8/2014 | Walters |
| 2014/0278343 A1 | 9/2014 | Tran |
| 2014/0280017 A1 | 9/2014 | Indarapu |
| 2014/0280302 A1 | 9/2014 | Morsi et al. |
| 2014/0297284 A1 | 10/2014 | Gruber |
| 2015/0081674 A1 | 3/2015 | Ali |
| 2015/0134430 A1 | 5/2015 | Ellis et al. |
| 2015/0142420 A1 | 5/2015 | Sarikaya |
| 2015/0142704 A1 | 5/2015 | London |
| 2015/0169284 A1 | 6/2015 | Quast |
| 2015/0169744 A1 | 6/2015 | Walkingshaw |
| 2015/0179168 A1 | 6/2015 | Hakkani-Tur |
| 2015/0186156 A1 | 7/2015 | Brown |
| 2015/0207765 A1 | 7/2015 | Brantingham |
| 2015/0220888 A1 | 8/2015 | Iyer |
| 2015/0235447 A1 | 8/2015 | Abovitz et al. |
| 2015/0347375 A1 | 12/2015 | Tremblay |
| 2016/0019290 A1 | 1/2016 | Ratnaparkhi |
| 2016/0037311 A1 | 2/2016 | Cho |
| 2016/0063118 A1 | 3/2016 | Campbell et al. |
| 2016/0179462 A1 | 6/2016 | Bjorkengren |
| 2016/0196491 A1 | 7/2016 | Chandrasekaran |
| 2016/0225370 A1 | 8/2016 | Kannan |
| 2016/0255082 A1 | 9/2016 | Rathod |
| 2016/0260436 A1 | 9/2016 | Lemay et al. |
| 2016/0306505 A1 | 10/2016 | Vigneras |
| 2016/0308799 A1 | 10/2016 | Schubert |
| 2016/0328096 A1 | 11/2016 | Tran |
| 2016/0378849 A1 | 12/2016 | Myslinski |
| 2016/0378861 A1 | 12/2016 | Eledath |
| 2017/0026318 A1 | 1/2017 | Daniel |
| 2017/0076720 A1 | 3/2017 | Gopalan et al. |
| 2017/0091168 A1 | 3/2017 | Bellegarda |
| 2017/0092264 A1 | 3/2017 | Hakkani-Tur |
| 2017/0132019 A1 | 5/2017 | Karashchuk |
| 2017/0193390 A1 | 7/2017 | Weston |
| 2017/0220119 A1 | 8/2017 | Potts et al. |
| 2017/0286401 A1 | 10/2017 | He et al. |
| 2017/0337742 A1 | 11/2017 | Powderly et al. |
| 2017/0353469 A1 | 12/2017 | Selekman |
| 2017/0358304 A1 | 12/2017 | Castillo Sanchez |
| 2017/0359707 A1 | 12/2017 | Diaconu |
| 2018/0013699 A1 | 1/2018 | Sapoznik |
| 2018/0018562 A1 | 1/2018 | Jung |
| 2018/0018987 A1 | 1/2018 | Zass |
| 2018/0040020 A1 | 2/2018 | Kurian |
| 2018/0045963 A1 | 2/2018 | Hoover et al. |
| 2018/0046861 A1 | 2/2018 | Patel et al. |
| 2018/0052824 A1 | 2/2018 | Ferrydiansyah et al. |
| 2018/0054523 A1 | 2/2018 | Zhang |

(56) References Cited

U.S. PATENT DOCUMENTS

| | | |
|---|---|---|
| 2018/0096071 A1 | 4/2018 | Green |
| 2018/0096072 A1 | 4/2018 | He |
| 2018/0107917 A1 | 4/2018 | Hewavitharana |
| 2018/0121508 A1 | 5/2018 | Halstvedt |
| 2018/0189629 A1 | 7/2018 | Yatziv |
| 2018/0196880 A1 | 7/2018 | Carter |
| 2018/0210874 A1 | 7/2018 | Fuxman |
| 2018/0211665 A1 | 7/2018 | Park et al. |
| 2018/0293484 A1 | 10/2018 | Wang |
| 2018/0308486 A1 | 10/2018 | Saddler et al. |
| 2018/0329998 A1 | 11/2018 | Thomson |
| 2019/0012470 A1 | 1/2019 | Ross et al. |
| 2019/0035152 A1 | 1/2019 | Kazansky |
| 2019/0035390 A1 | 1/2019 | Howard et al. |
| 2019/0066670 A1 | 2/2019 | White et al. |
| 2019/0080698 A1 | 3/2019 | Miller |
| 2019/0082221 A1 | 3/2019 | Jain et al. |
| 2019/0087491 A1 | 3/2019 | Bax |
| 2019/0096129 A1 | 3/2019 | Rhodes et al. |
| 2019/0103108 A1 | 4/2019 | Song et al. |
| 2019/0132265 A1 | 5/2019 | Nowak-Przygodzki et al. |
| 2019/0139150 A1 | 5/2019 | Brownhill |
| 2019/0171943 A1 | 6/2019 | Pao et al. |
| 2019/0180144 A1 | 6/2019 | Tsishkou et al. |
| 2019/0213490 A1 | 7/2019 | White |
| 2019/0311036 A1 | 10/2019 | Shanmugam |
| 2019/0324527 A1 | 10/2019 | Presant |
| 2019/0324553 A1 | 10/2019 | Liu |
| 2019/0324780 A1 | 10/2019 | Zhu |
| 2019/0325042 A1 | 10/2019 | Yu |
| 2019/0325080 A1 | 10/2019 | Natarajan |
| 2019/0325081 A1 | 10/2019 | Liu |
| 2019/0325084 A1 | 10/2019 | Peng |
| 2019/0325864 A1 | 10/2019 | Anders et al. |
| 2019/0327330 A1 | 10/2019 | Natarajan |
| 2019/0327331 A1 | 10/2019 | Natarajan |
| 2019/0347837 A1 | 11/2019 | Donalek et al. |
| 2019/0348033 A1 | 11/2019 | Chen |
| 2019/0361408 A1 | 11/2019 | Tokuchi |
| 2020/0027427 A1 | 1/2020 | Allen et al. |
| 2020/0211546 A1 | 7/2020 | Schairer et al. |
| 2020/0213663 A1 | 7/2020 | Okamoto |
| 2020/0228692 A1 | 7/2020 | Wakamatsu et al. |
| 2020/0314330 A1 | 10/2020 | Takayama |
| 2020/0394843 A1 | 12/2020 | Ramachandra Iyer |
| 2020/0409457 A1 | 12/2020 | Terrano et al. |
| 2020/0410012 A1 | 12/2020 | Moon et al. |
| 2021/0048883 A1 | 2/2021 | Kelly et al. |
| 2021/0082403 A1* | 3/2021 | Agarwal ............. G06F 16/3349 |
| 2021/0117479 A1 | 4/2021 | Liu et al. |
| 2021/0117623 A1 | 4/2021 | Aly et al. |
| 2021/0117780 A1 | 4/2021 | Malik et al. |
| 2021/0118440 A1 | 4/2021 | Peng et al. |
| 2021/0118442 A1 | 4/2021 | Poddar et al. |
| 2021/0120206 A1 | 4/2021 | Liu et al. |
| 2021/0247846 A1 | 8/2021 | Shriram et al. |

OTHER PUBLICATIONS

International Search Report and Written Opinion for International Application No. PCT/US2022/024163, dated Oct. 10, 2022, 9 pages.

Khan M.D., et al., "An AI-Based Visual Aid With Integrated Reading Assistant for the Completely Blind," IEEE TRAl'ISACTIONS On Human-Machine Systems, vol. 50, No. 6, Dec. 2020, pp. 507-517.

Pintado D., et al., "Deep Learning Based Shopping Assistant for the Visually Impaired," IEEE International Conference Onconsumer Electronics (ICCE), Jan. 11, 2019, 6 pages.

Co-pending U.S. Appl. No. 16/168,536, inventors Dumoulin; Benoit F. et al., filed Oct. 23, 2018.

Co-pending U.S. Appl. No. 16/742,668, inventors Xiaohu; Liu et al., filed Jan. 14, 2020.

Co-pending U.S. Appl. No. 17/391,765, inventors Pu; Yiming et al., filed Aug. 2, 2021.

Co-pending U.S. Appl. No. 17/394,096, inventors Wang; Emily et al., filed Aug. 4, 2021.

Co-pending U.S. Appl. No. 17/394,159, inventors Santoro; Elizabeth Kelsey et al., filed Aug. 4, 2021.

Co-pending U.S. Appl. No. 17/407,922, inventors Pu; Yiming et al., filed Aug. 20, 2021.

Co-pending U.S. Appl. No. 17/504,276, inventors Kottur; Satwik et al., filed Oct. 18, 2021.

Co-pending U.S. Appl. No. 17/512,478, inventors Chen; Zhiyu et al., filed Oct. 27, 2021.

Co-pending U.S. Appl. No. 17/512,490, inventors Presant; William Crosby et al., filed Oct. 27, 2021.

Co-pending U.S. Appl. No. 17/512,508, inventors Vincent; Joshuah et al., filed Oct. 27, 2021.

Co-pending U.S. Appl. No. 17/521,623, inventors Martinson; Leif Haven et al., filed Nov. 8, 2021.

Co-pending U.S. Appl. No. 17/524,598, inventors Hanson; Michael Robert et al., filed Nov. 11, 2021.

Co-pending U.S. Appl. No. 17/525,510, inventors Shrivastava; Akshat et al., filed Nov. 12, 2021.

Co-pending U.S. Appl. No. 17/543,178, inventors Desai; Shrey et al., filed Dec. 6, 2021.

Co-pending U.S. Appl. No. 17/566,467, inventors Goel; Swati et al., filed Dec. 30, 2021.

Co-pending U.S. Appl. No. 17/725,540, inventors Surkov; Alexey Gennadyevich et al., filed Apr. 20, 2022.

Co-pending U.S. Appl. No. 17/732,104, inventors Bi; Sheng et al., filed Apr. 28, 2022.

Co-Pending U.S. Appl. No. 15/953,957, filed Apr. 16, 2018, 117 pages.

International Search Report and Written Opinion for International Application No. PCT/US2022/025653, dated Jul. 21, 2022, 11 pages.

International Search Report and Written Opinion for International Application No. PCT/US2022/025675, dated Jul. 22, 2022, 14 pages.

International Search Report and Written Opinion for International Application No. PCT/US2022/025844, dated Jul. 25, 2022, 14 pages.

U.S. Appl. No. 15/953,957, filed Apr. 16, 2018, Kemal El Moujahid.
U.S. Appl. No. 15/967,193, filed Apr. 30, 2018, Davide Testuggine.
U.S. Appl. No. 15/967,279, filed Apr. 30, 2018, Fuchun Peng.
U.S. Appl. No. 16/025,317, filed Jul. 2, 2018, Sonal Gupta.
U.S. Appl. No. 16/036,827, filed Jul. 16, 2018, Emmanouil Koukoumidis.
U.S. Appl. No. 16/038,120, filed Jul. 17, 2018, Jason Schissel.
U.S. Appl. No. 16/048,049, filed Jul. 27, 2018, Markku Salkola.
U.S. Appl. No. 16/048,072, filed Jul. 27, 2018, Markku Salkola.
U.S. Appl. No. 16/048,101, filed Jul. 27, 2018, Markku Salkola.
U.S. Appl. No. 16/057,414, filed Aug. 7, 2018, Jeremy Gillmor Kahn.
U.S. Appl. No. 16/103,775, filed Aug. 14, 2018, Zheng Zhou.
U.S. Appl. No. 16/107,601, filed Aug. 21, 2018, Rajesh Krishna Shenoy.
U.S. Appl. No. 16/107,847, filed Aug. 21, 2018, Rajesh Krishna Shenoy.
U.S. Appl. No. 16/121,393, filed Sep. 4, 2018, Zheng Zhou.
U.S. Appl. No. 16/127,173, filed Sep. 10, 2018, Zheng Zhou.
U.S. Appl. No. 16/129,638, filed Sep. 12, 2018, Vivek Natarajan.
U.S. Appl. No. 16/135,752, filed Sep. 19, 2018, Xiaohu Liu.
U.S. Appl. No. 16/150,184, filed Oct. 2, 2018, Francislav P. Penov.
U.S. Appl. No. 16/151,040, filed Oct. 3, 2018, Brian Nelson.
U.S. Appl. No. 16/168,536, filed Oct. 23, 2018, Benoit F. Dumoulin.
U.S. Appl. No. 16/176,081, filed Oct. 31, 2018, Anusha Balakrishnan.
U.S. Appl. No. 16/176,312, filed Oct. 31, 2018, Emmanouil Koukoumidis.
U.S. Appl. No. 16/182,542, filed Nov. 6, 2018, Michael Robert Hanson.
U.S. Appl. No. 16/183,650, filed Nov. 7, 2018, Xiaohu Liu.
U.S. Appl. No. 16/192,538, filed Nov. 15, 2018, Emmanouil Koukoumidis.

(56) References Cited

OTHER PUBLICATIONS

U.S. Appl. No. 16/222,923, filed Dec. 17, 2018, Jason Schissel.
U.S. Appl. No. 16/222,957, filed Dec. 17, 2018, Emmanouil Koukoumidis.
U.S. Appl. No. 16/229,828, filed Dec. 21, 2018, Xiaohu Liu.
U.S. Appl. No. 16/247,439, filed Jan. 14, 2019, Xiaohu Liu.
U.S. Appl. No. 16/264,173, filed Jan. 31, 2019, Ashwini Challa.
U.S. Appl. No. 16/376,832, filed Apr. 5, 2019, Honglei Liu.
U.S. Appl. No. 16/389,769, filed Apr. 19, 2019, Honglei Liu.
U.S. Appl. No. 16/389,634, filed Apr. 19, 2019, Paul Anthony Crook.
U.S. Appl. No. 16/389,738, filed Apr. 19, 2019, Fuchun Peng.
U.S. Appl. No. 16/389,728, filed Apr. 19, 2019, William Crosby Presant.
U.S. Appl. No. 16/434,010, filed Jun. 6, 2019, Sergiu Dogaru.
U.S. Appl. No. 16/552,559, filed Aug. 27, 2019, Seungwhan Moon.
U.S. Appl. No. 16/557,055, filed Aug. 30, 2019, Seungwhan Moon.
U.S. Appl. No. 16/659,070, filed Oct. 21, 2019, Lisa Xiaoyi Huang.
U.S. Appl. No. 16/659,203, filed Oct. 21, 2019, Lisa Xiaoyi Huang.
U.S. Appl. No. 16/659,363, filed Oct. 21, 2019, Lisa Xiaoyi Huang.
U.S. Appl. No. 16/659,419, filed Oct. 21, 2019, Lisa Xiaoyi Huang.
U.S. Appl. No. 16/703,700, filed Dec. 4, 2019, Ahmed Aly.
U.S. Appl. No. 16/733,044, filed Jan. 2, 2020, Francislav P. Penov.
U.S. Appl. No. 16/741,630, filed Jan. 13, 2020, Paul Anthony Crook.
U.S. Appl. No. 16/741,642, filed Jan. 13, 2020, Fuchun Peng.
U.S. Appl. No. 16/742,769, filed Jan. 14, 2020, Xiaohu Liu.
U.S. Appl. No. 16/742,668, filed Jan. 14, 2020, Xiaohu Liu.
U.S. Appl. No. 16/790,497, filed Feb. 13, 2020, Yang Gao.
U.S. Appl. No. 16/815,960, filed Mar. 11, 2020, Malik.
U.S. Appl. No. 16/815,990, filed Mar. 11, 2020, Malik.
U.S. Appl. No. 16/842,366, filed Apr. 7, 2020, Kamisetty.
U.S. Appl. No. 16/847,155, filed Apr. 13, 2020, Xiaohu Liu.
U.S. Appl. No. 16/914,966, filed Jun. 29, 2020, Noam Yakob Behar.
U.S. Appl. No. 16/917,664, filed Jun. 30, 2020, Xiaohu Liu.
U.S. Appl. No. 16/921,665, filed Jul. 6, 2020, Honglei Liu.
U.S. Appl. No. 16/998,423, filed Aug. 20, 2020, Armen Aghajanyan.
U.S. Appl. No. 17/006,377, filed Aug. 28, 2020, Shivani Poddar.
U.S. Appl. No. 17/006,339, filed Aug. 28, 2020, Shivani Poddar.
U.S. Appl. No. 17/006,260, filed Aug. 28, 2020, William Crosby Presant.
U.S. Appl. No. 17/009,542, filed Sep. 1, 2020, Satwik Kottur.
U.S. Appl. No. 17/035,253, filed Sep. 28, 2020, Piyush Khemka.
U.S. Appl. No. 17/120,013, filed Dec. 11, 2020, Fadi Botros.
U.S. Appl. No. 17/136,636, filed Dec. 29, 2020, Michael Greenberg.
U.S. Appl. No. 17/139,363, filed Dec. 31, 2020, Daniel Manhon Cheng.
U.S. Appl. No. 17/186,459, filed Feb. 26, 2021, Bing Liu.
U.S. Appl. No. 17/336,716, filed Jun. 2, 2021, Christophe Chaland.
U.S. Appl. No. 62/660,876, filed Apr. 20, 2018, Anuj Kumar.
U.S. Appl. No. 62/675,090, filed May 22, 2018, Michael Robert Hanson.
U.S. Appl. No. 62/747,628, filed Oct. 18, 2018, Honglei Lui.
U.S. Appl. No. 62/749,608, filed Oct. 23, 2018, Ashwini Challa.
U.S. Appl. No. 62/750,746, filed Oct. 25, 2018, Honglei Liu.
U.S. Appl. No. 62/923,342, filed Oct. 18, 2019, Michael Robert Hanson.

* cited by examiner

CONTINUOUS LEARNING FOR NATURAL-LANGUAGE UNDERSTANDING MODELS FOR ASSISTANT SYSTEMS

PRIORITY

This application claims the benefit under 35 U.S.C. § 119(e) of U.S. Provisional Patent Application No. 63/177,812, filed 21 Apr. 2021, which is incorporated herein by reference.

TECHNICAL FIELD

This disclosure generally relates to databases and file management within network environments, and in particular relates to hardware and software for smart assistant systems.

BACKGROUND

An assistant system can provide information or services on behalf of a user based on a combination of user input, location awareness, and the ability to access information from a variety of online sources (such as weather conditions, traffic congestion, news, stock prices, user schedules, retail prices, etc.). The user input may include text (e.g., online chat), especially in an instant messaging application or other applications, voice, images, motion, or a combination of them. The assistant system may perform concierge-type services (e.g., making dinner reservations, purchasing event tickets, making travel arrangements) or provide information based on the user input. The assistant system may also perform management or data-handling tasks based on online information and events without user initiation or interaction. Examples of those tasks that may be performed by an assistant system may include schedule management (e.g., sending an alert to a dinner date that a user is running late due to traffic conditions, update schedules for both parties, and change the restaurant reservation time). The assistant system may be enabled by the combination of computing devices, application programming interfaces (APIs), and the proliferation of applications on user devices.

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g. profile/news feed posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

SUMMARY OF PARTICULAR EMBODIMENTS

In particular embodiments, the assistant system may assist a user to obtain information or services. The assistant system may enable the user to interact with the assistant system via user inputs of various modalities (e.g., audio, voice, text, image, video, gesture, motion, location, orientation) in stateful and multi-turn conversations to receive assistance from the assistant system. As an example and not by way of limitation, the assistant system may support mono-modal inputs (e.g., only voice inputs), multi-modal inputs (e.g., voice inputs and text inputs), hybrid/multi-modal inputs, or any combination thereof. User inputs provided by a user may be associated with particular assistant-related tasks, and may include, for example, user requests (e.g., verbal requests for information or performance of an action), user interactions with an assistant application associated with the assistant system (e.g., selection of UI elements via touch or gesture), or any other type of suitable user input that may be detected and understood by the assistant system (e.g., user movements detected by the client device of the user). The assistant system may create and store a user profile comprising both personal and contextual information associated with the user. In particular embodiments, the assistant system may analyze the user input using natural-language understanding (NLU). The analysis may be based on the user profile of the user for more personalized and context-aware understanding. The assistant system may resolve entities associated with the user input based on the analysis. In particular embodiments, the assistant system may interact with different agents to obtain information or services that are associated with the resolved entities. The assistant system may generate a response for the user regarding the information or services by using natural-language generation (NLG). Through the interaction with the user, the assistant system may use dialog-management techniques to manage and advance the conversation flow with the user. In particular embodiments, the assistant system may further assist the user to effectively and efficiently digest the obtained information by summarizing the information. The assistant system may also assist the user to be more engaging with an online social network by providing tools that help the user interact with the online social network (e.g., creating posts, comments, messages). The assistant system may additionally assist the user to manage different tasks such as keeping track of events. In particular embodiments, the assistant system may proactively execute, without a user input, tasks that are relevant to user interests and preferences based on the user profile, at a time relevant for the user. In particular embodiments, the assistant system may check privacy settings to ensure that accessing a user's profile or other user information and executing different tasks are permitted subject to the user's privacy settings.

In particular embodiments, the assistant system may assist the user via a hybrid architecture built upon both client-side processes and server-side processes. The client-side processes and the server-side processes may be two parallel workflows for processing a user input and providing assistance to the user. In particular embodiments, the client-side processes may be performed locally on a client system associated with a user. By contrast, the server-side processes may be performed remotely on one or more computing systems. In particular embodiments, an arbitrator on the client system may coordinate receiving user input (e.g., an audio signal), determine whether to use a client-side process, a server-side process, or both, to respond to the user input, and analyze the processing results from each process. The arbitrator may instruct agents on the client-side or server-side to execute tasks associated with the user input based on the aforementioned analyses. The execution results may be further rendered as output to the client system. By leveraging both client-side and server-side processes, the assistant system can effectively assist a user with optimal usage of computing resources while at the same time protecting user privacy and enhancing security.

In particular embodiments, the assistant system may efficiently identify errors from the natural-language understanding (NLU) models used by the assistant system. The assistant system may then correct these errors and retrain the NLU models to improve their quality. The NLU models in the assistant system may generate structured semantic representations (e.g., slots and intents) for user queries and then match user queries to queries in a plurality of training data as a way to generate responses for the user queries. However, sometimes the user queries may not match well with the training data (e.g., because users phrased their queries in unusual or non-grammatical ways or used uncommon terms). Under this situation, the NLU models may not handle these user queries accurately, i.e., generating inaccurate semantic representations, which may further lead to inaccurate responses to the user queries. Conventional approaches to address this issue may be manually identifying these errors and creating new training data incorporating these tail cases (i.e., uncommon cases) and then retraining the NLU models to improve their quality, which may be cumbersome and inefficient. By contrast, the embodiments disclosed herein may use active learning to select live traffic data (e.g., conversations between users and the assistant system) that the NLU models are predicted to fail (i.e., incorrectly identify intents/slots). Active learning refers to a set of algorithms for deciding which unlabeled data to label in order to improve the quality of the NLU models. The selected traffic data may be manually annotated and used to evaluate the NLU models to identify the most important failure cases. The failure cases may be further used to automatically generate new (e.g., synthetic) training data, which may be used to retrain the NLU models to optimize them. Although this disclosure describes optimizing particular NLU models by particular systems in a particular manner, this disclosure contemplates optimizing any suitable model in any suitable manner. As an example and not by way of limitation, such model may comprise any model within the assistant system, e.g., natural-language generation model, entity resolution model, automatic speech recognition model, text-to-speech model, etc.

In particular embodiments, the assistant system may receive a user request to automatically debug a natural-language understanding (NLU) model. Debugging the NLU model may comprise one or more of discovering quality issues or proposing fix of the model. In particular embodiments, the NLU model may comprise a machine-learning model or rules based functionalities. The assistant system may access a plurality of predicted semantic representations generated by the NLU model. In particular embodiments, the plurality of predicted semantic representations may be associated with a plurality of dialog sessions, respectively. Each dialog session may be between a user from a plurality of users and an assistant xbot associated with the NLU model. In particular embodiments, the assistant system may generate, based on an auto-correction model, a plurality of expected semantic representations associated with the plurality of dialog session. The auto-correction model may be learned from a plurality of dialog training samples generated based on active learning. In particular embodiments, the assistant system may then identify, based on a comparison between the predicted semantic representations and the expected semantic representations, one or more incorrect semantic representations of the predicted semantic representations. The assistant system may further automatically correct the one or more incorrect semantic representations by replacing them with one or more respective expected semantic representations generated by the auto-correction model.

Certain technical challenges exist for improving the NLU models. One technical challenge may include improving annotator efficiency by increasing the speed and quality at which we are able to annotate incoming traffic. The solution presented by the embodiments disclosed herein to address this challenge may be active learning as it may determine what utterances are high-signal for NLU quality improvement, which may be the only requested annotation, thereby reducing the amount of utterances for annotation to improve the annotator efficiency. Another technical challenge may include effectively generating augmented data for improving the NLU models. The solutions presented by the embodiments disclosed herein to address this challenge may be extracting templates from failure cases, generating augmented data based on these failure cases and improving the NLU models based on the augmented data, as such data may focus on these failure cases to enable the NLU models to handle these cases more effectively in the future.

Certain embodiments disclosed herein may provide one or more technical advantages. A technical advantage of the embodiments may include automatic self-driving quality measurement, wherein the assistant system may create fresh head and long tail focused test sets from user data to be used for quality measurement. Another technical advantage of the embodiments may include automatically generating insights identifying bugs that have the highest impact and detecting opportunities for new product scenarios. Another technical advantage of the embodiments may include automatic improvement of the NLU models by creating data patches and rule-based classifier rules (for critical head cases) automatically and ingesting useful user data for NLU annotation and training. Another technical advantage of the embodiments may include benchmark establishment, in which the assistant system may establish tools for regular maintenance of incoming data (e.g., correcting out-of-date annotations, managing user requests for deletion, etc.) and creating dashboards to track quality on these sets over time. Certain embodiments disclosed herein may provide none, some, or all of the above technical advantages. One or more other technical advantages may be readily apparent to one skilled in the art in view of the figures, descriptions, and claims of the present disclosure.

The embodiments disclosed herein are only examples, and the scope of this disclosure is not limited to them. Particular embodiments may include all, some, or none of the components, elements, features, functions, operations, or steps of the embodiments disclosed herein. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

System Overview

Figure 1:
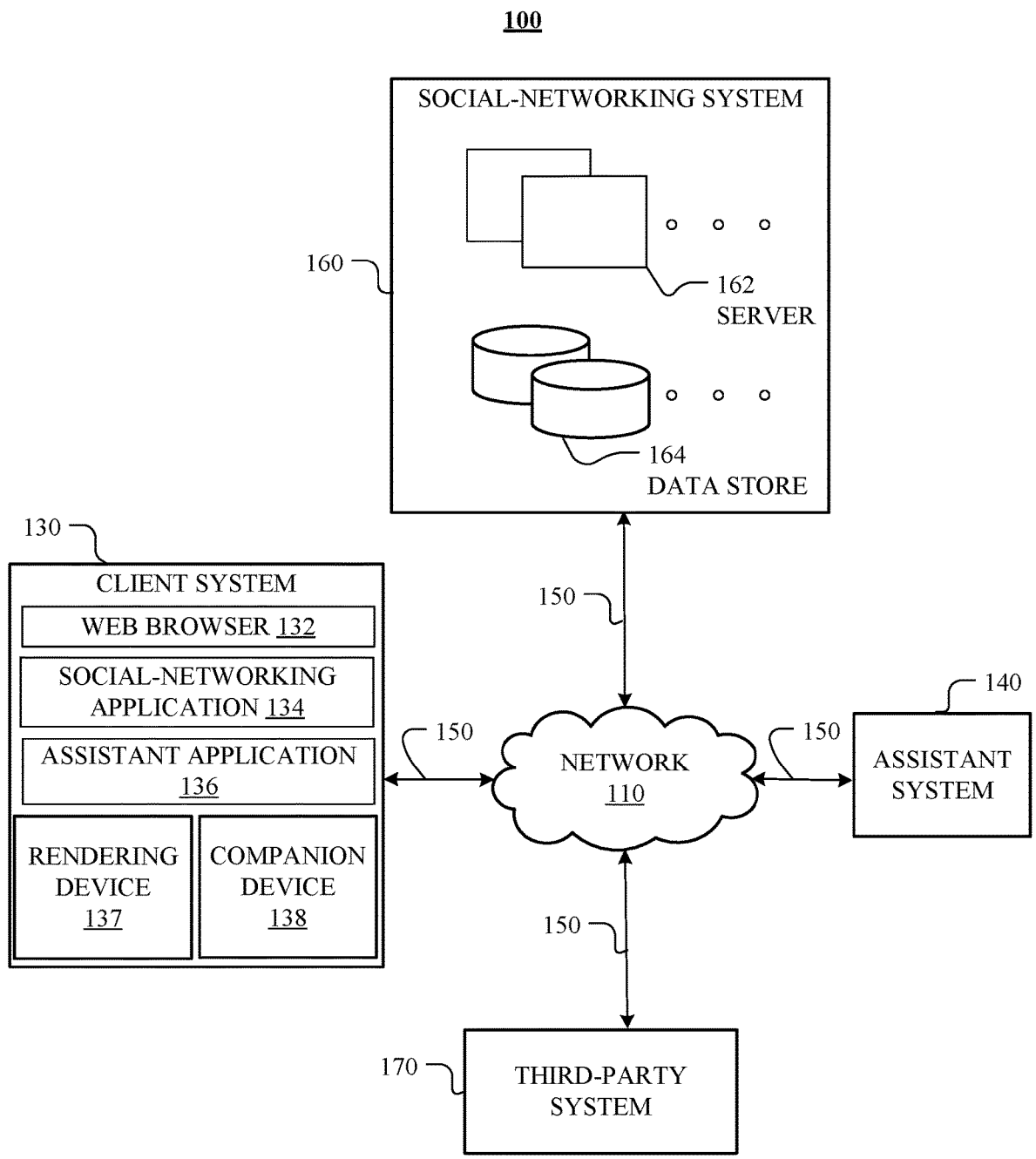
FIG. 1 illustrates an example network environment associated with an assistant system.

FIG. 1 illustrates an example network environment 100 associated with an assistant system. Network environment 100 includes a client system 130, an assistant system 140, a social-networking system 160, and a third-party system 170 connected to each other by a network 110. Although FIG. 1 illustrates a particular arrangement of a client system 130, an assistant system 140, a social-networking system 160, a third-party system 170, and a network 110, this disclosure contemplates any suitable arrangement of a client system 130, an assistant system 140, a social-networking system 160, a third-party system 170, and a network 110. As an example and not by way of limitation, two or more of a client system 130, a social-networking system 160, an assistant system 140, and a third-party system 170 may be connected to each other directly, bypassing a network 110. As another example, two or more of a client system 130, an assistant system 140, a social-networking system 160, and a third-party system 170 may be physically or logically co-located with each other in whole or in part. Moreover, although FIG. 1 illustrates a particular number of client systems 130, assistant systems 140, social-networking systems 160, third-party systems 170, and networks 110, this disclosure contemplates any suitable number of client systems 130, assistant systems 140, social-networking systems 160, third-party systems 170, and networks 110. As an example and not by way of limitation, network environment 100 may include multiple client systems 130, assistant systems 140, social-networking systems 160, third-party systems 170, and networks 110.

This disclosure contemplates any suitable network 110. As an example and not by way of limitation, one or more portions of a network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular technology-based network, a satellite communications technology-based network, another network 110, or a combination of two or more such networks 110.

Links 150 may connect a client system 130, an assistant system 140, a social-networking system 160, and a third-party system 170 to a communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout a network environment 100. One or more first links 150 may differ in one or more respects from one or more second links 150.

In particular embodiments, a client system 130 may be any suitable electronic device including hardware, software, or embedded logic components, or a combination of two or more such components, and may be capable of carrying out the functionalities implemented or supported by a client system 130. As an example and not by way of limitation, the client system 130 may include a computer system such as a desktop computer, notebook or laptop computer, netbook, a tablet computer, e-book reader, GPS device, camera, personal digital assistant (PDA), handheld electronic device, cellular telephone, smartphone, smart speaker, smart watch, smart glasses, augmented-reality (AR) smart glasses, virtual reality (VR) headset, other suitable electronic device, or any suitable combination thereof. In particular embodiments, the client system 130 may be a smart assistant device. More information on smart assistant devices may be found in U.S. patent application Ser. No. 15/949,011, filed 9 Apr. 2018, U.S. patent application Ser. No. 16/153,574, filed 5 Oct. 2018, U.S. patent application Ser. No. 29/631910, filed 3 Jan. 2018, U.S. patent application Ser. No. 29/631747, filed 2 Jan. 2018, U.S. patent application Ser. No. 29/631913, filed 3 Jan. 2018, and U.S. patent application Ser. No. 29/631914, filed 3 Jan. 2018, each of which is incorporated by reference. This disclosure contemplates any suitable client systems 130. In particular embodiments, a client system 130 may enable a network user at a client system 130 to access a network 110. The client system 130 may also enable the user to communicate with other users at other client systems 130.

In particular embodiments, a client system 130 may include a web browser 132, and may have one or more add-ons, plug-ins, or other extensions. A user at a client system 130 may enter a Uniform Resource Locator (URL) or other address directing a web browser 132 to a particular server (such as server 162, or a server associated with a third-party system 170), and the web browser 132 may generate a Hyper Text Transfer Protocol (HTTP) request and communicate the HTTP request to server. The server may accept the HTTP request and communicate to a client system 130 one or more Hyper Text Markup Language (HTML) files responsive to the HTTP request. The client system 130 may render a web interface (e.g. a webpage) based on the HTML files from the server for presentation to the user. This disclosure contemplates any suitable source files. As an example and not by way of limitation, a web interface may be rendered from HTML files, Extensible Hyper Text Markup Language (XHTML) files, or Extensible Markup Language (XML) files, according to particular needs. Such interfaces may also execute scripts, combinations of markup language and scripts, and the like. Herein, reference to a web interface encompasses one or more corresponding source files (which a browser may use to render the web interface) and vice versa, where appropriate.

In particular embodiments, a client system 130 may include a social-networking application 134 installed on the client system 130. A user at a client system 130 may use the social-networking application 134 to access on online social network. The user at the client system 130 may use the social-networking application 134 to communicate with the user's social connections (e.g., friends, followers, followed accounts, contacts, etc.). The user at the client system 130 may also use the social-networking application 134 to interact with a plurality of content objects (e.g., posts, news articles, ephemeral content, etc.) on the online social network. As an example and not by way of limitation, the user may browse trending topics and breaking news using the social-networking application 134.

In particular embodiments, a client system 130 may include an assistant application 136. A user at a client system 130 may use the assistant application 136 to interact with the assistant system 140. In particular embodiments, the assistant application 136 may include an assistant xbot functionality as a front-end interface for interacting with the user of the client system 130, including receiving user inputs and presenting outputs. In particular embodiments, the assistant application 136 may comprise a stand-alone application. In particular embodiments, the assistant application 136 may be integrated into the social-networking application 134 or another suitable application (e.g., a messaging application). In particular embodiments, the assistant application 136 may be also integrated into the client system 130, an assistant hardware device, or any other suitable hardware devices. In particular embodiments, the assistant application 136 may be accessed via the web browser 132. In particular embodiments, the user may interact with the assistant system 140 by providing user input to the assistant application 136 via various modalities (e.g., audio, voice, text, vision, image, video, gesture, motion, activity, location, orientation). The assistant application 136 may communicate the user input to the assistant system 140 (e.g., via the assistant xbot). Based on the user input, the assistant system 140 may generate responses. The assistant system 140 may send the generated responses to the assistant application 136. The assistant application 136 may then present the responses to the user at the client system 130 via various modalities (e.g., audio, text, image, and video). As an example and not by way of limitation, the user may interact with the assistant system 140 by providing a user input (e.g., a verbal request for information regarding a current status of nearby vehicle traffic) to the assistant xbot via a microphone of the client system 130. The assistant application 136 may then communicate the user input to the assistant system 140 over network 110. The assistant system 140 may accordingly analyze the user input, generate a response based on the analysis of the user input (e.g., vehicle traffic information obtained from a third-party source), and communicate the generated response back to the assistant application 136. The assistant application 136 may then present the generated response to the user in any suitable manner (e.g., displaying a text-based push notification and/or image(s) illustrating a local map of nearby vehicle traffic on a display of the client system 130).

In particular embodiments, a client system 130 may implement wake-word detection techniques to allow users to conveniently activate the assistant system 140 using one or more wake-words associated with assistant system 140. As an example and not by way of limitation, the system audio API on client system 130 may continuously monitor user input comprising audio data (e.g., frames of voice data) received at the client system 130. In this example, a wake-word associated with the assistant system 140 may be the voice phrase "hey assistant." In this example, when the system audio API on client system 130 detects the voice phrase "hey assistant" in the monitored audio data, the assistant system 140 may be activated for subsequent interaction with the user. In alternative embodiments, similar detection techniques may be implemented to activate the assistant system 140 using particular non-audio user inputs associated with the assistant system 140. For example, the non-audio user inputs may be specific visual signals detected by a low-power sensor (e.g., camera) of client system 130. As an example and not by way of limitation, the visual signals may be a static image (e.g., barcode, QR code, universal product code (UPC)), a position of the user (e.g., the user's gaze towards client system 130), a user motion (e.g., the user pointing at an object), or any other suitable visual signal.

In particular embodiments, a client system 130 may include a rendering device 137 and, optionally, a companion device 138. The rendering device 137 may be configured to render outputs generated by the assistant system 140 to the user. The companion device 138 may be configured to perform computations associated with particular tasks (e.g., communications with the assistant system 140) locally (i.e., on-device) on the companion device 138 in particular circumstances (e.g., when the rendering device 137 is unable to perform said computations). In particular embodiments, the client system 130, the rendering device 137, and/or the companion device 138 may each be a suitable electronic device including hardware, software, or embedded logic components, or a combination of two or more such components, and may be capable of carrying out, individually or cooperatively, the functionalities implemented or supported by the client system 130 described herein. As an example and not by way of limitation, the client system 130, the rendering device 137, and/or the companion device 138 may each include a computer system such as a desktop computer, notebook or laptop computer, netbook, a tablet computer, e-book reader, GPS device, camera, personal digital assistant (PDA), handheld electronic device, cellular telephone, smartphone, smart speaker, virtual reality (VR) headset, augmented-reality (AR) smart glasses, other suitable electronic device, or any suitable combination thereof. In particular embodiments, one or more of the client system 130, the rendering device 137, and the companion device 138 may operate as a smart assistant device. As an example and not by way of limitation, the rendering device 137 may comprise smart glasses and the companion device 138 may comprise a smart phone. As another example and not by way of limitation, the rendering device 137 may comprise a smart watch and the companion device 138 may comprise a smart phone. As yet another example and not by way of limitation, the rendering device 137 may comprise smart glasses and the companion device 138 may comprise a smart remote for the smart glasses. As yet another example and not by way of limitation, the rendering device 137 may comprise a VR/AR headset and the companion device 138 may comprise a smart phone.

In particular embodiments, a user may interact with the assistant system 140 using the rendering device 137 or the companion device 138, individually or in combination. In particular embodiments, one or more of the client system 130, the rendering device 137, and the companion device 138 may implement a multi-stage wake-word detection model to enable users to conveniently activate the assistant system 140 by continuously monitoring for one or more wake-words associated with assistant system 140. At a first stage of the wake-word detection model, the rendering device 137 may receive audio user input (e.g., frames of voice data). If a wireless connection between the rendering device 137 and the companion device 138 is available, the application on the rendering device 137 may communicate the received audio user input to the companion application on the companion device 138 via the wireless connection. At a second stage of the wake-word detection model, the companion application on the companion device 138 may process the received audio user input to detect a wake-word associated with the assistant system 140. The companion application on the companion device 138 may then communicate the detected wake-word to a server associated with the assistant system 140 via wireless network 110. At a third stage of the wake-word detection model, the server associated with the assistant system 140 may perform a keyword verification on the detected wake-word to verify whether the user intended to activate and receive assistance from the assistant system 140. In alternative embodiments, any of the processing, detection, or keyword verification may be performed by the rendering device 137 and/or the companion device 138. In particular embodiments, when the assistant system 140 has been activated by the user, an application on the rendering device 137 may be configured to receive user input from the user, and a companion application on the companion device 138 may be configured to handle user inputs (e.g., user requests) received by the application on the rendering device 137. In particular embodiments, the rendering device 137 and the companion device 138 may be associated with each other (i.e., paired) via one or more wireless communication protocols (e.g., Bluetooth).

The following example workflow illustrates how a rendering device 137 and a companion device 138 may handle a user input provided by a user. In this example, an application on the rendering device 137 may receive a user input comprising a user request directed to the rendering device 137. The application on the rendering device 137 may then determine a status of a wireless connection (i.e., tethering status) between the rendering device 137 and the companion device 138. If a wireless connection between the rendering device 137 and the companion device 138 is not available, the application on the rendering device 137 may communicate the user request (optionally including additional data and/or contextual information available to the rendering device 137) to the assistant system 140 via the network 110. The assistant system 140 may then generate a response to the user request and communicate the generated response back to the rendering device 137. The rendering device 137 may then present the response to the user in any suitable manner. Alternatively, if a wireless connection between the rendering device 137 and the companion device 138 is available, the application on the rendering device 137 may communicate the user request (optionally including additional data and/or contextual information available to the rendering device 137) to the companion application on the companion device 138 via the wireless connection. The companion application on the companion device 138 may then communicate the user request (optionally including additional data and/or contextual information available to the companion device 138) to the assistant system 140 via the network 110. The assistant system 140 may then generate a response to the user request and communicate the generated response back to the companion device 138. The companion application on the companion device 138 may then communicate the generated response to the application on the rendering device 137. The rendering device 137 may then present the response to the user in any suitable manner. In the preceding example workflow, the rendering device 137 and the companion device 138 may each perform one or more computations and/or processes at each respective step of the workflow. In particular embodiments, performance of the computations and/or processes disclosed herein may be adaptively switched between the rendering device 137 and the companion device 138 based at least in part on a device state of the rendering device 137 and/or the companion device 138, a task associated with the user input, and/or one or more additional factors. As an example and not by way of limitation, one factor may be signal strength of the wireless connection between the rendering device 137 and the companion device 138. For example, if the signal strength of the wireless connection between the rendering device 137 and the companion device 138 is strong, the computations and processes may be adaptively switched to be substantially performed by the companion device 138 in order to, for example, benefit from the greater processing power of the CPU of the companion device 138. Alternatively, if the signal strength of the wireless connection between the rendering device 137 and the companion device 138 is weak, the computations and processes may be adaptively switched to be substantially performed by the rendering device 137 in a standalone manner. In particular embodiments, if the client system 130 does not comprise a companion device 138, the aforementioned computations and processes may be performed solely by the rendering device 137 in a standalone manner.

In particular embodiments, an assistant system 140 may assist users with various assistant-related tasks. The assistant system 140 may interact with the social-networking system 160 and/or the third-party system 170 when executing these assistant-related tasks.

In particular embodiments, the social-networking system 160 may be a network-addressable computing system that can host an online social network. The social-networking system 160 may generate, store, receive, and send social-networking data, such as, for example, user profile data, concept-profile data, social-graph information, or other suitable data related to the online social network. The social-networking system 160 may be accessed by the other components of network environment 100 either directly or via a network 110. As an example and not by way of limitation, a client system 130 may access the social-networking system 160 using a web browser 132 or a native application associated with the social-networking system 160 (e.g., a mobile social-networking application, a messaging application, another suitable application, or any combination thereof) either directly or via a network 110. In particular embodiments, the social-networking system 160 may include one or more servers 162. Each server 162 may be a unitary server or a distributed server spanning multiple computers or multiple datacenters. As an example and not by way of limitation, each server 162 may be a web server, a news server, a mail server, a message server, an advertising server, a file server, an application server, an exchange server, a database server, a proxy server, another server suitable for performing functions or processes described herein, or any combination thereof. In particular embodiments, each server 162 may include hardware, software, or embedded logic components or a combination of two or more such components for carrying out the appropriate functionalities implemented or supported by server 162. In particular embodiments, the social-networking system 160 may include one or more data stores 164. Data stores 164 may be used to store various types of information. In particular embodiments, the information stored in data stores 164 may be organized according to specific data structures. In particular embodiments, each data store 164 may be a relational, columnar, correlation, or other suitable database. Although this disclosure describes or illustrates particular types of databases, this disclosure contemplates any suitable types of databases. Particular embodiments may provide interfaces that enable a client system 130, a social-networking system 160, an assistant system 140, or a third-party system 170 to manage, retrieve, modify, add, or delete, the information stored in data store 164.

In particular embodiments, the social-networking system 160 may store one or more social graphs in one or more data stores 164. In particular embodiments, a social graph may include multiple nodes—which may include multiple user nodes (each corresponding to a particular user) or multiple concept nodes (each corresponding to a particular concept)—and multiple edges connecting the nodes. The social-networking system 160 may provide users of the online social network the ability to communicate and interact with other users. In particular embodiments, users may join the online social network via the social-networking system 160 and then add connections (e.g., relationships) to a number of other users of the social-networking system 160 whom they want to be connected to. Herein, the term "friend" may refer to any other user of the social-networking system 160 with whom a user has formed a connection, association, or relationship via the social-networking system 160.

In particular embodiments, the social-networking system 160 may provide users with the ability to take actions on various types of items or objects, supported by the social-networking system 160. As an example and not by way of limitation, the items and objects may include groups or social networks to which users of the social-networking system 160 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in the social-networking system 160 or by an external system of a third-party system 170, which is separate from the social-networking system 160 and coupled to the social-networking system 160 via a network 110.

In particular embodiments, the social-networking system 160 may be capable of linking a variety of entities. As an example and not by way of limitation, the social-networking system 160 may enable users to interact with each other as well as receive content from third-party systems 170 or other entities, or to allow users to interact with these entities through an application programming interfaces (API) or other communication channels.

In particular embodiments, a third-party system 170 may include one or more types of servers, one or more data stores, one or more interfaces, including but not limited to APIs, one or more web services, one or more content sources, one or more networks, or any other suitable components, e.g., that servers may communicate with. A third-party system 170 may be operated by a different entity from an entity operating the social-networking system 160. In particular embodiments, however, the social-networking system 160 and third-party systems 170 may operate in conjunction with each other to provide social-networking services to users of the social-networking system 160 or third-party systems 170. In this sense, the social-networking system 160 may provide a platform, or backbone, which other systems, such as third-party systems 170, may use to provide social-networking services and functionality to users across the Internet.

In particular embodiments, a third-party system 170 may include a third-party content object provider. A third-party content object provider may include one or more sources of content objects, which may be communicated to a client system 130. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects. In particular embodiments, a third-party content provider may use one or more third-party agents to provide content objects and/or services. A third-party agent may be an implementation that is hosted and executing on the third-party system 170.

In particular embodiments, the social-networking system 160 also includes user-generated content objects, which may enhance a user's interactions with the social-networking system 160. User-generated content may include anything a user can add, upload, send, or "post" to the social-networking system 160. As an example and not by way of limitation, a user communicates posts to the social-networking system 160 from a client system 130. Posts may include data such as status updates or other textual data, location information, photos, videos, links, music or other similar data or media. Content may also be added to the social-networking system 160 by a third-party through a "communication channel," such as a newsfeed or stream.

In particular embodiments, the social-networking system 160 may include a variety of servers, sub-systems, programs, modules, logs, and data stores. In particular embodiments, the social-networking system 160 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. The social-networking system 160 may also include suitable components such as network interfaces, security mechanisms, load balancers, failover servers, management-and-network-operations consoles, other suitable components, or any suitable combination thereof. In particular embodiments, the social-networking system 160 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories.

Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking the social-networking system 160 to one or more client systems 130 or one or more third-party systems 170 via a network 110. The web server may include a mail server or other messaging functionality for receiving and routing messages between the social-networking system 160 and one or more client systems 130. An API-request server may allow, for example, an assistant system 140 or a third-party system 170 to access information from the social-networking system 160 by calling one or more APIs. An action logger may be used to receive communications from a web server about a user's actions on or off the social-networking system 160. In conjunction with the action log, a third-party-content-object log may be maintained of user exposures to third-party-content objects. A notification controller may provide information regarding content objects to a client system 130. Information may be pushed to a client system 130 as notifications, or information may be pulled from a client system 130 responsive to a user input comprising a user request received from a client system 130. Authorization servers may be used to enforce one or more privacy settings of the users of the social-networking system 160. A privacy setting of a user may determine how particular information associated with a user can be shared. The authorization server may allow users to opt in to or opt out of having their actions logged by the social-networking system 160 or shared with other systems (e.g., a third-party system 170), such as, for example, by setting appropriate privacy settings. Third-party-content-object stores may be used to store content objects received from third parties, such as a third-party system 170. Location stores may be used for storing location information received from client systems 130 associated with users. Advertisement-pricing modules may combine social information, the current time, location information, or other suitable information to provide relevant advertisements, in the form of notifications, to a user.

Assistant Systems

Figure 2:
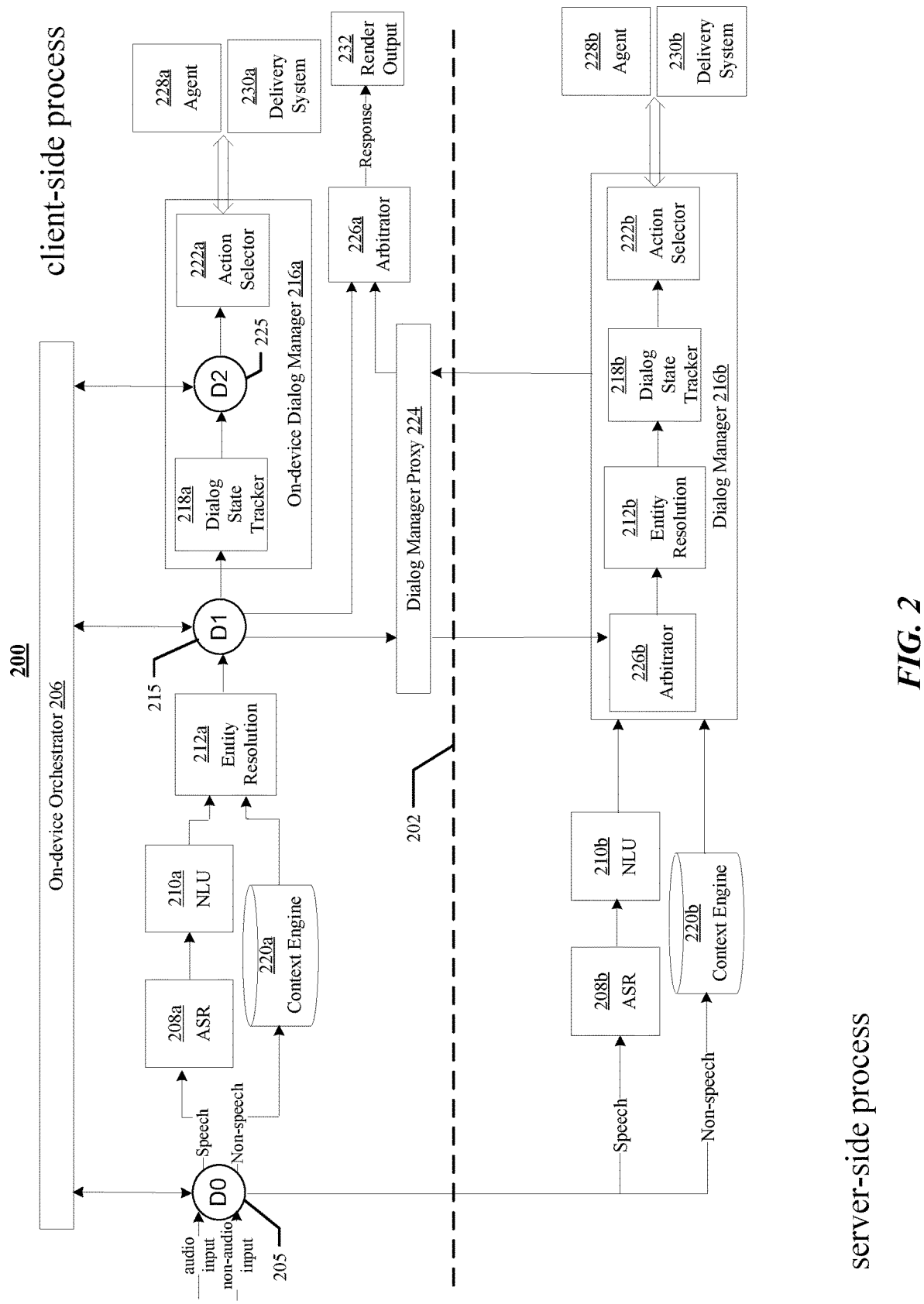
FIG. 2 illustrates an example architecture of the assistant system.

FIG. 2 illustrates an example architecture 200 of the assistant system 140. In particular embodiments, the assistant system 140 may assist a user to obtain information or services. The assistant system 140 may enable the user to interact with the assistant system 140 via user inputs of various modalities (e.g., audio, voice, text, vision, image, video, gesture, motion, activity, location, orientation) in stateful and multi-turn conversations to receive assistance from the assistant system 140. As an example and not by way of limitation, a user input may comprise an audio input based on the user's voice (e.g., a verbal command), which may be processed by a system audio API (application programming interface) on client system 130. The system audio API may perform techniques including echo cancellation, noise removal, beam forming, self-user voice activation, speaker identification, voice activity detection (VAD), and/or any other suitable acoustic technique in order to generate audio data that is readily processable by the assistant system 140. In particular embodiments, the assistant system 140 may support mono-modal inputs (e.g., only voice inputs), multi-modal inputs (e.g., voice inputs and text inputs), hybrid/multi-modal inputs, or any combination thereof. In particular embodiments, a user input may be a user-generated input that is sent to the assistant system 140 in a single turn. User inputs provided by a user may be associated with particular assistant-related tasks, and may include, for example, user requests (e.g., verbal requests for information or performance of an action), user interactions with the assistant application 136 associated with the assistant system 140 (e.g., selection of UI elements via touch or gesture), or any other type of suitable user input that may be detected and understood by the assistant system 140 (e.g., user movements detected by the client device 130 of the user).

In particular embodiments, the assistant system 140 may create and store a user profile comprising both personal and contextual information associated with the user. In particular embodiments, the assistant system 140 may analyze the user input using natural-language understanding (NLU) techniques. The analysis may be based at least in part on the user profile of the user for more personalized and context-aware understanding. The assistant system 140 may resolve entities associated with the user input based on the analysis. In particular embodiments, the assistant system 140 may interact with different agents to obtain information or services that are associated with the resolved entities. The assistant system 140 may generate a response for the user regarding the information or services by using natural-language generation (NLG). Through the interaction with the user, the assistant system 140 may use dialog management techniques to manage and forward the conversation flow with the user. In particular embodiments, the assistant system 140 may further assist the user to effectively and efficiently digest the obtained information by summarizing the information. The assistant system 140 may also assist the user to be more engaging with an online social network by providing tools that help the user interact with the online social network (e.g., creating posts, comments, messages). The assistant system 140 may additionally assist the user to manage different tasks such as keeping track of events. In particular embodiments, the assistant system 140 may proactively execute, without a user input, pre-authorized tasks that are relevant to user interests and preferences based on the user profile, at a time relevant for the user. In particular embodiments, the assistant system 140 may check privacy settings to ensure that accessing a user's profile or other user information and executing different tasks are permitted subject to the user's privacy settings. More information on assisting users subject to privacy settings may be found in U.S. patent application Ser. No. 16/182,542, filed 6 Nov. 2018, which is incorporated by reference.

In particular embodiments, the assistant system 140 may assist a user via an architecture built upon client-side processes and server-side processes which may operate in various operational modes. In FIG. 2, the client-side process is illustrated above the dashed line 202 whereas the server-side process is illustrated below the dashed line 202. A first operational mode (i.e., on-device mode) may be a workflow in which the assistant system 140 processes a user input and provides assistance to the user by primarily or exclusively performing client-side processes locally on the client system 130. For example, if the client system 130 is not connected to a network 110 (i.e., when client system 130 is offline), the assistant system 140 may handle a user input in the first operational mode utilizing only client-side processes. A second operational mode (i.e., cloud mode) may be a workflow in which the assistant system 140 processes a user input and provides assistance to the user by primarily or exclusively performing server-side processes on one or more remote servers (e.g., a server associated with assistant system 140). As illustrated in FIG. 2, a third operational mode (i.e., blended mode) may be a parallel workflow in which the assistant system 140 processes a user input and provides assistance to the user by performing client-side processes locally on the client system 130 in conjunction with server-side processes on one or more remote servers (e.g., a server associated with assistant system 140). For example, the client system 130 and the server associated with assistant system 140 may both perform automatic speech recognition (ASR) and natural-language understanding (NLU) processes, but the client system 130 may delegate dialog, agent, and natural-language generation (NLG) processes to be performed by the server associated with assistant system 140.

In particular embodiments, selection of an operational mode may be based at least in part on a device state, a task associated with a user input, and/or one or more additional factors. As an example and not by way of limitation, as described above, one factor may be a network connectivity status for client system 130. For example, if the client system 130 is not connected to a network 110 (i.e., when client system 130 is offline), the assistant system 140 may handle a user input in the first operational mode (i.e., on-device mode). As another example and not by way of limitation, another factor may be based on a measure of available battery power (i.e., battery status) for the client system 130. For example, if there is a need for client system 130 to conserve battery power (e.g., when client system 130 has minimal available battery power or the user has indicated a desire to conserve the battery power of the client system 130), the assistant system 140 may handle a user input in the second operational mode (i.e., cloud mode) or the third operational mode (i.e., blended mode) in order to perform fewer power-intensive operations on the client system 130. As yet another example and not by way of limitation, another factor may be one or more privacy constraints (e.g., specified privacy settings, applicable privacy policies). For example, if one or more privacy constraints limits or precludes particular data from being transmitted to a remote server (e.g., a server associated with the assistant system 140), the assistant system 140 may handle a user input in the first operational mode (i.e., on-device mode) in order to protect user privacy. As yet another example and not by way of limitation, another factor may be desynchronized context data between the client system 130 and a remote server (e.g., the server associated with assistant system 140). For example, the client system 130 and the server associated with assistant system 140 may be determined to have inconsistent, missing, and/or unreconciled context data, the assistant system 140 may handle a user input in the third operational mode (i.e., blended mode) to reduce the likelihood of an inadequate analysis associated with the user input. As yet another example and not by way of limitation, another factor may be a measure of latency for the connection between client system 130 and a remote server (e.g., the server associated with assistant system 140). For example, if a task associated with a user input may significantly benefit from and/or require prompt or immediate execution (e.g., photo capturing tasks), the assistant system 140 may handle the user input in the first operational mode (i.e., on-device mode) to ensure the task is performed in a timely manner. As yet another example and not by way of limitation, another factor may be, for a feature relevant to a task associated with a user input, whether the feature is only supported by a remote server (e.g., the server associated with assistant system 140). For example, if the relevant feature requires advanced technical functionality (e.g., high-powered processing capabilities, rapid update cycles) that is only supported by the server associated with assistant system 140 and is not supported by client system 130 at the time of the user input, the assistant system 140 may handle the user input in the second operational mode (i.e., cloud mode) or the third operational mode (i.e., blended mode) in order to benefit from the relevant feature.

In particular embodiments, an on-device orchestrator 206 on the client system 130 may coordinate receiving a user input and may determine, at one or more decision points in an example workflow, which of the operational modes described above should be used to process or continue processing the user input. As discussed above, selection of an operational mode may be based at least in part on a device state, a task associated with a user input, and/or one or more additional factors. As an example and not by way of limitation, with reference to the workflow architecture illustrated in FIG. 2, after a user input is received from a user, the on-device orchestrator 206 may determine, at decision point (D0) 205, whether to begin processing the user input in the first operational mode (i.e., on-device mode), the second operational mode (i.e., cloud mode), or the third operational mode (i.e., blended mode). For example, at decision point (D0) 205, the on-device orchestrator 206 may select the first operational mode (i.e., on-device mode) if the client system 130 is not connected to network 110 (i.e., when client system 130 is offline), if one or more privacy constraints expressly require on-device processing (e.g., adding or removing another person to a private call between users), or if the user input is associated with a task which does not require or benefit from server-side processing (e.g., setting an alarm or calling another user). As another example, at decision point (D0) 205, the on-device orchestrator 206 may select the second operational mode (i.e., cloud mode) or the third operational mode (i.e., blended mode) if the client system 130 has a need to conserve battery power (e.g., when client system 130 has minimal available battery power or the user has indicated a desire to conserve the battery power of the client system 130) or has a need to limit additional utilization of computing resources (e.g., when other processes operating on client device 130 require high CPU utilization (e.g., SMS messaging applications)).

In particular embodiments, if the on-device orchestrator 206 determines at decision point (D0) 205 that the user input should be processed using the first operational mode (i.e., on-device mode) or the third operational mode (i.e., blended mode), the client-side process may continue as illustrated in FIG. 2. As an example and not by way of limitation, if the user input comprises speech data, the speech data may be received at a local automatic speech recognition (ASR) module 208*a* on the client system 130. The ASR module 208*a* may allow a user to dictate and have speech transcribed as written text, have a document synthesized as an audio stream, or issue commands that are recognized as such by the system.

In particular embodiments, the output of the ASR module 208*a* may be sent to a local natural-language understanding (NLU) module 210*a*. The NLU module 210*a* may perform named entity resolution (NER), or named entity resolution may be performed by the entity resolution module 212*a*, as described below. In particular embodiments, one or more of an intent, a slot, or a domain may be an output of the NLU module 210*a*.

In particular embodiments, the user input may comprise non-speech data, which may be received at a local context engine 220a. As an example and not by way of limitation, the non-speech data may comprise locations, visuals, touch, gestures, world updates, social updates, contextual information, information related to people, activity data, and/or any other suitable type of non-speech data. The non-speech data may further comprise sensory data received by client system 130 sensors (e.g., microphone, camera), which may be accessed subject to privacy constraints and further analyzed by computer vision technologies. In particular embodiments, the computer vision technologies may comprise human reconstruction, face detection, facial recognition, hand tracking, eye tracking, and/or any other suitable computer vision technologies. In particular embodiments, the non-speech data may be subject to geometric constructions, which may comprise constructing objects surrounding a user using any suitable type of data collected by a client system 130. As an example and not by way of limitation, a user may be wearing AR glasses, and geometric constructions may be utilized to determine spatial locations of surfaces and items (e.g., a floor, a wall, a user's hands). In particular embodiments, the non-speech data may be inertial data captured by AR glasses or a VR headset, and which may be data associated with linear and angular motions (e.g., measurements associated with a user's body movements). In particular embodiments, the context engine 220a may determine various types of events and context based on the non-speech data.

In particular embodiments, the outputs of the NLU module 210a and/or the context engine 220a may be sent to an entity resolution module 212a. The entity resolution module 212a may resolve entities associated with one or more slots output by NLU module 210a. In particular embodiments, each resolved entity may be associated with one or more entity identifiers. As an example and not by way of limitation, an identifier may comprise a unique user identifier (ID) corresponding to a particular user (e.g., a unique username or user ID number for the social-networking system 160). In particular embodiments, each resolved entity may also be associated with a confidence score. More information on resolving entities may be found in U.S. Pat. No. 10,803,050, filed 27 Jul. 2018, and U.S. patent application Ser. No. 16/048,072, filed 27 Jul. 2018, each of which is incorporated by reference.

In particular embodiments, at decision point (D0) 205, the on-device orchestrator 206 may determine that a user input should be handled in the second operational mode (i.e., cloud mode) or the third operational mode (i.e., blended mode). In these operational modes, the user input may be handled by certain server-side modules in a similar manner as the client-side process described above.

In particular embodiments, if the user input comprises speech data, the speech data of the user input may be received at a remote automatic speech recognition (ASR) module 208b on a remote server (e.g., the server associated with assistant system 140). The ASR module 208b may allow a user to dictate and have speech transcribed as written text, have a document synthesized as an audio stream, or issue commands that are recognized as such by the system.

In particular embodiments, the output of the ASR module 208b may be sent to a remote natural-language understanding (NLU) module 210b. In particular embodiments, the NLU module 210b may perform named entity resolution (NER) or named entity resolution may be performed by entity resolution module 212b of dialog manager module 216b as described below. In particular embodiments, one or more of an intent, a slot, or a domain may be an output of the NLU module 210b.

In particular embodiments, the user input may comprise non-speech data, which may be received at a remote context engine 220b. In particular embodiments, the remote context engine 220b may determine various types of events and context based on the non-speech data. In particular embodiments, the output of the NLU module 210b and/or the context engine 220b may be sent to a remote dialog manager 216b.

In particular embodiments, as discussed above, an on-device orchestrator 206 on the client system 130 may coordinate receiving a user input and may determine, at one or more decision points in an example workflow, which of the operational modes described above should be used to process or continue processing the user input. As further discussed above, selection of an operational mode may be based at least in part on a device state, a task associated with a user input, and/or one or more additional factors. As an example and not by way of limitation, with continued reference to the workflow architecture illustrated in FIG. 2, after the entity resolution module 212a generates an output or a null output, the on-device orchestrator 206 may determine, at decision point (D1) 215, whether to continue processing the user input in the first operational mode (i.e., on-device mode), the second operational mode (i.e., cloud mode), or the third operational mode (i.e., blended mode). For example, at decision point (D1) 215, the on-device orchestrator 206 may select the first operational mode (i.e., on-device mode) if an identified intent is associated with a latency sensitive processing task (e.g., taking a photo, pausing a stopwatch). As another example and not by way of limitation, if a messaging task is not supported by on-device processing on the client system 130, the on-device orchestrator 206 may select the third operational mode (i.e., blended mode) to process the user input associated with a messaging request. As yet another example, at decision point (D1) 215, the on-device orchestrator 206 may select the second operational mode (i.e., cloud mode) or the third operational mode (i.e., blended mode) if the task being processed requires access to a social graph, a knowledge graph, or a concept graph not stored on the client system 130. Alternatively, the on-device orchestrator 206 may instead select the first operational mode (i.e., on-device mode) if a sufficient version of an informational graph including requisite information for the task exists on the client system 130 (e.g., a smaller and/or bootstrapped version of a knowledge graph).

In particular embodiments, if the on-device orchestrator 206 determines at decision point (D1) 215 that processing should continue using the first operational mode (i.e., on-device mode) or the third operational mode (i.e., blended mode), the client-side process may continue as illustrated in FIG. 2. As an example and not by way of limitation, the output from the entity resolution module 212a may be sent to an on-device dialog manager 216a. In particular embodiments, the on-device dialog manager 216a may comprise a dialog state tracker 218a and an action selector 222a. The on-device dialog manager 216a may have complex dialog logic and product-related business logic to manage the dialog state and flow of the conversation between the user and the assistant system 140. The on-device dialog manager 216a may include full functionality for end-to-end integration and multi-turn support (e.g., confirmation, disambiguation). The on-device dialog manager 216a may also be lightweight with respect to computing limitations and resources including memory, computation (CPU), and binary size constraints. The on-device dialog manager 216a may also be scalable to improve developer experience. In particular embodiments, the on-device dialog manager 216a may benefit the assistant system 140, for example, by providing offline support to alleviate network connectivity issues (e.g., unstable or unavailable network connections), by using client-side processes to prevent privacy-sensitive information from being transmitted off of client system 130, and by providing a stable user experience in high-latency sensitive scenarios.

In particular embodiments, the on-device dialog manager 216a may further conduct false trigger mitigation. Implementation of false trigger mitigation may detect and prevent false triggers from user inputs which would otherwise invoke the assistant system 140 (e.g., an unintended wake-word) and may further prevent the assistant system 140 from generating data records based on the false trigger that may be inaccurate and/or subject to privacy constraints. As an example and not by way of limitation, if a user is in a voice call, the user's conversation during the voice call may be considered private, and the false trigger mitigation may limit detection of wake-words to audio user inputs received locally by the user's client system 130. In particular embodiments, the on-device dialog manager 216a may implement false trigger mitigation based on a nonsense detector. If the nonsense detector determines with a high confidence that a received wake-word is not logically and/or contextually sensible at the point in time at which it was received from the user, the on-device dialog manager 216a may determine that the user did not intend to invoke the assistant system 140.

In particular embodiments, due to a limited computing power of the client system 130, the on-device dialog manager 216a may conduct on-device learning based on learning algorithms particularly tailored for client system 130. As an example and not by way of limitation, federated learning techniques may be implemented by the on-device dialog manager 216a. Federated learning is a specific category of distributed machine learning techniques which may train machine-learning models using decentralized data stored on end devices (e.g., mobile phones). In particular embodiments, the on-device dialog manager 216a may use federated user representation learning model to extend existing neural-network personalization techniques to implementation of federated learning by the on-device dialog manager 216a. Federated user representation learning may personalize federated learning models by learning task-specific user representations (i.e., embeddings) and/or by personalizing model weights. Federated user representation learning is a simple, scalable, privacy-preserving, and resource-efficient. Federated user representation learning may divide model parameters into federated and private parameters. Private parameters, such as private user embeddings, may be trained locally on a client system 130 instead of being transferred to or averaged by a remote server (e.g., the server associated with assistant system 140). Federated parameters, by contrast, may be trained remotely on the server. In particular embodiments, the on-device dialog manager 216a may use an active federated learning model, which may transmit a global model trained on the remote server to client systems 130 and calculate gradients locally on the client systems 130. Active federated learning may enable the on-device dialog manager 216a to minimize the transmission costs associated with downloading models and uploading gradients. For active federated learning, in each round, client systems 130 may be selected in a semi-random manner based at least in part on a probability conditioned on the current model and the data on the client systems 130 in order to optimize efficiency for training the federated learning model.

In particular embodiments, the dialog state tracker 218a may track state changes over time as a user interacts with the world and the assistant system 140 interacts with the user. As an example and not by way of limitation, the dialog state tracker 218a may track, for example, what the user is talking about, whom the user is with, where the user is, what tasks are currently in progress, and where the user's gaze is at subject to applicable privacy policies.

In particular embodiments, at decision point (D1) 215, the on-device orchestrator 206 may determine to forward the user input to the server for either the second operational mode (i.e., cloud mode) or the third operational mode (i.e., blended mode). As an example and not by way of limitation, if particular functionalities or processes (e.g., messaging) are not supported by on the client system 130, the on-device orchestrator 206 may determine at decision point (D1) 215 to use the third operational mode (i.e., blended mode). In particular embodiments, the on-device orchestrator 206 may cause the outputs from the NLU module 210a, the context engine 220a, and the entity resolution module 212a, via a dialog manager proxy 224, to be forwarded to an entity resolution module 212b of the remote dialog manager 216b to continue the processing. The dialog manager proxy 224 may be a communication channel for information/events exchange between the client system 130 and the server. In particular embodiments, the dialog manager 216b may additionally comprise a remote arbitrator 226b, a remote dialog state tracker 218b, and a remote action selector 222b. In particular embodiments, the assistant system 140 may have started processing a user input with the second operational mode (i.e., cloud mode) at decision point (D0) 205 and the on-device orchestrator 206 may determine to continue processing the user input based on the second operational mode (i.e., cloud mode) at decision point (D1) 215. Accordingly, the output from the NLU module 210b and the context engine 220b may be received at the remote entity resolution module 212b. The remote entity resolution module 212b may have similar functionality as the local entity resolution module 212a, which may comprise resolving entities associated with the slots. In particular embodiments, the entity resolution module 212b may access one or more of the social graph, the knowledge graph, or the concept graph when resolving the entities. The output from the entity resolution module 212b may be received at the arbitrator 226b.

In particular embodiments, the remote arbitrator 226b may be responsible for choosing between client-side and server-side upstream results (e.g., results from the NLU module 210a/b, results from the entity resolution module 212a/b, and results from the context engine 220a/b). The arbitrator 226b may send the selected upstream results to the remote dialog state tracker 218b. In particular embodiments, similarly to the local dialog state tracker 218a, the remote dialog state tracker 218b may convert the upstream results into candidate tasks using task specifications and resolve arguments with entity resolution.

In particular embodiments, at decision point (D2) 225, the on-device orchestrator 206 may determine whether to continue processing the user input based on the first operational mode (i.e., on-device mode) or forward the user input to the server for the third operational mode (i.e., blended mode). The decision may depend on, for example, whether the client-side process is able to resolve the task and slots successfully, whether there is a valid task policy with a specific feature support, and/or the context differences between the client-side process and the server-side process. In particular embodiments, decisions made at decision point (D2) 225 may be for multi-turn scenarios. In particular embodiments, there may be at least two possible scenarios. In a first scenario, the assistant system 140 may have started processing a user input in the first operational mode (i.e., on-device mode) using client-side dialog state. If at some point the assistant system 140 decides to switch to having the remote server process the user input, the assistant system 140 may create a programmatic/predefined task with the current task state and forward it to the remote server. For subsequent turns, the assistant system 140 may continue processing in the third operational mode (i.e., blended mode) using the server-side dialog state. In another scenario, the assistant system 140 may have started processing the user input in either the second operational mode (i.e., cloud mode) or the third operational mode (i.e., blended mode) and may substantially rely on server-side dialog state for all subsequent turns. If the on-device orchestrator 206 determines to continue processing the user input based on the first operational mode (i.e., on-device mode), the output from the dialog state tracker 218a may be received at the action selector 222a.

In particular embodiments, at decision point (D2) 225, the on-device orchestrator 206 may determine to forward the user input to the remote server and continue processing the user input in either the second operational mode (i.e., cloud mode) or the third operational mode (i.e., blended mode). The assistant system 140 may create a programmatic/pre-defined task with the current task state and forward it to the server, which may be received at the action selector 222b. In particular embodiments, the assistant system 140 may have started processing the user input in the second operational mode (i.e., cloud mode), and the on-device orchestrator 206 may determine to continue processing the user input in the second operational mode (i.e., cloud mode) at decision point (D2) 225. Accordingly, the output from the dialog state tracker 218b may be received at the action selector 222b.

In particular embodiments, the action selector 222a/b may perform interaction management. The action selector 222a/b may determine and trigger a set of general executable actions. The actions may be executed either on the client system 130 or at the remote server. As an example and not by way of limitation, these actions may include providing information or suggestions to the user.

In particular embodiments, the actions may interact with agents 228a/b, users, and/or the assistant system 140 itself. These actions may comprise actions including one or more of a slot request, a confirmation, a disambiguation, or an agent execution. The actions may be independent of the underlying implementation of the action selector 222a/b. For more complicated scenarios such as, for example, multi-turn tasks or tasks with complex business logic, the local action selector 222a may call one or more local agents 228a, and the remote action selector 222b may call one or more remote agents 228b to execute the actions. Agents 228a/b may be invoked via task ID, and any actions may be routed to the correct agent 228a/b using that task ID. In particular embodiments, an agent 228a/b may be configured to serve as a broker across a plurality of content providers for one domain. A content provider may be an entity responsible for carrying out an action associated with an intent or completing a task associated with the intent. In particular embodiments, agents 228a/b may provide several functionalities for the assistant system 140 including, for example, native template generation, task specific business logic, and querying external APIs. When executing actions for a task, agents 228a/b may use context from the dialog state tracker 218a/b, and may also update the dialog state tracker 218a/b. In particular embodiments, agents 228a/b may also generate partial payloads from a dialog act.

In particular embodiments, the local agents 228a may have different implementations to be compiled/registered for different platforms (e.g., smart glasses versus a VR headset). In particular embodiments, multiple device-specific implementations (e.g., real-time calls for a client system 130 or a messaging application on the client system 130) may be handled internally by a single agent 228a. Alternatively, device-specific implementations may be handled by multiple agents 228a associated with multiple domains. As an example and not by way of limitation, calling an agent 228a on smart glasses may be implemented in a different manner than calling an agent 228a on a smart phone. Different platforms may also utilize varying numbers of agents 228a. The agents 228a may also be cross-platform (i.e., different operating systems on the client system 130). In addition, the agents 228a may have minimized startup time or binary size impact. Local agents 228a may be suitable for particular use cases. As an example and not by way of limitation, one use case may be emergency calling on the client system 130. As another example and not by way of limitation, another use case may be responding to a user input without network connectivity. As yet another example and not by way of limitation, another use case may be that particular domains/tasks may be privacy sensitive and may prohibit user inputs being sent to the remote server.

In particular embodiments, the local action selector 222a may call a local delivery system 230a for executing the actions, and the remote action selector 222b may call a remote delivery system 230b for executing the actions. The delivery system 230a/b may deliver a predefined event upon receiving triggering signals from the dialog state tracker 218a/b by executing corresponding actions. The delivery system 230a/b may ensure that events get delivered to a host with a living connection. As an example and not by way of limitation, the delivery system 230a/b may broadcast to all online devices that belong to one user. As another example and not by way of limitation, the delivery system 230a/b may deliver events to target-specific devices. The delivery system 230a/b may further render a payload using up-to-date device context.

In particular embodiments, the on-device dialog manager 216a may additionally comprise a separate local action execution module, and the remote dialog manager 216b may additionally comprise a separate remote action execution module. The local execution module and the remote action execution module may have similar functionality. In particular embodiments, the action execution module may call the agents 228a/b to execute tasks. The action execution module may additionally perform a set of general executable actions determined by the action selector 222a/b. The set of executable actions may interact with agents 228a/b, users, and the assistant system 140 itself via the delivery system 230a/b.

In particular embodiments, if the user input is handled using the first operational mode (i.e., on-device mode), results from the agents 228a and/or the delivery system 230a may be returned to the on-device dialog manager 216a. The on-device dialog manager 216a may then instruct a local arbitrator 226a to generate a final response based on these results. The arbitrator 226a may aggregate the results and evaluate them. As an example and not by way of limitation, the arbitrator 226a may rank and select a best result for responding to the user input. If the user request is handled in the second operational mode (i.e., cloud mode), the results from the agents 228*b* and/or the delivery system 230*b* may be returned to the remote dialog manager 216*b*. The remote dialog manager 216*b* may instruct, via the dialog manager proxy 224, the arbitrator 226*a* to generate the final response based on these results. Similarly, the arbitrator 226*a* may analyze the results and select the best result to provide to the user. If the user input is handled based on the third operational mode (i.e., blended mode), the client-side results and server-side results (e.g., from agents 228*a/b* and/or delivery system 230*a/b*) may both be provided to the arbitrator 226*a* by the on-device dialog manager 216*a* and remote dialog manager 216*b*, respectively. The arbitrator 226 may then choose between the client-side and server-side side results to determine the final result to be presented to the user. In particular embodiments, the logic to decide between these results may depend on the specific use-case.

In particular embodiments, the local arbitrator 226*a* may generate a response based on the final result and send it to a render output module 232. The render output module 232 may determine how to render the output in a way that is suitable for the client system 130. As an example and not by way of limitation, for a VR headset or AR smart glasses, the render output module 232 may determine to render the output using a visual-based modality (e.g., an image or a video clip) that may be displayed via the VR headset or AR smart glasses. As another example, the response may be rendered as audio signals that may be played by the user via a VR headset or AR smart glasses. As yet another example, the response may be rendered as augmented-reality data for enhancing user experience.

In particular embodiments, in addition to determining an operational mode to process the user input, the on-device orchestrator 206 may also determine whether to process the user input on the rendering device 137, process the user input on the companion device 138, or process the user request on the remote server. The rendering device 137 and/or the companion device 138 may each use the assistant stack in a similar manner as disclosed above to process the user input. As an example and not by, the on-device orchestrator 206 may determine that part of the processing should be done on the rendering device 137, part of the processing should be done on the companion device 138, and the remaining processing should be done on the remote server.

In particular embodiments, the assistant system 140 may have a variety of capabilities including audio cognition, visual cognition, signals intelligence, reasoning, and memories. In particular embodiments, the capability of audio cognition may enable the assistant system 140 to, for example, understand a user's input associated with various domains in different languages, understand and summarize a conversation, perform on-device audio cognition for complex commands, identify a user by voice, extract topics from a conversation and auto-tag sections of the conversation, enable audio interaction without a wake-word, filter and amplify user voice from ambient noise and conversations, and/or understand which client system 130 a user is talking to if multiple client systems 130 are in vicinity.

In particular embodiments, the capability of visual cognition may enable the assistant system 140 to, for example, perform face detection and tracking, recognize a user, recognize people of interest in major metropolitan areas at varying angles, recognize interesting objects in the world through a combination of existing machine-learning models and one-shot learning, recognize an interesting moment and auto-capture it, achieve semantic understanding over multiple visual frames across different episodes of time, provide platform support for additional capabilities in people, places, or objects recognition, recognize a full set of settings and micro-locations including personalized locations, recognize complex activities, recognize complex gestures to control a client system 130, handle images/videos from egocentric cameras (e.g., with motion, capture angles, resolution), accomplish similar levels of accuracy and speed regarding images with lower resolution, conduct one-shot registration and recognition of people, places, and objects, and/or perform visual recognition on a client system 130.

In particular embodiments, the assistant system 140 may leverage computer vision techniques to achieve visual cognition. Besides computer vision techniques, the assistant system 140 may explore options that may supplement these techniques to scale up the recognition of objects. In particular embodiments, the assistant system 140 may use supplemental signals such as, for example, optical character recognition (OCR) of an object's labels, GPS signals for places recognition, and/or signals from a user's client system 130 to identify the user. In particular embodiments, the assistant system 140 may perform general scene recognition (e.g., home, work, public spaces) to set a context for the user and reduce the computer-vision search space to identify likely objects or people. In particular embodiments, the assistant system 140 may guide users to train the assistant system 140. For example, crowdsourcing may be used to get users to tag objects and help the assistant system 140 recognize more objects over time. As another example, users may register their personal objects as part of an initial setup when using the assistant system 140. The assistant system 140 may further allow users to provide positive/negative signals for objects they interact with to train and improve personalized models for them.

In particular embodiments, the capability of signals intelligence may enable the assistant system 140 to, for example, determine user location, understand date/time, determine family locations, understand users' calendars and future desired locations, integrate richer sound understanding to identify setting/context through sound alone, and/or build signals intelligence models at runtime which may be personalized to a user's individual routines.

In particular embodiments, the capability of reasoning may enable the assistant system 140 to, for example, pick up previous conversation threads at any point in the future, synthesize all signals to understand micro and personalized context, learn interaction patterns and preferences from users' historical behavior and accurately suggest interactions that they may value, generate highly predictive proactive suggestions based on micro-context understanding, understand what content a user may want to see at what time of a day, and/or understand the changes in a scene and how that may impact the user's desired content.

In particular embodiments, the capabilities of memories may enable the assistant system 140 to, for example, remember which social connections a user previously called or interacted with, write into memory and query memory at will (i.e., open dictation and auto tags), extract richer preferences based on prior interactions and long-term learning, remember a user's life history, extract rich information from egocentric streams of data and auto catalog, and/or write to memory in structured form to form rich short, episodic and long-term memories.

Figure 3:
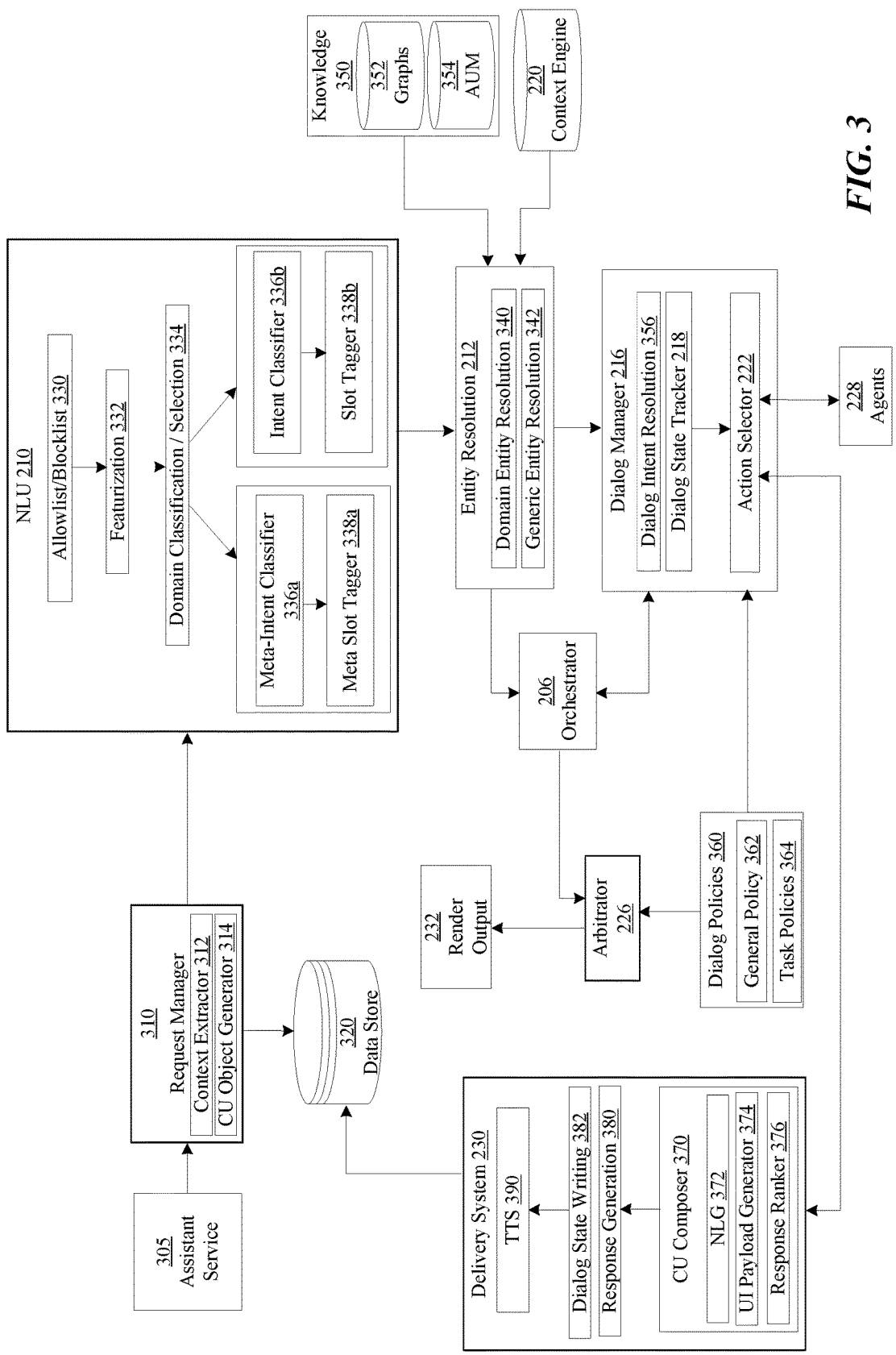
FIG. 3 illustrates an example flow diagram of the assistant system.

FIG. 3 illustrates an example flow diagram 300 of the assistant system 140. In particular embodiments, an assistant service module 305 may access a request manager 310 upon receiving a user input. In particular embodiments, the request manager 310 may comprise a context extractor 312 and a conversational understanding object generator (CU object generator) 314. The context extractor 312 may extract contextual information associated with the user input. The context extractor 312 may also update contextual information based on the assistant application 136 executing on the client system 130. As an example and not by way of limitation, the update of contextual information may comprise content items are displayed on the client system 130. As another example and not by way of limitation, the update of contextual information may comprise whether an alarm is set on the client system 130. As another example and not by way of limitation, the update of contextual information may comprise whether a song is playing on the client system 130. The CU object generator 314 may generate particular content objects relevant to the user input. The content objects may comprise dialog-session data and features associated with the user input, which may be shared with all the modules of the assistant system 140. In particular embodiments, the request manager 310 may store the contextual information and the generated content objects in a data store 320 which is a particular data store implemented in the assistant system 140.

In particular embodiments, the request manger 310 may send the generated content objects to the NLU module 210. The NLU module 210 may perform a plurality of steps to process the content objects. The NLU module 210 may first run the content objects through an allowlist/blocklist 330. In particular embodiments, the allowlist/blocklist 330 may comprise interpretation data matching the user input. The NLU module 210 may then perform a featurization 332 of the content objects. The NLU module 210 may then perform domain classification/selection 334 on user input based on the features resulted from the featurization 332 to classify the user input into predefined domains. In particular embodiments, a domain may denote a social context of interaction (e.g., education), or a namespace for a set of intents (e.g., music). The domain classification/selection results may be further processed based on two related procedures. In one procedure, the NLU module 210 may process the domain classification/selection results using a meta-intent classifier 336a. The meta-intent classifier 336a may determine categories that describe the user's intent. An intent may be an element in a pre-defined taxonomy of semantic intentions, which may indicate a purpose of a user interaction with the assistant system 140. The NLU module 210a may classify a user input into a member of the pre-defined taxonomy. For example, the user input may be "Play Beethoven's 5th," and the NLU module 210a may classify the input as having the intent [IN:play_music]. In particular embodiments, intents that are common to multiple domains may be processed by the meta-intent classifier 336a. As an example and not by way of limitation, the meta-intent classifier 336a may be based on a machine-learning model that may take the domain classification/selection results as input and calculate a probability of the input being associated with a particular predefined meta-intent. The NLU module 210 may then use a meta slot tagger 338a to annotate one or more meta slots for the classification result from the meta-intent classifier 336a. A slot may be a named sub-string corresponding to a character string within the user input representing a basic semantic entity. For example, a slot for "pizza" may be [SL:dish]. In particular embodiments, a set of valid or expected named slots may be conditioned on the classified intent. As an example and not by way of limitation, for the intent [IN:play_music], a valid slot may be [SL:song_name]. In particular embodiments, the meta slot tagger 338a may tag generic slots such as references to items (e.g., the first), the type of slot, the value of the slot, etc. In particular embodiments, the NLU module 210 may process the domain classification/selection results using an intent classifier 336b. The intent classifier 336b may determine the user's intent associated with the user input. In particular embodiments, there may be one intent classifier 336b for each domain to determine the most possible intents in a given domain. As an example and not by way of limitation, the intent classifier 336b may be based on a machine-learning model that may take the domain classification/selection results as input and calculate a probability of the input being associated with a particular predefined intent. The NLU module 210 may then use a slot tagger 338b to annotate one or more slots associated with the user input. In particular embodiments, the slot tagger 338b may annotate the one or more slots for the n-grams of the user input. As an example and not by way of limitation, a user input may comprise "change 500 dollars in my account to Japanese yen." The intent classifier 336b may take the user input as input and formulate it into a vector. The intent classifier 336b may then calculate probabilities of the user input being associated with different predefined intents based on a vector comparison between the vector representing the user input and the vectors representing different predefined intents. In a similar manner, the slot tagger 338b may take the user input as input and formulate each word into a vector. The intent classifier 336b may then calculate probabilities of each word being associated with different predefined slots based on a vector comparison between the vector representing the word and the vectors representing different predefined slots. The intent of the user may be classified as "changing money". The slots of the user input may comprise "500", "dollars", "account", and "Japanese yen". The meta-intent of the user may be classified as "financial service". The meta slot may comprise "finance".

In particular embodiments, the NLU module 210 may additionally extract information from one or more of a social graph, a knowledge graph, or a concept graph, and may retrieve a user's profile stored locally on the client system 130. The NLU module 210 may additionally consider contextual information when analyzing the user input. The NLU module 210 may further process information from these different sources by identifying and aggregating information, annotating n-grams of the user input, ranking the n-grams with confidence scores based on the aggregated information, and formulating the ranked n-grams into features that may be used by the NLU module 210 for understanding the user input. In particular embodiments, the NLU module 210 may identify one or more of a domain, an intent, or a slot from the user input in a personalized and context-aware manner. As an example and not by way of limitation, a user input may comprise "show me how to get to the coffee shop." The NLU module 210 may identify a particular coffee shop that the user wants to go to based on the user's personal information and the associated contextual information. In particular embodiments, the NLU module 210 may comprise a lexicon of a particular language, a parser, and grammar rules to partition sentences into an internal representation. The NLU module 210 may also comprise one or more programs that perform naive semantics or stochastic semantic analysis, and may further use pragmatics to understand a user input. In particular embodiments, the parser may be based on a deep learning architecture comprising multiple long-short term memory (LSTM) networks. As an example and not by way of limitation, the parser may be based on a recurrent neural network grammar (RNNG)

model, which is a type of recurrent and recursive LSTM algorithm. More information on natural-language understanding (NLU) may be found in U.S. patent application Ser. No. 16/011,062, filed 18 Jun. 2018, U.S. patent application Ser. No. 16/025,317, filed 2 Jul. 2018, and U.S. patent application Ser. No. 16/038,120, filed 17 Jul. 2018, each of which is incorporated by reference.

In particular embodiments, the output of the NLU module 210 may be sent to the entity resolution module 212 to resolve relevant entities. Entities may include, for example, unique users or concepts, each of which may have a unique identifier (ID). The entities may include one or more of a real-world entity (from general knowledge base), a user entity (from user memory), a contextual entity (device context/dialog context), or a value resolution (numbers, datetime, etc.). In particular embodiments, the entity resolution module 212 may comprise domain entity resolution 340 and generic entity resolution 342. The entity resolution module 212 may execute generic and domain-specific entity resolution. The generic entity resolution 342 may resolve the entities by categorizing the slots and meta slots into different generic topics. The domain entity resolution 340 may resolve the entities by categorizing the slots and meta slots into different domains. As an example and not by way of limitation, in response to the input of an inquiry of the advantages of a particular brand of electric car, the generic entity resolution 342 may resolve the referenced brand of electric car as vehicle and the domain entity resolution 340 may resolve the referenced brand of electric car as electric car.

In particular embodiments, entities may be resolved based on knowledge 350 about the world and the user. The assistant system 140 may extract ontology data from the graphs 352. As an example and not by way of limitation, the graphs 352 may comprise one or more of a knowledge graph, a social graph, or a concept graph. The ontology data may comprise the structural relationship between different slots/meta-slots and domains. The ontology data may also comprise information of how the slots/meta-slots may be grouped, related within a hierarchy where the higher level comprises the domain, and subdivided according to similarities and differences. For example, the knowledge graph may comprise a plurality of entities. Each entity may comprise a single record associated with one or more attribute values. The particular record may be associated with a unique entity identifier. Each record may have diverse values for an attribute of the entity. Each attribute value may be associated with a confidence probability and/or a semantic weight. A confidence probability for an attribute value represents a probability that the value is accurate for the given attribute. A semantic weight for an attribute value may represent how the value semantically appropriate for the given attribute considering all the available information. For example, the knowledge graph may comprise an entity of a book titled "BookName", which may include information extracted from multiple content sources (e.g., an online social network, online encyclopedias, book review sources, media databases, and entertainment content sources), which may be deduped, resolved, and fused to generate the single unique record for the knowledge graph. In this example, the entity titled "BookName" may be associated with a "fantasy" attribute value for a "genre" entity attribute. More information on the knowledge graph may be found in U.S. patent application Ser. No. 16/048,049, filed 27 Jul. 2018, and U.S. patent application Ser. No. 16/048,101, filed 27 Jul. 2018, each of which is incorporated by reference.

In particular embodiments, the assistant user memory (AUM) 354 may comprise user episodic memories which help determine how to assist a user more effectively. The AUM 354 may be the central place for storing, retrieving, indexing, and searching over user data. As an example and not by way of limitation, the AUM 354 may store information such as contacts, photos, reminders, etc. Additionally, the AUM 354 may automatically synchronize data to the server and other devices (only for non-sensitive data). As an example and not by way of limitation, if the user sets a nickname for a contact on one device, all devices may synchronize and get that nickname based on the AUM 354. In particular embodiments, the AUM 354 may first prepare events, user state, reminder, and trigger state for storing in a data store. Memory node identifiers (ID) may be created to store entry objects in the AUM 354, where an entry may be some piece of information about the user (e.g., photo, reminder, etc.) As an example and not by way of limitation, the first few bits of the memory node ID may indicate that this is a memory node ID type, the next bits may be the user ID, and the next bits may be the time of creation. The AUM 354 may then index these data for retrieval as needed. Index ID may be created for such purpose. In particular embodiments, given an "index key" (e.g., PHOTO_LOCATION) and "index value" (e.g., "San Francisco"), the AUM 354 may get a list of memory IDs that have that attribute (e.g., photos in San Francisco). As an example and not by way of limitation, the first few bits may indicate this is an index ID type, the next bits may be the user ID, and the next bits may encode an "index key" and "index value". The AUM 354 may further conduct information retrieval with a flexible query language. Relation index ID may be created for such purpose. In particular embodiments, given a source memory node and an edge type, the AUM 354 may get memory IDs of all target nodes with that type of outgoing edge from the source. As an example and not by way of limitation, the first few bits may indicate this is a relation index ID type, the next bits may be the user ID, and the next bits may be a source node ID and edge type. In particular embodiments, the AUM 354 may help detect concurrent updates of different events. More information on episodic memories may be found in U.S. patent application Ser. No. 16/552,559, filed 27 Aug. 2019, which is incorporated by reference.

In particular embodiments, the entity resolution module 212 may use different techniques to resolve different types of entities. For real-world entities, the entity resolution module 212 may use a knowledge graph to resolve the span to the entities, such as "music track", "movie", etc. For user entities, the entity resolution module 212 may use user memory or some agents to resolve the span to user-specific entities, such as "contact", "reminders", or "relationship". For contextual entities, the entity resolution module 212 may perform coreference based on information from the context engine 220 to resolve the references to entities in the context, such as "him", "her", "the first one", or "the last one". In particular embodiments, for coreference, the entity resolution module 212 may create references for entities determined by the NLU module 210. The entity resolution module 212 may then resolve these references accurately. As an example and not by way of limitation, a user input may comprise "find me the nearest grocery store and direct me there". Based on coreference, the entity resolution module 212 may interpret "there" as "the nearest grocery store". In particular embodiments, coreference may depend on the information from the context engine 220 and the dialog manager 216 so as to interpret references with improved accuracy. In particular embodiments, the entity resolution module 212 may additionally resolve an entity under the context (device context or dialog context), such as, for example, the entity shown on the screen or an entity from the last conversation history. For value resolutions, the entity resolution module 212 may resolve the mention to exact value in standardized form, such as numerical value, date time, address, etc.

In particular embodiments, the entity resolution module 212 may first perform a check on applicable privacy constraints in order to guarantee that performing entity resolution does not violate any applicable privacy policies. As an example and not by way of limitation, an entity to be resolved may be another user who specifies in their privacy settings that their identity should not be searchable on the online social network. In this case, the entity resolution module 212 may refrain from returning that user's entity identifier in response to a user input. By utilizing the described information obtained from the social graph, the knowledge graph, the concept graph, and the user profile, and by complying with any applicable privacy policies, the entity resolution module 212 may resolve entities associated with a user input in a personalized, context-aware, and privacy-protected manner.

In particular embodiments, the entity resolution module 212 may work with the ASR module 208 to perform entity resolution. The following example illustrates how the entity resolution module 212 may resolve an entity name. The entity resolution module 212 may first expand names associated with a user into their respective normalized text forms as phonetic consonant representations which may be phonetically transcribed using a double metaphone algorithm. The entity resolution module 212 may then determine an n-best set of candidate transcriptions and perform a parallel comprehension process on all of the phonetic transcriptions in the n-best set of candidate transcriptions. In particular embodiments, each transcription that resolves to the same intent may then be collapsed into a single intent. Each intent may then be assigned a score corresponding to the highest scoring candidate transcription for that intent. During the collapse, the entity resolution module 212 may identify various possible text transcriptions associated with each slot, correlated by boundary timing offsets associated with the slot's transcription. The entity resolution module 212 may then extract a subset of possible candidate transcriptions for each slot from a plurality (e.g., 1000) of candidate transcriptions, regardless of whether they are classified to the same intent. In this manner, the slots and intents may be scored lists of phrases. In particular embodiments, a new or running task capable of handling the intent may be identified and provided with the intent (e.g., a message composition task for an intent to send a message to another user). The identified task may then trigger the entity resolution module 212 by providing it with the scored lists of phrases associated with one of its slots and the categories against which it should be resolved. As an example and not by way of limitation, if an entity attribute is specified as "friend," the entity resolution module 212 may run every candidate list of terms through the same expansion that may be run at matcher compilation time. Each candidate expansion of the terms may be matched in the precompiled trie matching structure. Matches may be scored using a function based at least in part on the transcribed input, matched form, and friend name. As another example and not by way of limitation, if an entity attribute is specified as "celebrity/notable person," the entity resolution module 212 may perform parallel searches against the knowledge graph for each candidate set of terms for the slot output from the ASR module 208. The entity resolution module 212 may score matches based on matched person popularity and ASR-provided score signal. In particular embodiments, when the memory category is specified, the entity resolution module 212 may perform the same search against user memory. The entity resolution module 212 may crawl backward through user memory and attempt to match each memory (e.g., person recently mentioned in conversation, or seen and recognized via visual signals, etc.). For each entity, the entity resolution module 212 may employ matching similarly to how friends are matched (i.e., phonetic). In particular embodiments, scoring may comprise a temporal decay factor associated with a recency with which the name was previously mentioned. The entity resolution module 212 may further combine, sort, and dedupe all matches. In particular embodiments, the task may receive the set of candidates. When multiple high scoring candidates are present, the entity resolution module 212 may perform user-facilitated disambiguation (e.g., getting real-time user feedback from users on these candidates).

In particular embodiments, the context engine 220 may help the entity resolution module 212 improve entity resolution. The context engine 220 may comprise offline aggregators and an online inference service. The offline aggregators may process a plurality of data associated with the user that are collected from a prior time window. As an example and not by way of limitation, the data may include news feed posts/comments, interactions with news feed posts/comments, search history, etc., that are collected during a predetermined timeframe (e.g., from a prior 90-day window). The processing result may be stored in the context engine 220 as part of the user profile. The user profile of the user may comprise user profile data including demographic information, social information, and contextual information associated with the user. The user profile data may also include user interests and preferences on a plurality of topics, aggregated through conversations on news feed, search logs, messaging platforms, etc. The usage of a user profile may be subject to privacy constraints to ensure that a user's information can be used only for his/her benefit, and not shared with anyone else. More information on user profiles may be found in U.S. patent application Ser. No. 15/967,239, filed 30 Apr. 2018, which is incorporated by reference. In particular embodiments, the online inference service may analyze the conversational data associated with the user that are received by the assistant system 140 at a current time. The analysis result may be stored in the context engine 220 also as part of the user profile. In particular embodiments, both the offline aggregators and online inference service may extract personalization features from the plurality of data. The extracted personalization features may be used by other modules of the assistant system 140 to better understand user input. In particular embodiments, the entity resolution module 212 may process the information from the context engine 220 (e.g., a user profile) in the following steps based on natural-language processing (NLP). In particular embodiments, the entity resolution module 212 may tokenize text by text normalization, extract syntax features from text, and extract semantic features from text based on NLP. The entity resolution module 212 may additionally extract features from contextual information, which is accessed from dialog history between a user and the assistant system 140. The entity resolution module 212 may further conduct global word embedding, domain-specific embedding, and/or dynamic embedding based on the contextual information. The processing result may be annotated with entities by an entity tagger. Based on the annotations, the entity resolution module 212 may generate dictionaries. In particular embodiments, the dictionaries may comprise global dictionary features which can be updated dynamically offline. The entity resolution module 212 may rank the entities tagged by the entity tagger. In particular embodiments, the entity resolution module 212 may communicate with different graphs 352 including one or more of the social graph, the knowledge graph, or the concept graph to extract ontology data that is relevant to the retrieved information from the context engine 220. In particular embodiments, the entity resolution module 212 may further resolve entities based on the user profile, the ranked entities, and the information from the graphs 352.

In particular embodiments, the entity resolution module 212 may be driven by the task (corresponding to an agent 228). This inversion of processing order may make it possible for domain knowledge present in a task to be applied to pre-filter or bias the set of resolution targets when it is obvious and appropriate to do so. As an example and not by way of limitation, for the utterance "who is John?" no clear category is implied in the utterance. Therefore, the entity resolution module 212 may resolve "John" against everything. As another example and not by way of limitation, for the utterance "send a message to John", the entity resolution module 212 may easily determine "John" refers to a person that one can message. As a result, the entity resolution module 212 may bias the resolution to a friend. As another example and not by way of limitation, for the utterance "what is John's most famous album?" To resolve "John", the entity resolution module 212 may first determine the task corresponding to the utterance, which is finding a music album. The entity resolution module 212 may determine that entities related to music albums include singers, producers, and recording studios. Therefore, the entity resolution module 212 may search among these types of entities in a music domain to resolve "John."

In particular embodiments, the output of the entity resolution module 212 may be sent to the dialog manager 216 to advance the flow of the conversation with the user. The dialog manager 216 may be an asynchronous state machine that repeatedly updates the state and selects actions based on the new state. The dialog manager 216 may additionally store previous conversations between the user and the assistant system 140. In particular embodiments, the dialog manager 216 may conduct dialog optimization. Dialog optimization relates to the challenge of understanding and identifying the most likely branching options in a dialog with a user. As an example and not by way of limitation, the assistant system 140 may implement dialog optimization techniques to obviate the need to confirm who a user wants to call because the assistant system 140 may determine a high confidence that a person inferred based on context and available data is the intended recipient. In particular embodiments, the dialog manager 216 may implement reinforcement learning frameworks to improve the dialog optimization. The dialog manager 216 may comprise dialog intent resolution 356, the dialog state tracker 218, and the action selector 222. In particular embodiments, the dialog manager 216 may execute the selected actions and then call the dialog state tracker 218 again until the action selected requires a user response, or there are no more actions to execute. Each action selected may depend on the execution result from previous actions. In particular embodiments, the dialog intent resolution 356 may resolve the user intent associated with the current dialog session based on dialog history between the user and the assistant system 140. The dialog intent resolution 356 may map intents determined by the NLU module 210 to different dialog intents. The dialog intent resolution 356 may further rank dialog intents based on signals from the NLU module 210, the entity resolution module 212, and dialog history between the user and the assistant system 140.

In particular embodiments, the dialog state tracker 218 may use a set of operators to track the dialog state. The operators may comprise necessary data and logic to update the dialog state. Each operator may act as delta of the dialog state after processing an incoming user input. In particular embodiments, the dialog state tracker 218 may a comprise a task tracker, which may be based on task specifications and different rules. The dialog state tracker 218 may also comprise a slot tracker and coreference component, which may be rule based and/or recency based. The coreference component may help the entity resolution module 212 to resolve entities. In alternative embodiments, with the coreference component, the dialog state tracker 218 may replace the entity resolution module 212 and may resolve any references/mentions and keep track of the state. In particular embodiments, the dialog state tracker 218 may convert the upstream results into candidate tasks using task specifications and resolve arguments with entity resolution. Both user state (e.g., user's current activity) and task state (e.g., triggering conditions) may be tracked. Given the current state, the dialog state tracker 218 may generate candidate tasks the assistant system 140 may process and perform for the user. As an example and not by way of limitation, candidate tasks may include "show suggestion," "get weather information," or "take photo." In particular embodiments, the dialog state tracker 218 may generate candidate tasks based on available data from, for example, a knowledge graph, a user memory, and a user task history. In particular embodiments, the dialog state tracker 218 may then resolve the triggers object using the resolved arguments. As an example and not by way of limitation, a user input "remind me to call mom when she's online and I'm home tonight" may perform the conversion from the NLU output to the triggers representation by the dialog state tracker 218 as illustrated in Table 1 below:

TABLE 1

Example Conversion from NLU Output to Triggers Representation

| NLU Ontology Representation: | Triggers Representation: |
|---|---|
| [IN:CREATE_SMART_REMINDER Remind me to   [SL:TODO call mom] when   [SL:TRIGGER_CONJUNCTION     [IN:GET_TRIGGER       [SL:TRIGGER_SOCIAL_UPDATE       she's online] and I'm | ➔ Triggers: {   andTriggers: [     condition: {ContextualEvent(mom is online)},     condition: {ContextualEvent(location is home)},     condition: {ContextualEvent(time is |

TABLE 1-continued

Example Conversion from NLU Output to Triggers Representation

| NLU Ontology Representation: | Triggers Representation: |
|---|---|
|     [SL:TRIGGER_LOCATION home]<br>    [SL:DATE_TIME tonight]<br>  ]<br> ]<br>] | tonight)}])]} |

In the above example, "mom," "home," and "tonight" are represented by their respective entities: personEntity, locationEntity, datetimeEntity.

In particular embodiments, the dialog manager 216 may map events determined by the context engine 220 to actions. As an example and not by way of limitation, an action may be a natural-language generation (NLG) action, a display or overlay, a device action, or a retrieval action. The dialog manager 216 may also perform context tracking and interaction management. Context tracking may comprise aggregating real-time stream of events into a unified user state. Interaction management may comprise selecting optimal action in each state. In particular embodiments, the dialog state tracker 218 may perform context tracking (i.e., tracking events related to the user). To support processing of event streams, the dialog state tracker 218a may use an event handler (e.g., for disambiguation, confirmation, request) that may consume various types of events and update an internal assistant state. Each event type may have one or more handlers. Each event handler may be modifying a certain slice of the assistant state. In particular embodiments, the event handlers may be operating on disjoint subsets of the state (i.e., only one handler may have write-access to a particular field in the state). In particular embodiments, all event handlers may have an opportunity to process a given event. As an example and not by way of limitation, the dialog state tracker 218 may run all event handlers in parallel on every event, and then may merge the state updates proposed by each event handler (e.g., for each event, most handlers may return a NULL update).

In particular embodiments, the dialog state tracker 218 may work as any programmatic handler (logic) that requires versioning. In particular embodiments, instead of directly altering the dialog state, the dialog state tracker 218 may be a side-effect free component and generate n-best candidates of dialog state update operators that propose updates to the dialog state. The dialog state tracker 218 may comprise intent resolvers containing logic to handle different types of NLU intent based on the dialog state and generate the operators. In particular embodiments, the logic may be organized by intent handler, such as a disambiguation intent handler to handle the intents when the assistant system 140 asks for disambiguation, a confirmation intent handler that comprises the logic to handle confirmations, etc. Intent resolvers may combine the turn intent together with the dialog state to generate the contextual updates for a conversation with the user. A slot resolution component may then recursively resolve the slots in the update operators with resolution providers including the knowledge graph and domain agents. In particular embodiments, the dialog state tracker 218 may update/rank the dialog state of the current dialog session. As an example and not by way of limitation, the dialog state tracker 218 may update the dialog state as "completed" if the dialog session is over. As another example and not by way of limitation, the dialog state tracker 218 may rank the dialog state based on a priority associated with it.

In particular embodiments, the dialog state tracker 218 may communicate with the action selector 222 about the dialog intents and associated content objects. In particular embodiments, the action selector 222 may rank different dialog hypotheses for different dialog intents. The action selector 222 may take candidate operators of dialog state and consult the dialog policies 360 to decide what actions should be executed. In particular embodiments, a dialog policy 360 may a tree-based policy, which is a pre-constructed dialog plan. Based on the current dialog state, a dialog policy 360 may choose a node to execute and generate the corresponding actions. As an example and not by way of limitation, the tree-based policy may comprise topic grouping nodes and dialog action (leaf) nodes. In particular embodiments, a dialog policy 360 may also comprise a data structure that describes an execution plan of an action by an agent 228. A dialog policy 360 may further comprise multiple goals related to each other through logical operators. In particular embodiments, a goal may be an outcome of a portion of the dialog policy and it may be constructed by the dialog manager 216. A goal may be represented by an identifier (e.g., string) with one or more named arguments, which parameterize the goal. As an example and not by way of limitation, a goal with its associated goal argument may be represented as {confirm artist, args:{artist: "Madonna"}}. In particular embodiments, goals may be mapped to leaves of the tree of the tree-structured representation of the dialog policy 360.

In particular embodiments, the assistant system 140 may use hierarchical dialog policies 360 with general policy 362 handling the cross-domain business logic and task policies 364 handling the task/domain specific logic. The general policy 362 may be used for actions that are not specific to individual tasks. The general policy 362 may be used to determine task stacking and switching, proactive tasks, notifications, etc. The general policy 362 may comprise handling low-confidence intents, internal errors, unacceptable user response with retries, and/or skipping or inserting confirmation based on ASR or NLU confidence scores. The general policy 362 may also comprise the logic of ranking dialog state update candidates from the dialog state tracker 218 output and pick the one to update (such as picking the top ranked task intent). In particular embodiments, the assistant system 140 may have a particular interface for the general policy 362, which allows for consolidating scattered cross-domain policy/business-rules, especial those found in the dialog state tracker 218, into a function of the action selector 222. The interface for the general policy 362 may also allow for authoring of self-contained sub-policy units that may be tied to specific situations or clients (e.g., policy functions that may be easily switched on or off based on clients, situation). The interface for the general policy 362 may also allow for providing a layering of policies with back-off, i.e., multiple policy units, with highly specialized policy units that deal with specific situations being backed up by more general policies 362 that apply in wider circumstances. In this context the general policy 362 may alternatively comprise intent or task specific policy.

In particular embodiments, a task policy 364 may comprise the logic for action selector 222 based on the task and current state. The task policy 364 may be dynamic and ad-hoc. In particular embodiments, the types of task policies 364 may include one or more of the following types: (1) manually crafted tree-based dialog plans; (2) coded policy that directly implements the interface for generating actions; (3) configurator-specified slot-filling tasks; or (4) machine-learning model based policy learned from data. In particular embodiments, the assistant system 140 may bootstrap new domains with rule-based logic and later refine the task policies 364 with machine-learning models. In particular embodiments, the general policy 362 may pick one operator from the candidate operators to update the dialog state, followed by the selection of a user facing action by a task policy 364. Once a task is active in the dialog state, the corresponding task policy 364 may be consulted to select right actions.

In particular embodiments, the action selector 222 may select an action based on one or more of the event determined by the context engine 220, the dialog intent and state, the associated content objects, and the guidance from dialog policies 360. Each dialog policy 360 may be subscribed to specific conditions over the fields of the state. After an event is processed and the state is updated, the action selector 222 may run a fast search algorithm (e.g., similarly to the Boolean satisfiability) to identify which policies should be triggered based on the current state. In particular embodiments, if multiple policies are triggered, the action selector 222 may use a tie-breaking mechanism to pick a particular policy. Alternatively, the action selector 222 may use a more sophisticated approach which may dry-run each policy and then pick a particular policy which may be determined to have a high likelihood of success. In particular embodiments, mapping events to actions may result in several technical advantages for the assistant system 140. One technical advantage may include that each event may be a state update from the user or the user's physical/digital environment, which may or may not trigger an action from assistant system 140. Another technical advantage may include possibilities to handle rapid bursts of events (e.g., user enters a new building and sees many people) by first consuming all events to update state, and then triggering action(s) from the final state. Another technical advantage may include consuming all events into a single global assistant state.

In particular embodiments, the action selector 222 may take the dialog state update operators as part of the input to select the dialog action. The execution of the dialog action may generate a set of expectations to instruct the dialog state tracker 218 to handle future turns. In particular embodiments, an expectation may be used to provide context to the dialog state tracker 218 when handling the user input from next turn. As an example and not by way of limitation, slot request dialog action may have the expectation of proving a value for the requested slot. In particular embodiments, both the dialog state tracker 218 and the action selector 222 may not change the dialog state until the selected action is executed. This may allow the assistant system 140 to execute the dialog state tracker 218 and the action selector 222 for processing speculative ASR results and to do n-best ranking with dry runs.

In particular embodiments, the action selector 222 may call different agents 228 for task execution. Meanwhile, the dialog manager 216 may receive an instruction to update the dialog state. As an example and not by way of limitation, the update may comprise awaiting agents' 228 response. An agent 228 may select among registered content providers to complete the action. The data structure may be constructed by the dialog manager 216 based on an intent and one or more slots associated with the intent. In particular embodiments, the agents 228 may comprise first-party agents and third-party agents. In particular embodiments, first-party agents may comprise internal agents that are accessible and controllable by the assistant system 140 (e.g. agents associated with services provided by the online social network, such as messaging services or photo-share services). In particular embodiments, third-party agents may comprise external agents that the assistant system 140 has no control over (e.g., third-party online music application agents, ticket sales agents). The first-party agents may be associated with first-party providers that provide content objects and/or services hosted by the social-networking system 160. The third-party agents may be associated with third-party providers that provide content objects and/or services hosted by the third-party system 170. In particular embodiments, each of the first-party agents or third-party agents may be designated for a particular domain. As an example and not by way of limitation, the domain may comprise weather, transportation, music, shopping, social, videos, photos, events, locations, and/or work. In particular embodiments, the assistant system 140 may use a plurality of agents 228 collaboratively to respond to a user input. As an example and not by way of limitation, the user input may comprise "direct me to my next meeting." The assistant system 140 may use a calendar agent to retrieve the location of the next meeting. The assistant system 140 may then use a navigation agent to direct the user to the next meeting.

In particular embodiments, the dialog manager 216 may support multi-turn compositional resolution of slot mentions. For a compositional parse from the NLU module 210, the resolver may recursively resolve the nested slots. The dialog manager 216 may additionally support disambiguation for the nested slots. As an example and not by way of limitation, the user input may be "remind me to call Alex". The resolver may need to know which Alex to call before creating an actionable reminder to-do entity. The resolver may halt the resolution and set the resolution state when further user clarification is necessary for a particular slot. The general policy 362 may examine the resolution state and create corresponding dialog action for user clarification. In dialog state tracker 218, based on the user input and the last dialog action, the dialog manager 216 may update the nested slot. This capability may allow the assistant system 140 to interact with the user not only to collect missing slot values but also to reduce ambiguity of more complex/ambiguous utterances to complete the task. In particular embodiments, the dialog manager 216 may further support requesting missing slots in a nested intent and multi-intent user inputs (e.g., "take this photo and send it to Dad"). In particular embodiments, the dialog manager 216 may support machine-learning models for more robust dialog experience. As an example and not by way of limitation, the dialog state tracker 218 may use neural network based models (or any other suitable machine-learning models) to model belief over task hypotheses. As another example and not by way of limitation, for action selector 222, highest priority policy units may comprise white-list/black-list overrides, which may have to occur by design; middle priority units may comprise machine-learning models designed for action selection; and lower priority units may comprise rule-based fallbacks when the machine-learning models elect not to handle a situation. In particular embodiments, machine-learning model based general policy unit may help the assistant system 140 reduce redundant disambiguation or confirmation steps, thereby reducing the number of turns to execute the user input.

In particular embodiments, the determined actions by the action selector 222 may be sent to the delivery system 230. The delivery system 230 may comprise a CU composer 370, a response generation component 380, a dialog state writing component 382, and a text-to-speech (TTS) component 390. Specifically, the output of the action selector 222 may be received at the CU composer 370. In particular embodiments, the output from the action selector 222 may be formulated as a <k,c,u,d> tuple, in which k indicates a knowledge source, c indicates a communicative goal, u indicates a user model, and d indicates a discourse model.

In particular embodiments, the CU composer 370 may generate a communication content for the user using a natural-language generation (NLG) component 372. In particular embodiments, the NLG component 372 may use different language models and/or language templates to generate natural-language outputs. The generation of natural-language outputs may be application specific. The generation of natural-language outputs may be also personalized for each user. In particular embodiments, the NLG component 372 may comprise a content determination component, a sentence planner, and a surface realization component. The content determination component may determine the communication content based on the knowledge source, communicative goal, and the user's expectations. As an example and not by way of limitation, the determining may be based on a description logic. The description logic may comprise, for example, three fundamental notions which are individuals (representing objects in the domain), concepts (describing sets of individuals), and roles (representing binary relations between individuals or concepts). The description logic may be characterized by a set of constructors that allow the natural-language generator to build complex concepts/roles from atomic ones. In particular embodiments, the content determination component may perform the following tasks to determine the communication content. The first task may comprise a translation task, in which the input to the NLG component 372 may be translated to concepts. The second task may comprise a selection task, in which relevant concepts may be selected among those resulted from the translation task based on the user model. The third task may comprise a verification task, in which the coherence of the selected concepts may be verified. The fourth task may comprise an instantiation task, in which the verified concepts may be instantiated as an executable file that can be processed by the NLG component 372. The sentence planner may determine the organization of the communication content to make it human understandable. The surface realization component may determine specific words to use, the sequence of the sentences, and the style of the communication content.

In particular embodiments, the CU composer 370 may also determine a modality of the generated communication content using the UI payload generator 374. Since the generated communication content may be considered as a response to the user input, the CU composer 370 may additionally rank the generated communication content using a response ranker 376. As an example and not by way of limitation, the ranking may indicate the priority of the response. In particular embodiments, the CU composer 370 may comprise a natural-language synthesis (NLS) component that may be separate from the NLG component 372. The NLS component may specify attributes of the synthesized speech generated by the CU composer 370, including gender, volume, pace, style, or register, in order to customize the response for a particular user, task, or agent. The NLS component may tune language synthesis without engaging the implementation of associated tasks. In particular embodiments, the CU composer 370 may check privacy constraints associated with the user to make sure the generation of the communication content follows the privacy policies. More information on customizing natural-language generation (NLG) may be found in U.S. patent application Ser. No. 15/967,279, filed 30 Apr. 2018, and U.S. patent application Ser. No. 15/966,455, filed 30 Apr. 2018, which is incorporated by reference.

In particular embodiments, the delivery system 230 may perform different tasks based on the output of the CU composer 370. These tasks may include writing (i.e., storing/updating) the dialog state into the data store 330 using the dialog state writing component 382 and generating responses using the response generation component 380. In particular embodiments, the output of the CU composer 370 may be additionally sent to the TTS component 390 if the determined modality of the communication content is audio. In particular embodiments, the output from the delivery system 230 comprising one or more of the generated responses, the communication content, or the speech generated by the TTS component 390 may be then sent back to the dialog manager 216.

In particular embodiments, the orchestrator 206 may determine, based on the output of the entity resolution module 212, whether to processing a user input on the client system 130 or on the server, or in the third operational mode (i.e., blended mode) using both. Besides determining how to process the user input, the orchestrator 206 may receive the results from the agents 228 and/or the results from the delivery system 230 provided by the dialog manager 216. The orchestrator 206 may then forward these results to the arbitrator 226. The arbitrator 226 may aggregate these results, analyze them, select the best result, and provide the selected result to the render output module 232. In particular embodiments, the arbitrator 226 may consult with dialog policies 360 to obtain the guidance when analyzing these results. In particular embodiments, the render output module 232 may generate a response that is suitable for the client system 130.

Figure 4:
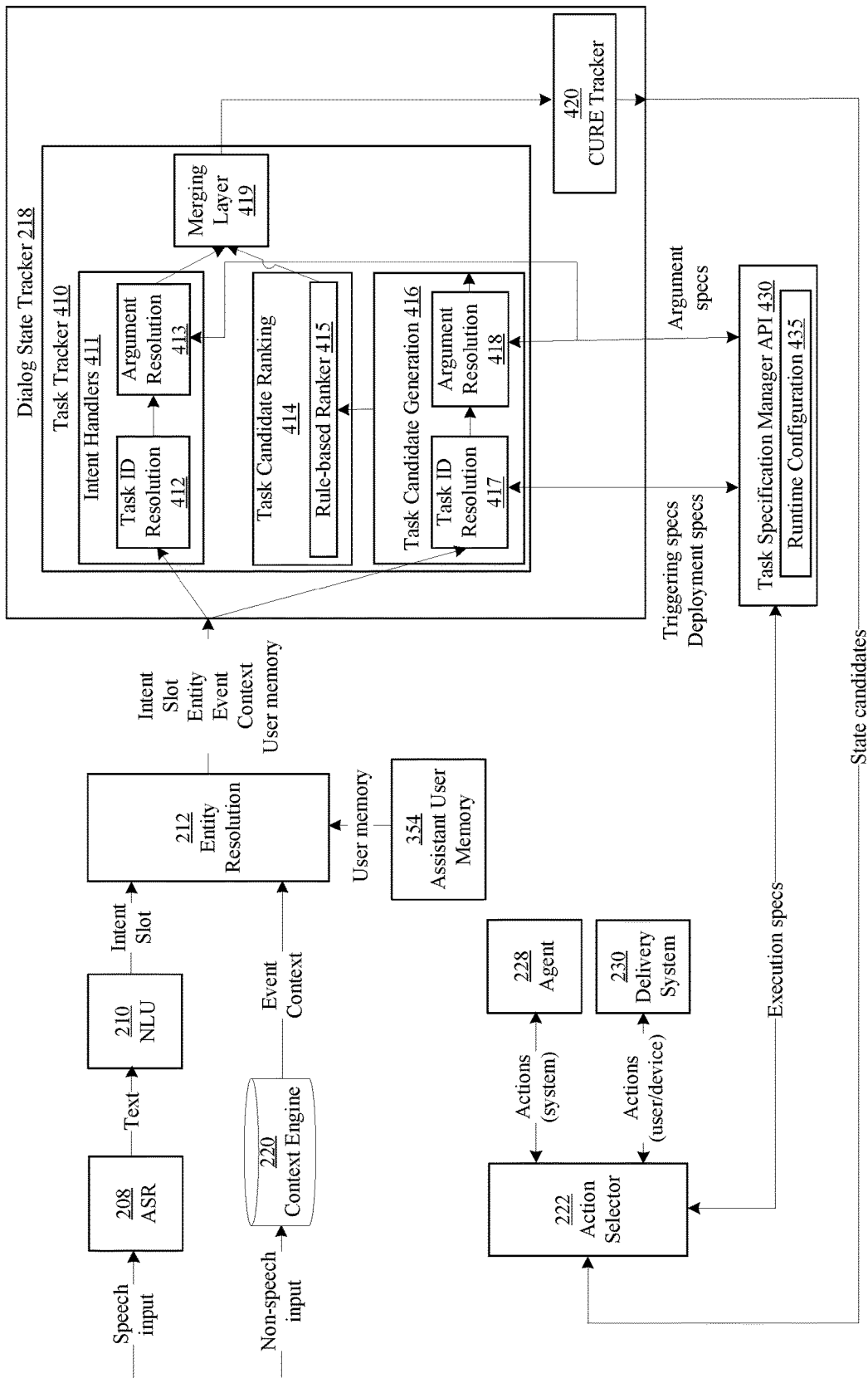
FIG. 4 illustrates an example task-centric flow diagram of processing a user input.

FIG. 4 illustrates an example task-centric flow diagram 400 of processing a user input. In particular embodiments, the assistant system 140 may assist users not only with voice-initiated experiences but also more proactive, multimodal experiences that are initiated on understanding user context. In particular embodiments, the assistant system 140 may rely on assistant tasks for such purpose. An assistant task may be a central concept that is shared across the whole assistant stack to understand user intention, interact with the user and the world to complete the right task for the user. In particular embodiments, an assistant task may be the primitive unit of assistant capability. It may comprise data fetching, updating some state, executing some command, or complex tasks composed of a smaller set of tasks. Completing a task correctly and successfully to deliver the value to the user may be the goal that the assistant system 140 is optimized for. In particular embodiments, an assistant task may be defined as a capability or a feature. The assistant task may be shared across multiple product surfaces if they have exactly the same requirements so it may be easily tracked. It may also be passed from device to device, and easily picked up mid-task by another device since the primitive unit is consistent. In addition, the consistent format of the assistant task may allow developers working on different modules in the assistant stack to more easily design around it. Furthermore, it may allow for task sharing. As an example and not by way of limitation, if a user is listening to music on smart glasses, the user may say "play this music on my phone." In the event that the phone hasn't been woken or has a task to execute, the smart glasses may formulate a task that is provided to the phone, which may then be executed by the phone to start playing music. In particular embodiments, the assistant task may be retained by each surface separately if they have different expected behaviors. In particular embodiments, the assistant system 140 may identify the right task based on user inputs in different modality or other signals, conduct conversation to collect all necessary information, and complete that task with action selector 222 implemented internally or externally, on server or locally product surfaces. In particular embodiments, the assistant stack may comprise a set of processing components from wake-up, recognizing user inputs, understanding user intention, reasoning about the tasks, fulfilling a task to generate natural-language response with voices.

In particular embodiments, the user input may comprise speech input. The speech input may be received at the ASR module 208 for extracting the text transcription from the speech input. The ASR module 208 may use statistical models to determine the most likely sequences of words that correspond to a given portion of speech received by the assistant system 140 as audio input. The models may include one or more of hidden Markov models, neural networks, deep learning models, or any combination thereof. The received audio input may be encoded into digital data at a particular sampling rate (e.g., 16, 44.1, or 96 kHz) and with a particular number of bits representing each sample (e.g., 8, 16, of 24 bits).

In particular embodiments, the ASR module 208 may comprise one or more of a grapheme-to-phoneme (G2P) model, a pronunciation learning model, a personalized acoustic model, a personalized language model (PLM), or an end-pointing model. In particular embodiments, the grapheme-to-phoneme (G2P) model may be used to determine a user's grapheme-to-phoneme style (i.e., what it may sound like when a particular user speaks a particular word). In particular embodiments, the personalized acoustic model may be a model of the relationship between audio signals and the sounds of phonetic units in the language. Therefore, such personalized acoustic model may identify how a user's voice sounds. The personalized acoustical model may be generated using training data such as training speech received as audio input and the corresponding phonetic units that correspond to the speech. The personalized acoustical model may be trained or refined using the voice of a particular user to recognize that user's speech. In particular embodiments, the personalized language model may then determine the most likely phrase that corresponds to the identified phonetic units for a particular audio input. The personalized language model may be a model of the probabilities that various word sequences may occur in the language. The sounds of the phonetic units in the audio input may be matched with word sequences using the personalized language model, and greater weights may be assigned to the word sequences that are more likely to be phrases in the language. The word sequence having the highest weight may be then selected as the text that corresponds to the audio input. In particular embodiments, the personalized language model may also be used to predict what words a user is most likely to say given a context. In particular embodiments, the end-pointing model may detect when the end of an utterance is reached. In particular embodiments, based at least in part on a limited computing power of the client system 130, the assistant system 140 may optimize the personalized language model at runtime during the client-side process. As an example and not by way of limitation, the assistant system 140 may pre-compute a plurality of personalized language models for a plurality of possible subjects a user may talk about. When a user input is associated with a request for assistance, the assistant system 140 may promptly switch between and locally optimize the pre-computed language models at runtime based on user activities. As a result, the assistant system 140 may preserve computational resources while efficiently identifying a subject matter associated with the user input. In particular embodiments, the assistant system 140 may also dynamically re-learn user pronunciations at runtime.

In particular embodiments, the user input may comprise non-speech input. The non-speech input may be received at the context engine 220 for determining events and context from the non-speech input. The context engine 220 may determine multi-modal events comprising voice/text intents, location updates, visual events, touch, gaze, gestures, activities, device/application events, and/or any other suitable type of events. The voice/text intents may depend on the ASR module 208 and the NLU module 210. The location updates may be consumed by the dialog manager 216 to support various proactive/reactive scenarios. The visual events may be based on person or object appearing in the user's field of view. These events may be consumed by the dialog manager 216 and recorded in transient user state to support visual co-reference (e.g., resolving "that" in "how much is that shirt?" and resolving "him" in "send him my contact"). The gaze, gesture, and activity may result in flags being set in the transient user state (e.g., user is running) which may condition the action selector 222. For the device/application events, if an application makes an update to the device state, this may be published to the assistant system 140 so that the dialog manager 216 may use this context (what is currently displayed to the user) to handle reactive and proactive scenarios. As an example and not by way of limitation, the context engine 220 may cause a push notification message to be displayed on a display screen of the user's client system 130. The user may interact with the push notification message, which may initiate a multi-modal event (e.g., an event workflow for replying to a message received from another user). Other example multi-modal events may include seeing a friend, seeing a landmark, being at home, running, faces being recognized in a photo, starting a call with touch, taking a photo with touch, opening an application, etc. In particular embodiments, the context engine 220 may also determine world/social events based on world/social updates (e.g., weather changes, a friend getting online). The social updates may comprise events that a user is subscribed to, (e.g., friend's birthday, posts, comments, other notifications). These updates may be consumed by the dialog manager 216 to trigger proactive actions based on context (e.g., suggesting a user call a friend on their birthday, but only if the user is not focused on something else). As an example and not by way of limitation, receiving a message may be a social event, which may trigger the task of reading the message to the user.

In particular embodiments, the text transcription from the ASR module 208 may be sent to the NLU module 210. The NLU module 210 may process the text transcription and extract the user intention (i.e., intents) and parse the slots or parsing result based on the linguistic ontology. In particular embodiments, the intents and slots from the NLU module 210 and/or the events and contexts from the context engine 220 may be sent to the entity resolution module 212. In particular embodiments, the entity resolution module 212 may resolve entities associated with the user input based on the output from the NLU module 210 and/or the context engine 220. The entity resolution module 212 may use different techniques to resolve the entities, including accessing user memory from the assistant user memory (AUM) 354. In particular embodiments, the AUM 354 may comprise user episodic memories helpful for resolving the entities by the entity resolution module 212. The AUM 354 may be the central place for storing, retrieving, indexing, and searching over user data.

In particular embodiments, the entity resolution module 212 may provide one or more of the intents, slots, entities, events, context, or user memory to the dialog state tracker 218. The dialog state tracker 218 may identify a set of state candidates for a task accordingly, conduct interaction with the user to collect necessary information to fill the state, and call the action selector 222 to fulfill the task. In particular embodiments, the dialog state tracker 218 may comprise a task tracker 410. The task tracker 410 may track the task state associated with an assistant task. In particular embodiments, a task state may be a data structure persistent cross interaction turns and updates in real time to capture the state of the task during the whole interaction. The task state may comprise all the current information about a task execution status, such as arguments, confirmation status, confidence score, etc. Any incorrect or outdated information in the task state may lead to failure or incorrect task execution. The task state may also serve as a set of contextual information for many other components such as the ASR module 208, the NLU module 210, etc.

In particular embodiments, the task tracker 410 may comprise intent handlers 411, task candidate ranking module 414, task candidate generation module 416, and merging layer 419. In particular embodiments, a task may be identified by its ID name. The task ID may be used to associate corresponding component assets if it is not explicitly set in the task specification, such as dialog policy 360, agent execution, NLG dialog act, etc. Therefore, the output from the entity resolution module 212 may be received by a task ID resolution component 417 of the task candidate generation module 416 to resolve the task ID of the corresponding task. In particular embodiments, the task ID resolution component 417 may call a task specification manager API 430 to access the triggering specifications and deployment specifications for resolving the task ID. Given these specifications, the task ID resolution component 417 may resolve the task ID using intents, slots, dialog state, context, and user memory.

In particular embodiments, the technical specification of a task may be defined by a task specification. The task specification may be used by the assistant system 140 to trigger a task, conduct dialog conversation, and find a right execution module (e.g., agents 228) to execute the task. The task specification may be an implementation of the product requirement document. It may serve as the general contract and requirements that all the components agreed on. It may be considered as an assembly specification for a product, while all development partners deliver the modules based on the specification. In particular embodiments, an assistant task may be defined in the implementation by a specification. As an example and not by way of limitation, the task specification may be defined as the following categories. One category may be a basic task schema which comprises the basic identification information such as ID, name, and the schema of the input arguments. Another category may be a triggering specification, which is about how a task can be triggered, such as intents, event message ID, etc. Another category may be a conversational specification, which is for dialog manager 216 to conduct the conversation with users and systems. Another category may be an execution specification, which is about how the task will be executed and fulfilled. Another category may be a deployment specification, which is about how a feature will be deployed to certain surfaces, local, and group of users.

In particular embodiments, the task specification manager API 430 may be an API for accessing a task specification manager. The task specification manager may be a module in the runtime stack for loading the specifications from all the tasks and providing interfaces to access all the tasks specifications for detailed information or generating task candidates. In particular embodiments, the task specification manager may be accessible for all components in the runtime stack via the task specification manager API 430. The task specification manager may comprise a set of static utility functions to manage tasks with the task specification manager, such as filtering task candidates by platform. Before landing the task specification, the assistant system 140 may also dynamically load the task specifications to support end-to-end development on the development stage.

In particular embodiments, the task specifications may be grouped by domains and stored in runtime configurations 435. The runtime stack may load all the task specifications from the runtime configurations 435 during the building time. In particular embodiments, in the runtime configurations 435, for a domain, there may be a cconf file and a cinc file (e.g., sidechef_task.cconf and sidechef_task.inc). As an example and not by way of limitation, <domain>_tasks.cconf may comprise all the details of the task specifications. As another example and not by way of limitation, <domain>_tasks.cinc may provide a way to override the generated specification if there is no support for that feature yet.

In particular embodiments, a task execution may require a set of arguments to execute. Therefore, an argument resolution component 418 may resolve the argument names using the argument specifications for the resolved task ID. These arguments may be resolved based on NLU outputs (e.g., slot [SL:contact]), dialog state (e.g., short-term calling history), user memory (such as user preferences, location, long-term calling history, etc.), or device context (such as timer states, screen content, etc.). In particular embodiments, the argument modality may be text, audio, images or other structured data. The slot to argument mapping may be defined by a filling strategy and/or language ontology. In particular embodiments, given the task triggering specifications, the task candidate generation module 416 may look for the list of tasks to be triggered as task candidates based on the resolved task ID and arguments.

In particular embodiments, the generated task candidates may be sent to the task candidate ranking module 414 to be further ranked. The task candidate ranking module 414 may use a rule-based ranker 415 to rank them. In particular embodiments, the rule-based ranker 415 may comprise a set of heuristics to bias certain domain tasks. The ranking logic may be described as below with principles of context priority. In particular embodiments, the priority of a user specified task may be higher than an on-foreground task. The priority of the on-foreground task may be higher than a device-domain task when the intent is a meta intent. The priority of the device-domain task may be higher than a task of a triggering intent domain. As an example and not by way of limitation, the ranking may pick the task if the task domain is mentioned or specified in the utterance, such as "create a timer in TIMER app". As another example and not by way of imitation, the ranking may pick the task if the task domain is on foreground or active state, such as "stop the timer" to stop the timer while the TIMER app is on foreground and there is an active timer. As yet another example and not by way of imitation, the ranking may pick the task if the intent is general meta intent, and the task is device control while there is no other active application or active state. As yet another example and not by way of imitation, the ranking may pick the task if the task is the same as the intent domain. In particular embodiments, the task candidate ranking module 414 may customize some more logic to check the match of intent/slot/entity types. The ranked task candidates may be sent to the merging layer 419.

In particular embodiments, the output from the entity resolution module 212 may also sent to a task ID resolution component 412 of the intent handlers 411. The task ID resolution component 412 may resolve the task ID of the corresponding task similarly to the task ID resolution component 417. In particular embodiments, the intent handlers 411 may additionally comprise an argument resolution component 413. The argument resolution component 413 may resolve the argument names using the argument specifications for the resolved task ID similarly to the argument resolution component 418. In particular embodiments, intent handlers 411 may deal with task agnostic features and may not be expressed within the task specifications which are task specific. Intent handlers 411 may output state candidates other than task candidates such as argument update, confirmation update, disambiguation update, etc. In particular embodiments, some tasks may require very complex triggering conditions or very complex argument filling logic that may not be reusable by other tasks even if they were supported in the task specifications (e.g., in-call voice commands, media tasks via [IN:PLAY MEDIA], etc.). Intent handlers 411 may be also suitable for such type of tasks. In particular embodiments, the results from the intent handlers 411 may take precedence over the results from the task candidate ranking module 414. The results from the intent handlers 411 may be also sent to the merging layer 419.

In particular embodiments, the merging layer 419 may combine the results form the intent handlers 411 and the results from the task candidate ranking module 414. The dialog state tracker 218 may suggest each task as a new state for the dialog policies 360 to select from, thereby generating a list of state candidates. The merged results may be further sent to a conversational understanding reinforcement engine (CURE) tracker 420. In particular embodiments, the CURE tracker 420 may be a personalized learning process to improve the determination of the state candidates by the dialog state tracker 218 under different contexts using real-time user feedback. More information on conversational understanding reinforcement engine may be found in U.S. patent application Ser. No. 17/186,459, filed 26 Feb. 2021, which is incorporated by reference.

In particular embodiments, the state candidates generated by the CURE tracker 420 may be sent to the action selector 222. The action selector 222 may consult with the task policies 364, which may be generated from execution specifications accessed via the task specification manager API 430. In particular embodiments, the execution specifications may describe how a task should be executed and what actions the action selector 222 may need to take to complete the task.

In particular embodiments, the action selector 222 may determine actions associated with the system. Such actions may involve the agents 228 to execute. As a result, the action selector 222 may send the system actions to the agents 228 and the agents 228 may return the execution results of these actions. In particular embodiments, the action selector may determine actions associated with the user or device. Such actions may need to be executed by the delivery system 230. As a result, the action selector 222 may send the user/device actions to the delivery system 230 and the delivery system 230 may return the execution results of these actions.

The embodiments disclosed herein may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

Continuous Learning for Natural-Language Understanding Models

In particular embodiments, the assistant system 140 may efficiently identify errors from the natural-language understanding (NLU) models used by the assistant system 140. The assistant system 140 may then correct these errors and retrain the NLU models to improve their quality. The NLU models in the assistant system 140 may generate structured semantic representations (e.g., slots and intents) for user queries and then match user queries to queries in a plurality of training data as a way to generate responses for the user queries. However, sometimes the user queries may not match well with the training data (e.g., because users phrased their queries in unusual or non-grammatical ways or used uncommon terms). Under this situation, the NLU models may not handle these user queries accurately, i.e., generating inaccurate semantic representations, which may further lead to inaccurate responses to the user queries. Conventional approaches to address this issue may be manually identifying these errors and creating new training data incorporating these tail cases (i.e., uncommon cases) and then retraining the NLU models to improve their quality, which may be cumbersome and inefficient. By contrast, the embodiments disclosed herein may use active learning to select live traffic data (e.g., conversations between users and the assistant system 140) that the NLU models are predicted to fail (i.e., incorrectly identify intents/slots). Active learning refers to a set of algorithms for deciding which unlabeled data to label in order to improve the quality of the NLU models. The selected traffic data may be manually annotated and used to evaluate the NLU models to identify the most important failure cases. The failure cases may be further used to automatically generate new (e.g., synthetic) training data, which may be used to retrain the NLU models to optimize them. Although this disclosure describes optimizing particular NLU models by particular systems in a particular manner, this disclosure contemplates optimizing any suitable NLU model in any suitable manner. As an example and not by way of limitation, such model may comprise any model within the assistant system 140, e.g., natural-language generation model, entity resolution model, automatic speech recognition model, text-to-speech model, etc.

In particular embodiments, the assistant system 140 may receive a user request to automatically debug a natural-language understanding (NLU) model. Debugging the NLU model may comprise one or more of discovering quality issues or proposing fix of the model. In particular embodiments, the NLU model may comprise a machine-learning model or rules based functionalities. The assistant system 140 may access a plurality of predicted semantic representations generated by the NLU model. In particular embodiments, the plurality of predicted semantic representations may be associated with a plurality of dialog sessions, respectively. Each dialog session may be between a user from a plurality of users and an assistant xbot associated with the NLU model. In particular embodiments, the assistant system 140 may generate, based on an auto-correction model, a plurality of expected semantic representations associated with the plurality of dialog session. The auto-correction model may be learned from a plurality of dialog training samples generated based on active learning. In particular embodiments, the assistant system 140 may then identify, based on a comparison between the predicted semantic representations and the expected semantic representations, one or more incorrect semantic representations of the predicted semantic representations. The assistant system 140 may further automatically correct the one or more incorrect semantic representations by replacing them with one or more respective expected semantic representations generated by the auto-correction model.

In particular embodiments, the NLU models may be not effective in handling tail case requests from users. Tail cases may be these cases where the users phrased their queries in an unusual way or a nongrammatical way or used uncommon terms. As an example and not by way of limitation, "what's the broadcast in Seattle?" may be a tail case for asking weather information in contrast with "what's the weather in Seattle?" The NLU models may be trained from training data based on the latter user input. As a result, the utterances of the former may cause inaccurate semantic representations generated by the NLU models because it doesn't match up well with the training data that was initially used for training the NLU models. To address this issue, the assistant system 140 may use the auto-correction model to identify the incorrect semantic representations (predicted semantic representations) for user inputs and generate correct semantic representations (expected semantic representations). In particular embodiments, each of the predicted semantic representations or each of the expected semantic representations may comprise one or more of an intent represented by a structural format or a slot represented by a structural format. Each of the one or more incorrect semantic representations and its respective expected semantic representation may be associated with a same dialog session. The assistant system 140 may then correct the incorrect semantic representations. The assistant system 140 may further updating the NLU model based on the plurality of expected semantic representations.

Figure 5:
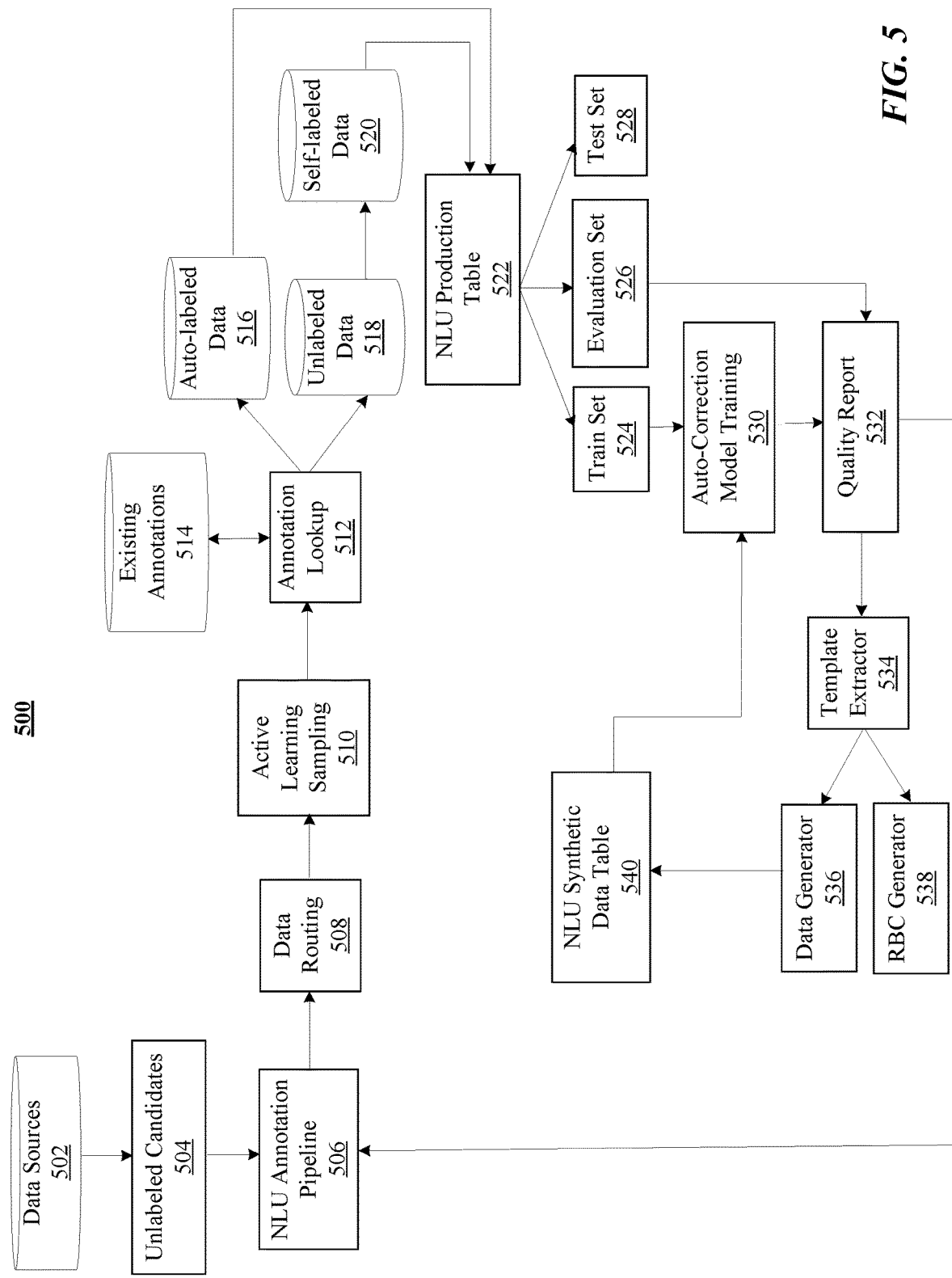
FIG. 5 illustrates an example workflow diagram for improving the NLU models.

FIG. 5 illustrates an example workflow diagram 500 for improving the NLU models. In particular embodiments, the assistant system 140 may learn the auto-correction model to improve the NLU models. To learn the auto-correction model, the assistant system 140 may generate the plurality of dialog training samples for such purpose. The generation of these dialog training samples may start with accessing a plurality of live user-assistant dialog samples. In particular embodiments, the live user-assistant dialog samples may be accessed from multiple data sources 502. The live user-assistant dialog samples may comprise interactions between users and the assistant system 140. As an example and not by way of limitation, one data source may comprise the live traffic (e.g., conversations) between users and the assistant system 140. The accessed data may comprise samples of user inputs (e.g., requests) and corresponding outputs (e.g., responses) from the assistant system 140. In particular embodiments, the assistant system 140 may use comments processing logic to process all the accessed data. The assistant system 140 may grade the plurality of live user-assistant dialog samples. As an example and not by way of limitation, annotators may grade the responses from the assistant system 140. In particular embodiments, grading the plurality of live user-assistant dialog samples may be based on task completion associated with each of the plurality of live user-assistant dialog samples, i.e., evaluating whether a response from the assistant system 140 for a task associated with a corresponding user request is successful or not. In alternative embodiments, the assistant system 140 may skip the grading of the live user-assistant dialog samples for higher efficiency. In particular embodiments, the graded samples may be stored in an unlabeled candidates 504 data store. The unlabeled candidates 504 data store may comprise the pool of data that has received first-pass, light-weight annotations (e.g. to remove privacy-sensitive rows and to grade overall assistant task outcome), but otherwise has not received complete NLU annotations. The stored graded samples may be then fed into an NLU annotation pipeline 506.

In particular embodiments, in the NLU annotation pipeline 506, there may be a data routing module 508. Within the data routing module 508, the assistant system 140 may divide the plurality of live user-assistant dialog samples based on one or more of a language associated with each live user-assistant dialog sample, a client system associated with each live user-assistant dialog sample, or a clustering algorithm. As an example and not by way of limitation, dividing the graded samples based on language may be based on whether they are English or Portuguese. Optionally, the graded samples may be also divided based on the types of client systems 130 (i.e., surfaces) for surface-specific tasks, i.e., specific tasks may be only associated with specific surfaces. As an example and not by way of limitation, tasks associated with virtual reality (VR) may be only associated with VR-enabled client systems 130. In particular embodiments, the clustering algorithm may be an unsupervised clustering algorithm. This algorithm may help group similar users together. During active learning based sampling, the assistant system 140 may take the grouping signal from the algorithm as a feature to select more samples covers different groups, or the groups where they have higher error rate.

In particular embodiments, the graded samples with the same language or with the same surface may be sent to an active learning sampling module 510. In particular embodiments, the assistant system 140 may select based on the active learning, a set of live user-assistant dialog samples for annotation. The active learning sampling module 510 may take the graded samples and select for those that the NLU models are most likely to fail on as the set of live user-assistant dialog samples for annotation. Active learning may be an effective solution for addressing the technical challenge of improving annotator efficiency by increasing the speed and quality at which we are able to annotate incoming traffic, as active learning may determine what utterances are high-signal for NLU quality improvement, which may be the only requested annotation, thereby reducing the amount of utterances for annotation to improve the annotator efficiency. In particular embodiments, selecting the set of live user-assistant dialog samples for annotation may be further based on grades of the plurality of live user-assistant dialog samples. The active learning used to generate the plurality of dialog training samples may be based on one or more of random selection, model uncertainty, annotation ambiguity, optimization metric, diversity score, or user satisfaction. As an example and not by way of limitation, the active learning may be based on a fuzzy pattern matching (FPM) classifier to predict how likely the NLU models may get the semantic representation of an utterance incorrect. The (FPM) classifier may use intrinsic properties of the model (e.g. confidence scores) or extrinsic properties from the data (e.g. sentence length) as features. The model may be calibrated to provide more reliable confidence scores. In particular embodiments, the grades of these samples may be used. As an example and not by way of limitation, active learning may determine those samples based on their grades annotated by the annotators. By using active learning, the assistant system 140 may prioritize which utterances are the most important to annotate.

In particular embodiments, the samples selected by active learning may be stored in an annotation lookup module 512. The assistant system 140 may annotate semantic representations for the selected set of live user-assistant dialog samples within the annotation lookup module 512. Theses selected dialog samples may have their original semantic representations (e.g., intents and slots) that were generated by the NLU models. During the annotation of the dialog samples, the assistant system 140 may provide corrected or updated semantic representations. In other words, these annotations may filter out previous annotation generated by the NLU models. In particular embodiments, the annotation lookup module 512 may comprise a data disk, which may comprise a temporary table that holds the live user-assistant dialog data that was sampled. On the temporary table, the assistant system 140 may collect the annotations and then have the quality of the annotations reviewed. Once the quality is satisfactory, the annotated data may be sent to the production data, which may be used for training the auto-correction model. As can be seen, using a temporary table may avoid updating the production data directly, which may give the assistant system 140 buffer to identify potential problems with the incoming annotated data before it is added to the production data.

In particular embodiments, the annotation lookup module 512 may access existing annotations 514 to check if there are existing annotations for these selected dialog samples. For dialog samples that already have existing annotations, the assistant system 140 may auto-label them based on the existing annotations and then land them directly in the NLU production table 522. In particular embodiments, the NLU production table 522 may comprise labeled live user data. For dialog samples that don't have existing annotations, the assistant system 140 may treat them as unlabeled data 518 and apply prediction models on them to generate self-labeled data 520. These self-labeled data 520 may be reviewed by annotators for update/revision, if necessary. In particular embodiments, the dialog samples in the data disk may be annotated on a regular (e.g., weekly) basis, in which interesting samples (e.g., the failure cases) may be annotated with corrected/updated semantic representations. After the selected dialog samples are annotated, they (including both auto-labeled data 516 and self-labeled data 520) may be added to the NLU production table 522.

The annotated data can then be used to automatically generate new (synthetic) training data, either using a model-based generator or a rules-based generator. These new data sets can be used for improving NLU quality. This could be done by adding all examples sampled with active learning to training, for example. Data generation using the seed utterances could lead to further potential improvements. Finally, as the volume of data increases we may also want to consider using new training strategies in production (e.g., incremental retraining). Although there is manual annotation involved, the aforementioned process for generating new training data is still less intensive then manually generating new training data from scratch. The NLU models may be further improved based on these new training data. With the improved NLU models, the system can automatically identify errors and correct them. The assistant system 140 may then imitate these utterances. If the NLU models get some of these wrong, the linguists may be involved to annotate them with correct semantic representations.

In particular embodiments, the example workflow diagram 500 may be a continuous learning workstream, which may remove the bottlenecks for quality improvement of NLU models. In particular embodiments, the assistant system 140 may update the NLU models close to real-time based on online learning. Online learning may refer to a machine-learning technique where models are updated sequentially instead of batch-trained. In the embodiments disclosed herein, online learning may also to refer to dynamic, continuous evolution of the NLU models with fresh data. Online learning may enable the assistant system 140 to adapt the NLU models to tail cases and seasonal changes in user behavior much more quickly, stemming from world events to new product scenarios (e.g., music question and answering, messaging for smart glasses, etc.).

In particular embodiments, the assistant system 140 may generate, based on the NLU production table 522, a train set 524, an evaluation set 526, and a test set 528. The assistant system 140 may there have a technical advantage of automatic self-driving quality measurement, wherein the assistant system may create fresh head and long tail focused test sets from user data to be used for quality measurement. The train set 524 may be used as part of the dialog training samples for learning the auto-correction model based on an auto-correction model training module 530. The evaluation set 526 may be used to generate a quality report 532 comprising the accuracies of the head use cases and tail use cases. In other words, the assistant system 140 may generate a quality report based the selected set of live user-assistant dialog samples and their annotations. The quality report 532 may comprise one or more of an accuracy of a semantic representation associated with a head use case or an accuracy of a semantic representation associated with a tail use case. As a result, the assistant system 140 may have another technical advantage of automatically generating insights identifying bugs that have the highest impact and detecting opportunities for new product scenarios.

In particular embodiments, the quality report 532 may be provided to a template extractor 534. The assistant system 140 may identify one or more failure cases from the selected set of live user-assistant dialog samples. For some of the failure cases identified in the quality report 532, the assistant system 140 may generate augmented data to address these mistakes. As an example and not by way of limitation, for each failure case, the assistant system 140 may add the exact utterance to training. For example, if "please call mom" is a failure case, the assistant system 140 may add "please call mom" to training. The assistant system 140 may assign a high weight for such utterance to bias the models to be more effective for annotating the semantic representations for this utterance. Extracting templates from failure cases, generating augmented data based on these failure cases and improving the NLU models based on the augmented data may be effective solutions for addressing the technical challenge of effectively generating augmented data for improving the NLU models as such data may focus on these failure cases to enable the NLU models to handle these cases more effectively in the future.

In particular embodiments, the template extractor 534 may extract one or more templates from the one or more failure cases. Suppose there are no similar dialog samples to a particular incorrectly annotated utterance in the train set 524. The template extractor 534 may extract templates from this utterance For example, if "please call mom" is a failure case, the template extractor 534 may extract a template as "please call {sl:contact}". This template may then be expanded to other similar utterances such as "please call dad", "please call Jill", etc. and added to training. The extracted templates may be then provided to a data generator 536, which may further generate a plurality of synthetic dialog samples based on the one or more templates. For example, these synthetic dialog samples may include "what's the broadcast in New York," "what's the broadcast in San Francisco," etc. for the failure case of "what's the broadcast in Seattle?" In particular embodiments, the generation of the synthetic dialog samples may be based on the template(s) identified from the live traffic via active learning. The generation process may then replace the slot values with known entity names to improve the diversity and coverage of the training and testing samples. The entity names may be selected via active learning as well, where more difficult ones are selected for the NLU module 210 and entity resolution module 212. The testing results from those newly produced data may further influence the sampling logic as a feedback looping back to the active learning sampling module 510. In addition, the extracted templates may be also provided to a rule-based classifier (RBC) generator 538. The RBC generator 538 may generate one or more rule-based classifiers based on one or more rules for annotating semantic representations. The rule-based classifier may have different behaviors from the models used for annotating the semantic representations. In particular embodiments, the semantic representations generated based on the rule-based classifier may overwrite those generated based on models. As a result, the assistant system 140 may have a technical advantage of automatic improvement of the NLU models by creating data patches and RBC rules (for critical head cases) automatically and ingesting useful user data for NLU annotation and training.

In particular embodiments, the augmented data generated by the data generator 536 may be provided to the NLU synthetic data table 540. The NLU synthetic data table 540 may comprise labeled generated data and labeled crowd-sourced data. The NLU synthetic data table 540 may be another part of the dialog training samples used for learning the auto-correction model 530. In other words, the plurality of dialog training samples may comprise the selected set of live user-assistant dialog samples (e.g., from the train set 524) and the plurality of synthetic dialog samples (e.g. from the NLU synthetic data table 540). As can be seen, based on the aforementioned process, each dialog training sample of the plurality of dialog training samples may comprise a user input and a correct semantic representation associated with the user input. In particular embodiments, the quality report 532 together with the augmented data with new live-traffic dialog samples may be returned to the NLU annotation pipeline 506 to reiterate the process to continuously improving the NLU models.

In particular embodiments, the assistant system 140 may send, to a client system 130, instructions for presenting a user interface comprising one or more of the plurality of predicted semantic representations, one or more of the plurality of expected semantic representations, or one or more of the incorrect semantic representations. Table 2 illustrates example content of the user interface showing user input and their expected and predicted semantic representations.

TABLE 2

Example content of the use interface showing user input and their expected and predicted semantic representations.

| user input | expected | predicted | failure reason | templates | confidence mean |
|---|---|---|---|---|---|
| Good morning | [[IN;GET_ROUTINE Good [SL:DATE_TIME morning] ]] | [IN:GET_ROUTINE Good morning ]] | RBC_MISMATCH | None | 2.000000 |
| what's up | [[IN:GET_ROUTINE what's up ]] | [[IN:WHATS_UP what's up ]] | MISLABELED | None | 0.999222 |
| play next song | [[IN:SKIP_TRACK_MUSIC play [SL:ORDINAL next] [SL:MUSIC_TYPE song ] ]] | [[IN:SKIP_TRACK_MUSIC play next song ]] | RBC_MISMATCH | None | 2.000000 |

TABLE 2-continued

Example content of the use interface showing user input and their expected and predicted semantic representations.

| user input | expected | predicted | failure reason | templates | confidence mean |
|---|---|---|---|---|---|
| Good evening | [[IN:GET_ROUTINE Good [SL:DATE_TIME evening ] ]] | [IN:GOOD_EVENING Good evening ]] | MISLABELED | None | 0.997763 |
| play the news | [[IN:GET_STORIES_NEWS play the news ]] | [[IN:OPEN_RESOURCE play the [SL:RESOURCE news ] ]] | LOW_TRAINING_DATA | {'play the {sl:resource}':['play the corrupted dot com'. 'play the chat'. 'play the search_engine_name. 'play the search'. 'play the smart camera'. 'play the j double you dot o r g'. 'play the w w w dot shopping_site_name dot com'. 'play the financial_company_name dot com'. 'play the rhapsody'. 'play the video']} | 0.982413 |
| how much time is left | [[IN:GET_TIMER how much time is left ]] | [[IN:GET_TIMER how much [SL:METHOD_TIMER time ] is left ]] | MISLABELED | None | 0.999103 |
| what's going on | [[IN:GET_ROUTINE what's going on ]] | [[IN:WHATS_UP what's going on ]] | MISLABELED | None | 0.992673 |
| Good afternoon | [IN:GET_ROUTINE Good [SL:DATE_TIME afternoon ] ]] | [IN:GOOD_AFTERNOON Good [SL:DATE_TIME afternoon ] ]] | LOW_TRAINING_DATA | {'Good{sl:date_time}':[ Good for one hour'. 'Good 58 minutes'. 'Good now'. 'Good for 63 minutes'. 'Good for 9pm tonight'. 'Good for three hours'. 'Good for 45 minutes'. 'Good for on Wednesday'. 'Good fifteen minutes'. 'Good for 6 tomorrow morning']} | 0.998642 |
| call nana | [[IN:CREATE_CALL call [SL:CONTACT [IN:GET_CONTACT [SL:TYPE RELATION nana ] ] ] ]] | [IN:CREATE_CALL call [SL:CONTACT nana ] ]] | RBC_MISMATCH | None | 1.800000 |
| hang | [[IN:END_CALL hang ]] | [[IN:CREATE_CALL hang ]] | LOW_TRAINING_DATA | {None: ['hang']} | 0.939998 |
| how much time left | [IN:GET_TIMER how much time left ]] | [[IN:GET_TIMER how much [SL:METHOD_TIMER time ] left ]] | MISLABELED | None | 0.996968 |
| play news_site_name | [[IN:GET_STORIES_NEWS play [SL:NEWS_SOURCE news site name ] ]] | [[IN:OPEN_RESOURCE play [SL.RESOURCE news_site_name ] ]] | UNKNOWN | None | 0.275605 |
| what's new | [[IN:GET_ROUTINE what's new ]] | [[IN:WHATS_UP what's new ]] | MISLABELED | None | 0.998155 |
| set a 30 second timer | [[IN:CREATE_TIMER set a [SL:DATE_TIME [IN:GET_TIME [SL:DATE_TIME 30 second ] ] ] [SL:METHOD_TIMER timer ] ]] | [[IN:CREATE_TIMER set a [SL:DATE_TIME 30 second ] [SL:METHOD_TIMER timer ] ]] | UNKNOWN | None | 0.998127 |
| Play again | [IN:REPLAY_MUSIC Play again ]] | [[IN:START_OVER_MEDIA Play again ]] | LOW_TRAINING_DATA | {None:[Play again]} [ILLEGIBLE] | 0.861328 |

As illustrated in Table 2, the user interface may show a plurality of user input (e.g., utterances) associated with dialog sessions. For each user input, there may be a corresponding expected semantic representation, predicted semantic representation, failure reason, template, and confidence mean. As an example and not by way of limitation, for the user input "play next song", the expected semantic representation may be [[IN: SKIP_TRACK_MUSIC play [SL:ORDINAL next] [SL:MUSIC_TYPE song]]] whereas the predicted semantic representation may be [[IN: SKIP_TRACK_MUSIC play next song]]. The failure reason is identified as an RBC mismatch (RBC_MISMATCH), which indicates the predicted semantic representation was actually generated by the rule-based classifier. This may also indicate the rules overwrote the NLU models as the prediction has a confidence mean of 2, which is considerably high.

This confidence mean may be not a real model confidence, but a fake confidence score assigned to the rules. In particular embodiments, if the prediction is generated by rules, it may have a confidence over one as the assistant system 140 may purposely have rules that override models sometimes. As can be seen, the predicted semantic representation generated by rules mismatches the expected semantic representation, which is why the failure reason is RBC_MISMATCH.

As another example and not by way of limitation, for the user input "what's up", the expected semantic representation may be [[IN:GET_ROUTINE what's up]] whereas the predicted semantic representation may be [[IN:WHATS_UP what's up]]. The failure reason is identified as mislabeled. This may indicate that the expected parse is likely incorrect, i.e. the annotator made a mistake. To be more specific, the intent should be "whats_up" instead of "get_routine". The expected semantic representation may be generated by the auto-correction model, which may have confidence mean 0.999222. The high confidence score may indicate the model has high probability of being correct. As yet another example and not by way of limitation, for the user input "play the news", the expected semantic representation may be [[IN:GET_STORIES_NEWS play the news]] whereas the predicted semantic representation may be [[IN:OPEN_RESOURCE play the [SL:RESOURCE news]]]. The failure reason is identified as low training data, which means the user input is phrased in an uncommon way and the training data does not have sufficient amount of similar utterances. The expected semantic representation may be generated by the auto-correction model, which may have confidence mean 0.982413. Furthermore, since the failure reason is low training data, the assistant system 140 may further extract templates from this user input and add them to the training data to improve the NLU models. These templates may include {'play the {sl:resource}':['play the corrupted dot com'. 'play the chat'. 'play the search_engine_name'. 'play the search'. 'play the smart camera'. 'play the j double you dot o r g'. 'play the w w w dot shopping_site_name dot com'. 'play the financial_company_name dot com'. 'play the rhapsody'. 'play the video']}. Because the templates are generated and expanded automatically, some of the sentences produced may not be grammatical or semantically meaningful.

In addition to the information listed in Table 2, for each user input, which domain it belongs to, how frequently this bug appears, whether it is cached in the train set, whether there is a correction, and the dictionary features may be also identified. As an example and not by way of limitation, the domain may be routine, music, news, timer, calling, etc. The aforementioned tool may result in a technical advantage for the assistant system 140, which may include benchmark establishment, in which the assistant system may establish tools for regular maintenance of incoming data (e.g., correcting out-of-date annotations, managing user requests for deletion, etc.) and creating dashboards to track quality on these sets over time.

In particular embodiments, the user interface may be associated with an application that can be used by developers of the assistant system 140 as an internal tool to retrieve dialog samples and view expected and predicted annotations for different user queries. The expected annotations may be generated by the auto-correction model whereas the predicted annotations may be generated by the current NLU models in production. For a given query, the internal tool may show the intent/slot annotations of the expected semantic representations and the intent/slot annotations of the predicted semantic representations. In particular embodiments, the internal tool may determine, for each of the one or more incorrect semantic representations, a failure reason used for identifying the predicted semantic representation corresponding to the incorrect semantic representation as being incorrect. As an example and not by way of limitation, the failure reason for the incorrect semantic representation may comprise one or more of a mismatch between the predicted semantic representation and a semantic representation determined based on one or more rule-based classifiers, a mislabel of an intent or a slot of the predicted semantic representation, or an insufficient amount of training data associated with the predicted semantic representation. In particular embodiments, the internal tool may further automatically provide a fix (i.e., auto bug fix) of the identified error. In particular embodiments, the internal tool may be developed into an external tool provided to 3rd-party developers.

In particular embodiments, the performance of the auto-correction model has been tested on a live traffic evaluation set. The live traffic evaluation set may be from user data associated with one or more client systems. The live traffic evaluation set comprises 1207 incorrect semantic representations (bugs). With the auto-correction model, 789 bugs out of 1207 were automatically corrected. There was 65% absolute frame accuracy improvement on the set of 1207 bugs. Some examples of the bugs fixed may be listed below in Table 3.

TABLE 3

Example fixed bugs by the auto-correction model.

| utterance | before fixing | after fixing |
| --- | --- | --- |
| what's today | [IN:WHATS_UP what's today ] | [IN:GET DATE what's [SL:DATE TIME today ] ] |
| play 92.5 | [IN:PLAY MEDIA play [SL:TITLE_MEDIA 92.5 ] ] | [IN:PLAY MUSIC play [SL:MUSIC_RADIO_ID 92.5 ] ] |
| sleepy time | [IN:UNSUPPORTED TIMER sleepy time ] | [IN:SLEEP sleepy time ] |
| oh shoot | [IN:TAKE_PHOTO oh shoot ] | [outOfDomain oh shoot ] |

The columns in Table 3 represent the semantic representations before-and-after the auto-correction model is applied.

Figure 6:
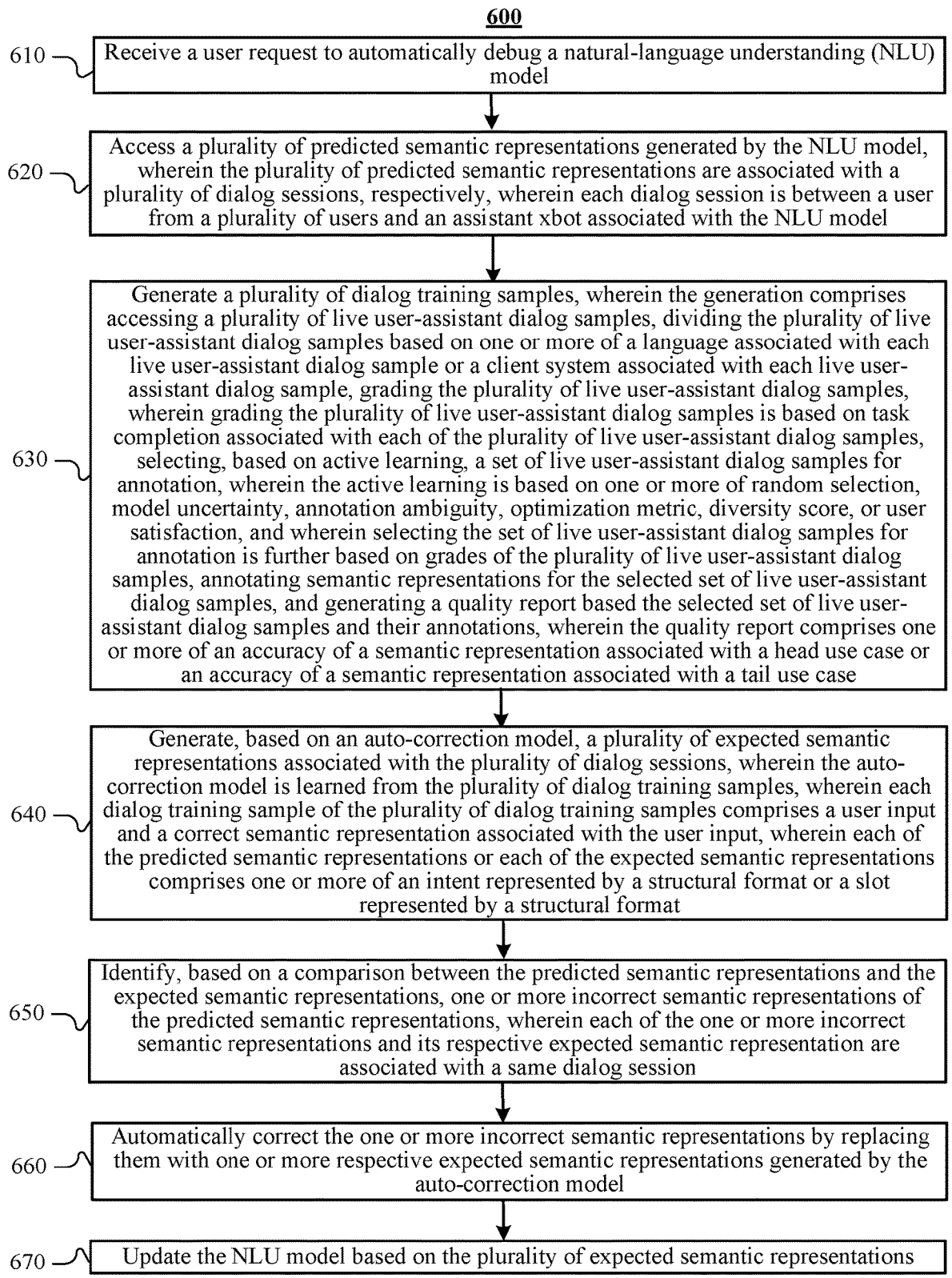
FIG. 6 illustrates an example method for improving the NLU models.

FIG. 6 illustrates an example method 600 for improving the NLU models. The method may begin at step 610, where the assistant system 140 may receive a user request to automatically debug a natural-language understanding (NLU) model. For example, a developer may access a tool provided by the assistant system 140 that allows the developer to automatically debug the NLU model. At step 620, the assistant system 140 may access a plurality of predicted semantic representations generated by the NLU model, wherein the plurality of predicted semantic representations are associated with a plurality of dialog sessions, respectively, wherein each dialog session is between a user from a plurality of users and an assistant xbot associated with the NLU model. At step 630, the assistant system 140 may generate a plurality of dialog training samples, wherein the generation comprises accessing a plurality of live user-assistant dialog samples, dividing the plurality of live user-assistant dialog samples based on one or more of a language associated with each live user-assistant dialog sample or a client system associated with each live user-assistant dialog sample, grading the plurality of live user-assistant dialog samples, wherein grading the plurality of live user-assistant dialog samples is based on task completion associated with each of the plurality of live user-assistant dialog samples, selecting, based on active learning, a set of live user-assistant dialog samples for annotation, wherein the active learning is based on one or more of random selection, model uncertainty, diversity score, or user satisfaction, and wherein selecting the set of live user-assistant dialog samples for annotation is further based on grades of the plurality of live user-assistant dialog samples, annotating semantic representations for the selected set of live user-assistant dialog samples, and generating a quality report based the selected set of live user-assistant dialog samples and their annotations, wherein the quality report comprises one or more of an accuracy of a semantic representation associated with a head use case or an accuracy of a semantic representation associated with a tail use case. At step 640, the assistant system 140 may generate, based on an auto-correction model, a plurality of expected semantic representations associated with the plurality of dialog sessions, wherein the auto-correction model is learned from the plurality of dialog training samples, wherein each dialog training sample of the plurality of dialog training samples comprises a user input and a correct semantic representation associated with the user input, wherein each of the predicted semantic representations or each of the expected semantic representations comprises one or more of an intent represented by a structural format or a slot represented by a structural format. At step 650, the assistant system 140 may identify, based on a comparison between the predicted semantic representations and the expected semantic representations, one or more incorrect semantic representations of the predicted semantic representations, wherein each of the one or more incorrect semantic representations and its respective expected semantic representation are associated with a same dialog session. At step 660, the assistant system 140 may automatically correct the one or more incorrect semantic representations by replacing them with one or more respective expected semantic representations generated by the auto-correction model. Particular embodiments may repeat one or more steps of the method of FIG. 6, where appropriate. At step 670, the assistant system 140 may update the NLU model based on the plurality of expected semantic representations. Although this disclosure describes and illustrates particular steps of the method of FIG. 6 as occurring in a particular order, this disclosure contemplates any suitable steps of the method of FIG. 6 occurring in any suitable order. Moreover, although this disclosure describes and illustrates an example method for improving the NLU models including the particular steps of the method of FIG. 6, this disclosure contemplates any suitable method for improving the NLU models including any suitable steps, which may include all, some, or none of the steps of the method of FIG. 6, where appropriate. Furthermore, although this disclosure describes and illustrates particular components, devices, or systems carrying out particular steps of the method of FIG. 6, this disclosure contemplates any suitable combination of any suitable components, devices, or systems carrying out any suitable steps of the method of FIG. 6.

Vector Spaces and Embeddings

Figure 7:
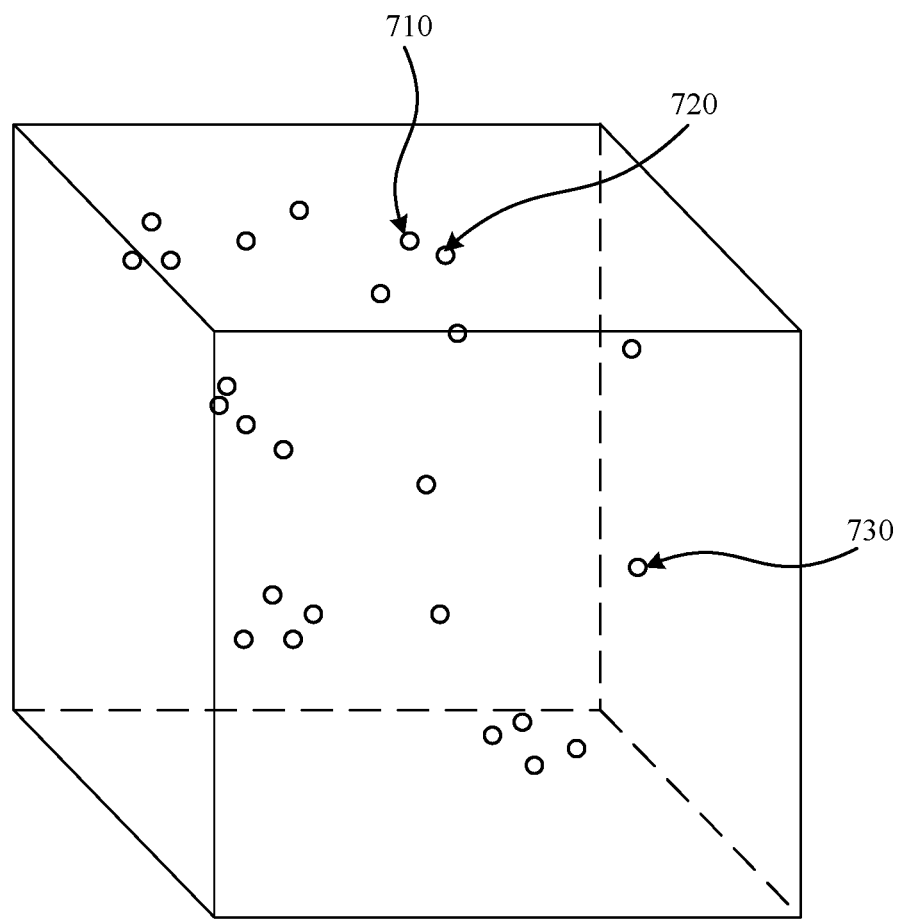
FIG. 7 illustrates an example view of an embedding space.

FIG. 7 illustrates an example view of a vector space 700. In particular embodiments, an object or an n-gram may be represented in a d-dimensional vector space, where d denotes any suitable number of dimensions. Although the vector space 700 is illustrated as a three-dimensional space, this is for illustrative purposes only, as the vector space 700 may be of any suitable dimension. In particular embodiments, an n-gram may be represented in the vector space 700 as a vector referred to as a term embedding. Each vector may comprise coordinates corresponding to a particular point in the vector space 700 (i.e., the terminal point of the vector). As an example and not by way of limitation, vectors 710, 720, and 730 may be represented as points in the vector space 700, as illustrated in FIG. 7. An n-gram may be mapped to a respective vector representation. As an example and not by way of limitation, n-grams $t_1$ and $t_2$ may be mapped to vectors $\vec{v_1}$ and $\vec{v_2}$ in the vector space 700, respectively, by applying a function $\vec{\pi}$ defined by a dictionary, such that $\vec{v_1} = \vec{\pi}(t_1)$ and $\vec{v_2} = \vec{\pi}(t_2)$. As another example and not by way of limitation, a dictionary trained to map text to a vector representation may be utilized, or such a dictionary may be itself generated via training. As another example and not by way of limitation, a word-embeddings model may be used to map an n-gram to a vector representation in the vector space 700. In particular embodiments, an n-gram may be mapped to a vector representation in the vector space 700 by using a machine leaning model (e.g., a neural network). The machine learning model may have been trained using a sequence of training data (e.g., a corpus of objects each comprising n-grams).

In particular embodiments, an object may be represented in the vector space 700 as a vector referred to as a feature vector or an object embedding. As an example and not by way of limitation, objects $e_1$ and $e_2$ may be mapped to vectors $\vec{v_1}$ and $\vec{v_2}$ in the vector space 700, respectively, by applying a function $\vec{v_1}$, such that $\vec{v_1} = \vec{\pi}(e_1)$ and $\vec{v_1} = \vec{\pi}(e_2)$. In particular embodiments, an object may be mapped to a vector based on one or more properties, attributes, or features of the object, relationships of the object with other objects, or any other suitable information associated with the object. As an example and not by way of limitation, a function may map objects to vectors by feature extraction, which may start from an initial set of measured data and build derived values (e.g., features). As an example and not by way of limitation, an object comprising a video or an image may be mapped to a vector by using an algorithm to detect or isolate various desired portions or shapes of the object. Features used to calculate the vector may be based on information obtained from edge detection, corner detection, blob detection, ridge detection, scale-invariant feature transformation, edge direction, changing intensity, autocorrelation, motion detection, optical flow, thresholding, blob extraction, template matching, Hough transformation (e.g., lines, circles, ellipses, arbitrary shapes), or any other suitable information. As another example and not by way of limitation, an object comprising audio data may be mapped to a vector based on features such as a spectral slope, a tonality coefficient, an audio spectrum centroid, an audio spectrum envelope, a Mel-frequency cepstrum, or any other suitable information. In particular embodiments, when an object has data that is either too large to be efficiently processed or comprises redundant data, a function $\vec{\pi}$ may map the object to a vector using a transformed reduced set of features (e.g., feature selection). In particular embodiments, a function $\vec{\pi}$ may map an object e to a vector $\vec{\pi}(e)$ based on one or more n-grams associated with object e. Although this disclosure describes representing an n-gram or an object in a vector space in a particular manner, this disclosure contemplates representing an n-gram or an object in a vector space in any suitable manner.

In particular embodiments, the social-networking system 160 may calculate a similarity metric of vectors in vector space 700. A similarity metric may be a cosine similarity, a Minkowski distance, a Mahalanobis distance, a Jaccard similarity coefficient, or any suitable similarity metric. As an example and not by way of limitation, a similarity metric of $\vec{v_1}$ and $\vec{v_2}$ may be a cosine similarity $$\frac{\vec{v_1} \cdot \vec{v_2}}{\|\vec{v_1}\| \|\vec{v_2}\|}.$$

As another example and not by way of limitation, a similarity metric of $\vec{v_1}$ and $\vec{v_2}$ may be a Euclidean distance $\vec{v_1} - \vec{v_2}$. A similarity metric of two vectors may represent how similar the two objects or n-grams corresponding to the two vectors, respectively, are to one another, as measured by the distance between the two vectors in the vector space 700. As an example and not by way of limitation, vector 710 and vector 720 may correspond to objects that are more similar to one another than the objects corresponding to vector 710 and vector 730, based on the distance between the respective vectors. Although this disclosure describes calculating a similarity metric between vectors in a particular manner, this disclosure contemplates calculating a similarity metric between vectors in any suitable manner.

More information on vector spaces, embeddings, feature vectors, and similarity metrics may be found in U.S. patent application Ser. No. 14/949,436, filed 23 Nov. 2015, U.S. patent application Ser. No. 15/286,315, filed 5 Oct. 2016, and U.S. patent application Ser. No. 15/365,789, filed 30 Nov. 2016, each of which is incorporated by reference.

Artificial Neural Networks

Figure 8:
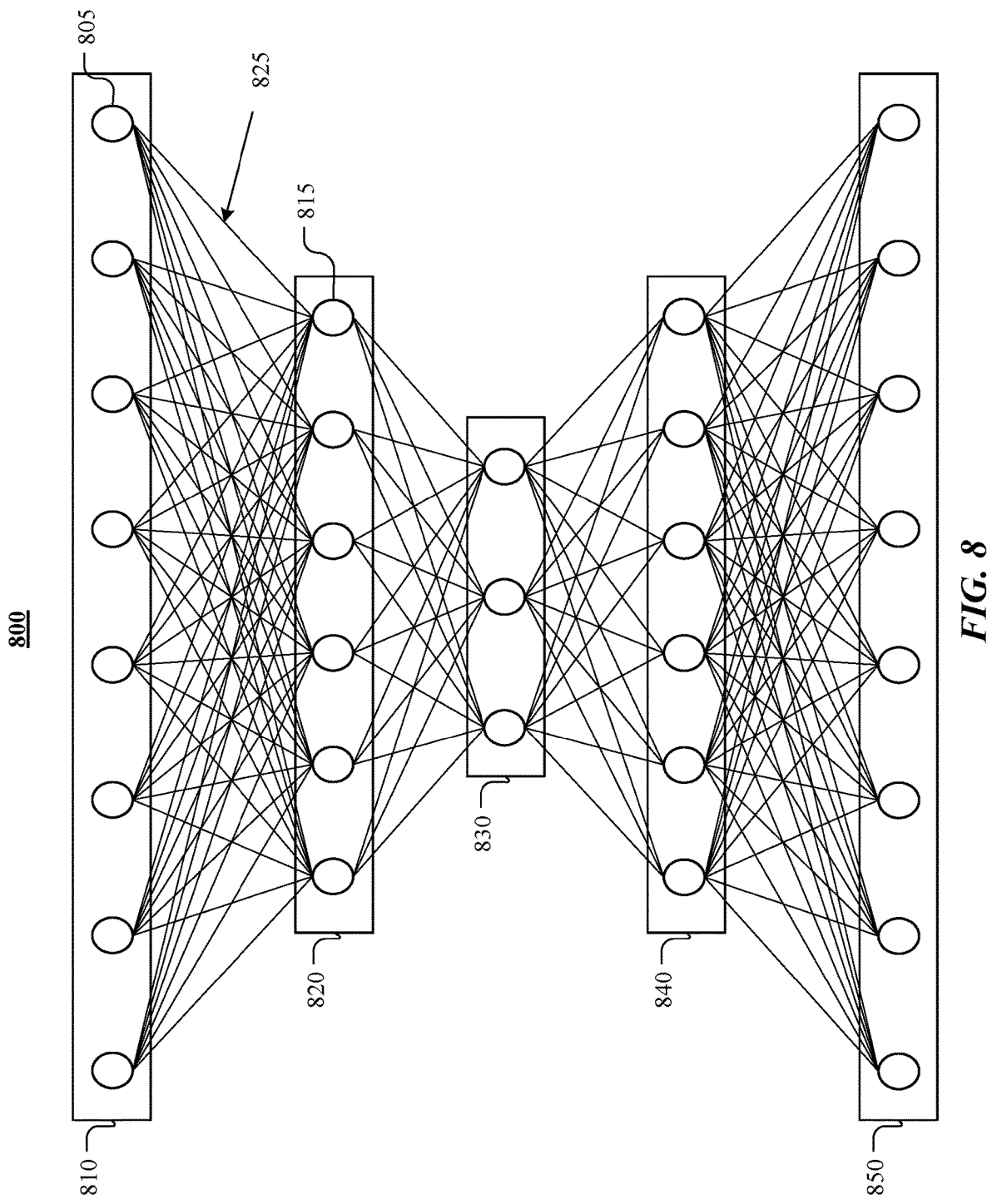
FIG. 8 illustrates an example artificial neural network.

FIG. 8 illustrates an example artificial neural network ("ANN") 800. In particular embodiments, an ANN may refer to a computational model comprising one or more nodes. Example ANN 800 may comprise an input layer 810, hidden layers 820, 830, 840, and an output layer 850. Each layer of the ANN 800 may comprise one or more nodes, such as a node 805 or a node 815. In particular embodiments, each node of an ANN may be connected to another node of the ANN. As an example and not by way of limitation, each node of the input layer 810 may be connected to one or more nodes of the hidden layer 820. In particular embodiments, one or more nodes may be a bias node (e.g., a node in a layer that is not connected to and does not receive input from any node in a previous layer). In particular embodiments, each node in each layer may be connected to one or more nodes of a previous or subsequent layer. Although FIG. 8 depicts a particular ANN with a particular number of layers, a particular number of nodes, and particular connections between nodes, this disclosure contemplates any suitable ANN with any suitable number of layers, any suitable number of nodes, and any suitable connections between nodes. As an example and not by way of limitation, although FIG. 8 depicts a connection between each node of the input layer 810 and each node of the hidden layer 820, one or more nodes of the input layer 810 may not be connected to one or more nodes of the hidden layer 820.

In particular embodiments, an ANN may be a feedforward ANN (e.g., an ANN with no cycles or loops where communication between nodes flows in one direction beginning with the input layer and proceeding to successive layers). As an example and not by way of limitation, the input to each node of the hidden layer 820 may comprise the output of one or more nodes of the input layer 810. As another example and not by way of limitation, the input to each node of the output layer 850 may comprise the output of one or more nodes of the hidden layer 840. In particular embodiments, an ANN may be a deep neural network (e.g., a neural network comprising at least two hidden layers). In particular embodiments, an ANN may be a deep residual network. A deep residual network may be a feedforward ANN comprising hidden layers organized into residual blocks. The input into each residual block after the first residual block may be a function of the output of the previous residual block and the input of the previous residual block. As an example and not by way of limitation, the input into residual block N may be F(x)+x, where F(x) may be the output of residual block N−1, x may be the input into residual block N−1. Although this disclosure describes a particular ANN, this disclosure contemplates any suitable ANN.

In particular embodiments, an activation function may correspond to each node of an ANN. An activation function of a node may define the output of a node for a given input. In particular embodiments, an input to a node may comprise a set of inputs. As an example and not by way of limitation, an activation function may be an identity function, a binary step function, a logistic function, or any other suitable function. As another example and not by way of limitation, an activation function for a node k may be the sigmoid function $$F_k(s_k) = \frac{1}{1+e^{-s_k}},$$

the hyperbolic tangent function $$F_k(s_k) = \frac{e^{s_k} - e^{-s_k}}{e^{s_k} + e^{-s_k}},$$

the rectifier $F_k(s_k)$=max (0, $s_k$), or any other suitable function $F_k(s_k)$, where $s_k$ may be the effective input to node k. In particular embodiments, the input of an activation function corresponding to a node may be weighted. Each node may generate output using a corresponding activation function based on weighted inputs. In particular embodiments, each connection between nodes may be associated with a weight. As an example and not by way of limitation, a connection 825 between the node 805 and the node 815 may have a weighting coefficient of 0.4, which may indicate that 0.4 multiplied by the output of the node 805 is used as an input to the node 815. As another example and not by way of limitation, the output $y_k$ of node k may be $y_k=F_k(s_k)$, where $F_k$ may be the activation function corresponding to node k, $s_k=\Sigma_j(w_{jk}x_j)$ may be the effective input to node k, $x_j$ may be the output of a node j connected to node k, and $w_{jk}$ may be the weighting coefficient between node j and node k. In particular embodiments, the input to nodes of the input layer may be based on a vector representing an object. Although this disclosure describes particular inputs to and outputs of nodes, this disclosure contemplates any suitable inputs to and outputs of nodes. Moreover, although this disclosure may describe particular connections and weights between nodes, this disclosure contemplates any suitable connections and weights between nodes.

In particular embodiments, an ANN may be trained using training data. As an example and not by way of limitation, training data may comprise inputs to the ANN 800 and an expected output. As another example and not by way of limitation, training data may comprise vectors each representing a training object and an expected label for each training object. In particular embodiments, training an ANN may comprise modifying the weights associated with the connections between nodes of the ANN by optimizing an objective function. As an example and not by way of limitation, a training method may be used (e.g., the conjugate gradient method, the gradient descent method, the stochastic gradient descent) to backpropagate the sum-of-squares error measured as a distances between each vector representing a training object (e.g., using a cost function that minimizes the sum-of-squares error). In particular embodiments, an ANN may be trained using a dropout technique. As an example and not by way of limitation, one or more nodes may be temporarily omitted (e.g., receive no input and generate no output) while training. For each training object, one or more nodes of the ANN may have some probability of being omitted. The nodes that are omitted for a particular training object may be different than the nodes omitted for other training objects (e.g., the nodes may be temporarily omitted on an object-by-object basis). Although this disclosure describes training an ANN in a particular manner, this disclosure contemplates training an ANN in any suitable manner.

Privacy

In particular embodiments, one or more objects (e.g., content or other types of objects) of a computing system may be associated with one or more privacy settings. The one or more objects may be stored on or otherwise associated with any suitable computing system or application, such as, for example, a social-networking system 160, a client system 130, an assistant system 140, a third-party system 170, a social-networking application, an assistant application, a messaging application, a photo-sharing application, or any other suitable computing system or application. Although the examples discussed herein are in the context of an online social network, these privacy settings may be applied to any other suitable computing system. Privacy settings (or "access settings") for an object may be stored in any suitable manner, such as, for example, in association with the object, in an index on an authorization server, in another suitable manner, or any suitable combination thereof. A privacy setting for an object may specify how the object (or particular information associated with the object) can be accessed, stored, or otherwise used (e.g., viewed, shared, modified, copied, executed, surfaced, or identified) within the online social network. When privacy settings for an object allow a particular user or other entity to access that object, the object may be described as being "visible" with respect to that user or other entity. As an example and not by way of limitation, a user of the online social network may specify privacy settings for a user-profile page that identify a set of users that may access work-experience information on the user-profile page, thus excluding other users from accessing that information.

In particular embodiments, privacy settings for an object may specify a "blocked list" of users or other entities that should not be allowed to access certain information associated with the object. In particular embodiments, the blocked list may include third-party entities. The blocked list may specify one or more users or entities for which an object is not visible. As an example and not by way of limitation, a user may specify a set of users who may not access photo albums associated with the user, thus excluding those users from accessing the photo albums (while also possibly allowing certain users not within the specified set of users to access the photo albums). In particular embodiments, privacy settings may be associated with particular social-graph elements. Privacy settings of a social-graph element, such as a node or an edge, may specify how the social-graph element, information associated with the social-graph element, or objects associated with the social-graph element can be accessed using the online social network. As an example and not by way of limitation, a particular photo may have a privacy setting specifying that the photo may be accessed only by users tagged in the photo and friends of the users tagged in the photo. In particular embodiments, privacy settings may allow users to opt in to or opt out of having their content, information, or actions stored/logged by the social-networking system 160 or assistant system 140 or shared with other systems (e.g., a third-party system 170). Although this disclosure describes using particular privacy settings in a particular manner, this disclosure contemplates using any suitable privacy settings in any suitable manner.

In particular embodiments, the social-networking system 160 may present a "privacy wizard" (e.g., within a webpage, a module, one or more dialog boxes, or any other suitable interface) to the first user to assist the first user in specifying one or more privacy settings. The privacy wizard may display instructions, suitable privacy-related information, current privacy settings, one or more input fields for accepting one or more inputs from the first user specifying a change or confirmation of privacy settings, or any suitable combination thereof. In particular embodiments, the social-networking system 160 may offer a "dashboard" functionality to the first user that may display, to the first user, current privacy settings of the first user. The dashboard functionality may be displayed to the first user at any appropriate time (e.g., following an input from the first user summoning the dashboard functionality, following the occurrence of a particular event or trigger action). The dashboard functionality may allow the first user to modify one or more of the first user's current privacy settings at any time, in any suitable manner (e.g., redirecting the first user to the privacy wizard).

Privacy settings associated with an object may specify any suitable granularity of permitted access or denial of access. As an example and not by way of limitation, access or denial of access may be specified for particular users (e.g., only me, my roommates, my boss), users within a particular degree-of-separation (e.g., friends, friends-of-friends), user groups (e.g., the gaming club, my family), user networks (e.g., employees of particular employers, students or alumni of particular university), all users ("public"), no users ("private"), users of third-party systems 170, particular applications (e.g., third-party applications, external websites), other suitable entities, or any suitable combination thereof. Although this disclosure describes particular granularities of permitted access or denial of access, this disclosure contemplates any suitable granularities of permitted access or denial of access.

In particular embodiments, one or more servers 162 may be authorization/privacy servers for enforcing privacy settings. In response to a request from a user (or other entity) for a particular object stored in a data store 164, the social-networking system 160 may send a request to the data store 164 for the object. The request may identify the user associated with the request and the object may be sent only to the user (or a client system 130 of the user) if the authorization server determines that the user is authorized to access the object based on the privacy settings associated with the object. If the requesting user is not authorized to access the object, the authorization server may prevent the requested object from being retrieved from the data store 164 or may prevent the requested object from being sent to the user. In the search-query context, an object may be provided as a search result only if the querying user is authorized to access the object, e.g., if the privacy settings for the object allow it to be surfaced to, discovered by, or otherwise visible to the querying user. In particular embodiments, an object may represent content that is visible to a user through a newsfeed of the user. As an example and not by way of limitation, one or more objects may be visible to a user's "Trending" page. In particular embodiments, an object may correspond to a particular user. The object may be content associated with the particular user, or may be the particular user's account or information stored on the social-networking system 160, or other computing system. As an example and not by way of limitation, a first user may view one or more second users of an online social network through a "People You May Know" function of the online social network, or by viewing a list of friends of the first user. As an example and not by way of limitation, a first user may specify that they do not wish to see objects associated with a particular second user in their newsfeed or friends list. If the privacy settings for the object do not allow it to be surfaced to, discovered by, or visible to the user, the object may be excluded from the search results. Although this disclosure describes enforcing privacy settings in a particular manner, this disclosure contemplates enforcing privacy settings in any suitable manner.

In particular embodiments, different objects of the same type associated with a user may have different privacy settings. Different types of objects associated with a user may have different types of privacy settings. As an example and not by way of limitation, a first user may specify that the first user's status updates are public, but any images shared by the first user are visible only to the first user's friends on the online social network. As another example and not by way of limitation, a user may specify different privacy settings for different types of entities, such as individual users, friends-of-friends, followers, user groups, or corporate entities. As another example and not by way of limitation, a first user may specify a group of users that may view videos posted by the first user, while keeping the videos from being visible to the first user's employer. In particular embodiments, different privacy settings may be provided for different user groups or user demographics. As an example and not by way of limitation, a first user may specify that other users who attend the same university as the first user may view the first user's pictures, but that other users who are family members of the first user may not view those same pictures.

In particular embodiments, the social-networking system 160 may provide one or more default privacy settings for each object of a particular object-type. A privacy setting for an object that is set to a default may be changed by a user associated with that object. As an example and not by way of limitation, all images posted by a first user may have a default privacy setting of being visible only to friends of the first user and, for a particular image, the first user may change the privacy setting for the image to be visible to friends and friends-of-friends.

In particular embodiments, privacy settings may allow a first user to specify (e.g., by opting out, by not opting in) whether the social-networking system 160 or assistant system 140 may receive, collect, log, or store particular objects or information associated with the user for any purpose. In particular embodiments, privacy settings may allow the first user to specify whether particular applications or processes may access, store, or use particular objects or information associated with the user. The privacy settings may allow the first user to opt in or opt out of having objects or information accessed, stored, or used by specific applications or processes. The social-networking system 160 or assistant system 140 may access such information in order to provide a particular function or service to the first user, without the social-networking system 160 or assistant system 140 having access to that information for any other purposes. Before accessing, storing, or using such objects or information, the social-networking system 160 or assistant system 140 may prompt the user to provide privacy settings specifying which applications or processes, if any, may access, store, or use the object or information prior to allowing any such action. As an example and not by way of limitation, a first user may transmit a message to a second user via an application related to the online social network (e.g., a messaging app), and may specify privacy settings that such messages should not be stored by the social-networking system 160 or assistant system 140.

In particular embodiments, a user may specify whether particular types of objects or information associated with the first user may be accessed, stored, or used by the social-networking system 160 or assistant system 140. As an example and not by way of limitation, the first user may specify that images sent by the first user through the social-networking system 160 or assistant system 140 may not be stored by the social-networking system 160 or assistant system 140. As another example and not by way of limitation, a first user may specify that messages sent from the first user to a particular second user may not be stored by the social-networking system 160 or assistant system 140. As yet another example and not by way of limitation, a first user may specify that all objects sent via a particular application may be saved by the social-networking system 160 or assistant system 140.

In particular embodiments, privacy settings may allow a first user to specify whether particular objects or information associated with the first user may be accessed from particular client systems 130 or third-party systems 170. The privacy settings may allow the first user to opt in or opt out of having objects or information accessed from a particular device (e.g., the phone book on a user's smart phone), from a particular application (e.g., a messaging app), or from a particular system (e.g., an email server). The social-networking system 160 or assistant system 140 may provide default privacy settings with respect to each device, system, or application, and/or the first user may be prompted to specify a particular privacy setting for each context. As an example and not by way of limitation, the first user may utilize a location-services feature of the social-networking system 160 or assistant system 140 to provide recommendations for restaurants or other places in proximity to the user. The first user's default privacy settings may specify that the social-networking system 160 or assistant system 140 may use location information provided from a client system 130 of the first user to provide the location-based services, but that the social-networking system 160 or assistant system 140 may not store the location information of the first user or provide it to any third-party system 170. The first user may then update the privacy settings to allow location information to be used by a third-party image-sharing application in order to geo-tag photos.

In particular embodiments, privacy settings may allow a user to specify one or more geographic locations from which objects can be accessed. Access or denial of access to the objects may depend on the geographic location of a user who is attempting to access the objects. As an example and not by way of limitation, a user may share an object and specify that only users in the same city may access or view the object. As another example and not by way of limitation, a first user may share an object and specify that the object is visible to second users only while the first user is in a particular location. If the first user leaves the particular location, the object may no longer be visible to the second users. As another example and not by way of limitation, a first user may specify that an object is visible only to second users within a threshold distance from the first user. If the first user subsequently changes location, the original second users with access to the object may lose access, while a new group of second users may gain access as they come within the threshold distance of the first user.

In particular embodiments, the social-networking system 160 or assistant system 140 may have functionalities that may use, as inputs, personal or biometric information of a user for user-authentication or experience-personalization purposes. A user may opt to make use of these functionalities to enhance their experience on the online social network. As an example and not by way of limitation, a user may provide personal or biometric information to the social-networking system 160 or assistant system 140. The user's privacy settings may specify that such information may be used only for particular processes, such as authentication, and further specify that such information may not be shared with any third-party system 170 or used for other processes or applications associated with the social-networking system 160 or assistant system 140. As another example and not by way of limitation, the social-networking system 160 may provide a functionality for a user to provide voice-print recordings to the online social network. As an example and not by way of limitation, if a user wishes to utilize this function of the online social network, the user may provide a voice recording of his or her own voice to provide a status update on the online social network. The recording of the voice-input may be compared to a voice print of the user to determine what words were spoken by the user. The user's privacy setting may specify that such voice recording may be used only for voice-input purposes (e.g., to authenticate the user, to send voice messages, to improve voice recognition in order to use voice-operated features of the online social network), and further specify that such voice recording may not be shared with any third-party system 170 or used by other processes or applications associated with the social-networking system 160. As another example and not by way of limitation, the social-networking system 160 may provide a functionality for a user to provide a reference image (e.g., a facial profile, a retinal scan) to the online social network. The online social network may compare the reference image against a later-received image input (e.g., to authenticate the user, to tag the user in photos). The user's privacy setting may specify that such image may be used only for a limited purpose (e.g., authentication, tagging the user in photos), and further specify that such image may not be shared with any third-party system 170 or used by other processes or applications associated with the social-networking system 160.

Systems and Methods

Figure 9:
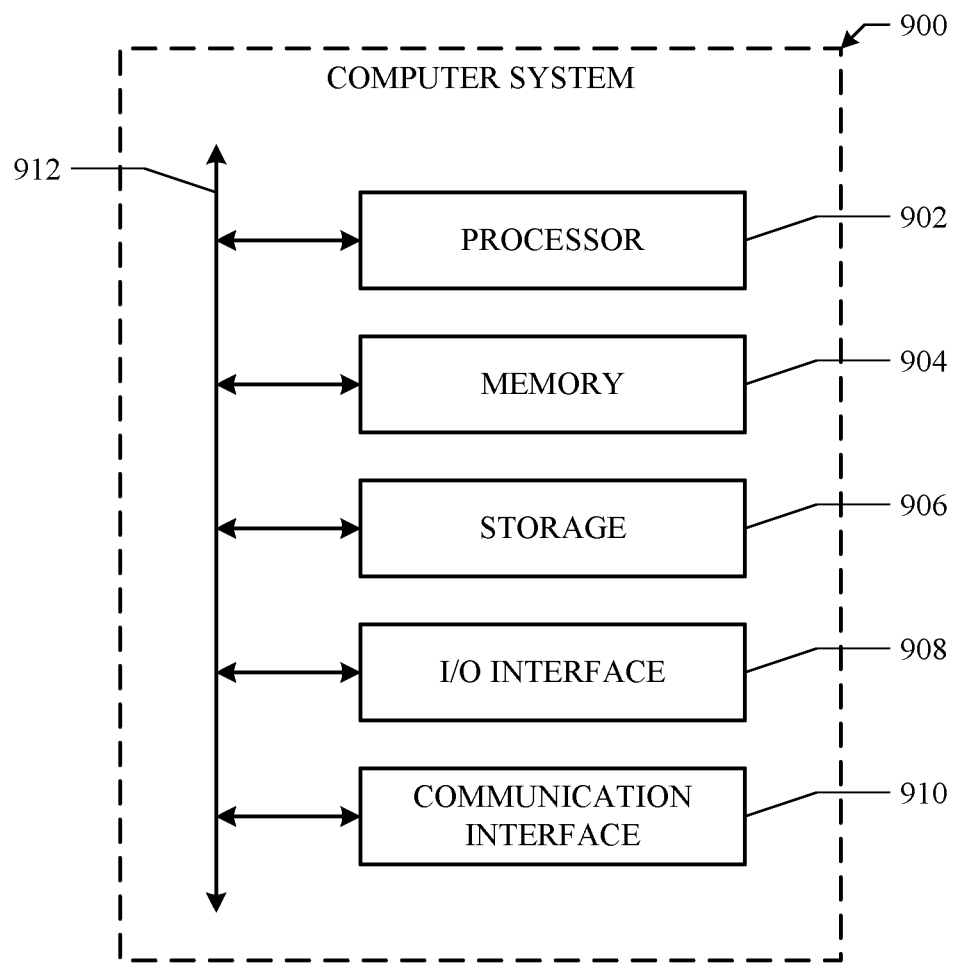
FIG. 9 illustrates an example computer system.

FIG. 9 illustrates an example computer system 900. In particular embodiments, one or more computer systems 900 perform one or more steps of one or more methods described or illustrated herein. In particular embodiments, one or more computer systems 900 provide functionality described or illustrated herein. In particular embodiments, software running on one or more computer systems 900 performs one or more steps of one or more methods described or illustrated herein or provides functionality described or illustrated herein. Particular embodiments include one or more portions of one or more computer systems 900. Herein, reference to a computer system may encompass a computing device, and vice versa, where appropriate. Moreover, reference to a computer system may encompass one or more computer systems, where appropriate.

This disclosure contemplates any suitable number of computer systems 900. This disclosure contemplates computer system 900 taking any suitable physical form. As example and not by way of limitation, computer system 900 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 900 may include one or more computer systems 900; be unitary or distributed; span multiple locations; span multiple machines; span multiple data centers; or reside in a cloud, which may include one or more cloud components in one or more networks. Where appropriate, one or more computer systems 900 may perform without substantial spatial or temporal limitation one or more steps of one or more methods described or illustrated herein. As an example and not by way of limitation, one or more computer systems 900 may perform in real time or in batch mode one or more steps of one or more methods described or illustrated herein. One or more computer systems 900 may perform at different times or at different locations one or more steps of one or more methods described or illustrated herein, where appropriate.

In particular embodiments, computer system 900 includes a processor 902, memory 904, storage 906, an input/output (I/O) interface 908, a communication interface 910, and a bus 912. Although this disclosure describes and illustrates a particular computer system having a particular number of particular components in a particular arrangement, this disclosure contemplates any suitable computer system having any suitable number of any suitable components in any suitable arrangement.

In particular embodiments, processor 902 includes hardware for executing instructions, such as those making up a computer program. As an example and not by way of limitation, to execute instructions, processor 902 may retrieve (or fetch) the instructions from an internal register, an internal cache, memory 904, or storage 906; decode and execute them; and then write one or more results to an internal register, an internal cache, memory 904, or storage 906. In particular embodiments, processor 902 may include one or more internal caches for data, instructions, or addresses. This disclosure contemplates processor 902 including any suitable number of any suitable internal caches, where appropriate. As an example and not by way of limitation, processor 902 may include one or more instruction caches, one or more data caches, and one or more translation lookaside buffers (TLBs). Instructions in the instruction caches may be copies of instructions in memory 904 or storage 906, and the instruction caches may speed up retrieval of those instructions by processor 902. Data in the data caches may be copies of data in memory 904 or storage 906 for instructions executing at processor 902 to operate on; the results of previous instructions executed at processor 902 for access by subsequent instructions executing at processor 902 or for writing to memory 904 or storage 906; or other suitable data. The data caches may speed up read or write operations by processor 902. The TLBs may speed up virtual-address translation for processor 902. In particular embodiments, processor 902 may include one or more internal registers for data, instructions, or addresses. This disclosure contemplates processor 902 including any suitable number of any suitable internal registers, where appropriate. Where appropriate, processor 902 may include one or more arithmetic logic units (ALUs); be a multi-core processor; or include one or more processors 902. Although this disclosure describes and illustrates a particular processor, this disclosure contemplates any suitable processor.

In particular embodiments, memory 904 includes main memory for storing instructions for processor 902 to execute or data for processor 902 to operate on. As an example and not by way of limitation, computer system 900 may load instructions from storage 906 or another source (such as, for example, another computer system 900) to memory 904. Processor 902 may then load the instructions from memory 904 to an internal register or internal cache. To execute the instructions, processor 902 may retrieve the instructions from the internal register or internal cache and decode them. During or after execution of the instructions, processor 902 may write one or more results (which may be intermediate or final results) to the internal register or internal cache. Processor 902 may then write one or more of those results to memory 904. In particular embodiments, processor 902 executes only instructions in one or more internal registers or internal caches or in memory 904 (as opposed to storage 906 or elsewhere) and operates only on data in one or more internal registers or internal caches or in memory 904 (as opposed to storage 906 or elsewhere). One or more memory buses (which may each include an address bus and a data bus) may couple processor 902 to memory 904. Bus 912 may include one or more memory buses, as described below. In particular embodiments, one or more memory management units (MMUs) reside between processor 902 and memory 904 and facilitate accesses to memory 904 requested by processor 902. In particular embodiments, memory 904 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 904 may include one or more memories 904, where appropriate. Although this disclosure describes and illustrates particular memory, this disclosure contemplates any suitable memory.

In particular embodiments, storage 906 includes mass storage for data or instructions. As an example and not by way of limitation, storage 906 may include a hard disk drive (HDD), a floppy disk drive, flash memory, an optical disc, a magneto-optical disc, magnetic tape, or a Universal Serial Bus (USB) drive or a combination of two or more of these. Storage 906 may include removable or non-removable (or fixed) media, where appropriate. Storage 906 may be internal or external to computer system 900, where appropriate. In particular embodiments, storage 906 is non-volatile, solid-state memory. In particular embodiments, storage 906 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 906 taking any suitable physical form. Storage 906 may include one or more storage control units facilitating communication between processor 902 and storage 906, where appropriate. Where appropriate, storage 906 may include one or more storages 906. Although this disclosure describes and illustrates particular storage, this disclosure contemplates any suitable storage.

In particular embodiments, I/O interface 908 includes hardware, software, or both, providing one or more interfaces for communication between computer system 900 and one or more I/O devices. Computer system 900 may include one or more of these I/O devices, where appropriate. One or more of these I/O devices may enable communication between a person and computer system 900. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 908 for them. Where appropriate, I/O interface 908 may include one or more device or software drivers enabling processor 902 to drive one or more of these I/O devices. I/O interface 908 may include one or more I/O interfaces 908, where appropriate. Although this disclosure describes and illustrates a particular I/O interface, this disclosure contemplates any suitable I/O interface.

In particular embodiments, communication interface 910 includes hardware, software, or both providing one or more interfaces for communication (such as, for example, packet-based communication) between computer system 900 and one or more other computer systems 900 or one or more networks. As an example and not by way of limitation, communication interface 910 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 910 for it. As an example and not by way of limitation, computer system 900 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 900 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 900 may include any suitable communication interface 910 for any of these networks, where appropriate. Communication interface 910 may include one or more communication interfaces 910, where appropriate. Although this disclosure describes and illustrates a particular communication interface, this disclosure contemplates any suitable communication interface.

In particular embodiments, bus 912 includes hardware, software, or both coupling components of computer system 900 to each other. As an example and not by way of limitation, bus 912 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 912 may include one or more buses 912, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Miscellaneous

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by one or more computing systems:
   receiving a user request to automatically debug a natural-language understanding (NLU) model;
   accessing a plurality of predicted semantic representations generated by the NLU model, wherein the plurality of predicted semantic representations are associated with a plurality of dialog sessions, respectively, wherein each dialog session is between a user from a plurality of users and an assistant xbot associated with the NLU model;
   generating, based on an auto-correction model, a plurality of expected semantic representations associated with the plurality of dialog sessions, wherein the auto-correction model is learned from a plurality of dialog training samples generated based on active learning;
   identifying, based on a comparison between the predicted semantic representations and the expected semantic representations, one or more incorrect semantic representations of the predicted semantic representations; and
   automatically correcting the one or more incorrect semantic representations by replacing them with one or more respective expected semantic representations generated by the auto-correction model.

2. The method of claim 1, further comprising:
   updating the NLU model based on the plurality of expected semantic representations.

3. The method of claim 1, further comprising:
   sending, to a client system, instructions for presenting a user interface comprising one or more of the plurality of predicted semantic representations, one or more of the plurality of expected semantic representations, or one or more of the incorrect semantic representations.

4. The method of claim 1, wherein the active learning used to generate the plurality of dialog training samples is based on one or more of random selection, model uncertainty, annotation ambiguity, optimization metric, diversity score, or user satisfaction.

5. The method of claim 1, wherein each dialog training sample of the plurality of dialog training samples comprises a user input and a correct semantic representation associated with the user input.

6. The method of claim 1, wherein each of the one or more incorrect semantic representations and its respective expected semantic representation are associated with a same dialog session.

7. The method of claim 1, further comprising:
   determining, for each of the one or more incorrect semantic representations, a failure reason used for identifying the predicted semantic representation corresponding to the incorrect semantic representation as being incorrect.

8. The method of claim 7, wherein the failure reason for the incorrect semantic representation comprises one or more of a mismatch between the predicted semantic representation and a semantic representation determined based on one or more rule-based classifiers, a mislabel of an intent or a slot of the predicted semantic representation, or an insufficient amount of training data associated with the predicted semantic representation.

9. The method of claim 1, further comprising:
   generating the plurality of dialog training samples, wherein the generation comprises:
   accessing a plurality of live user-assistant dialog samples;
   grading the plurality of live user-assistant dialog samples;
   selecting, based on the active learning, a set of live user-assistant dialog samples for annotation; and
   annotating semantic representations for the selected set of live user-assistant dialog samples.

10. The method of claim 9, wherein the generation further comprises:
dividing the plurality of live user-assistant dialog samples based on one or more of a language associated with each live user-assistant dialog sample, a client system associated with each live user-assistant dialog sample, or a clustering algorithm.

11. The method of claim 9, wherein grading the plurality of live user-assistant dialog samples is based on task completion associated with each of the plurality of live user-assistant dialog samples.

12. The method of claim 9, wherein selecting the set of live user-assistant dialog samples for annotation is further based on grades of the plurality of live user-assistant dialog samples.

13. The method of claim 9, further comprising:
generating a quality report based the selected set of live user-assistant dialog samples and their annotations, wherein the quality report comprises one or more of an accuracy of a semantic representation associated with a head use case or an accuracy of a semantic representation associated with a tail use case.

14. The method of claim 13, further comprising:
identifying one or more failure cases from the selected set of live user-assistant dialog samples;
extracting one or more templates from the one or more failure cases; and
generating a plurality of synthetic dialog samples based on the one or more templates.

15. The method of claim 14, wherein the plurality of dialog training samples comprise the selected set of live user-assistant dialog samples and the plurality of synthetic dialog samples.

16. The method of claim 14, further comprising:
generating one or more rule-based classifiers.

17. The method of claim 1, wherein each of the predicted semantic representations or each of the expected semantic representations comprises one or more of an intent represented by a structural format or a slot represented by a structural format.

18. One or more computer-readable non-transitory storage media embodying software that is operable when executed to:
receive a user request to automatically debug a natural-language understanding (NLU) model;
access a plurality of predicted semantic representations generated by the NLU model, wherein the plurality of predicted semantic representations are associated with a plurality of dialog sessions, respectively, wherein each dialog session is between a user from a plurality of users and an assistant xbot associated with the NLU model;
generate, based on an auto-correction model, a plurality of expected semantic representations associated with the plurality of dialog sessions, wherein the auto-correction model is learned from a plurality of dialog training samples generated based on active learning;
identify, based on a comparison between the predicted semantic representations and the expected semantic representations, one or more incorrect semantic representations of the predicted semantic representations; and
automatically correct the one or more incorrect semantic representations by replacing them with one or more respective expected semantic representations generated by the auto-correction model.

19. A system comprising: one or more processors; and a non-transitory memory coupled to the processors comprising instructions executable by the processors, the processors operable when executing the instructions to:
receive a user request to automatically debug a natural-language understanding (NLU) model;
access a plurality of predicted semantic representations generated by the NLU model, wherein the plurality of predicted semantic representations are associated with a plurality of dialog sessions, respectively, wherein each dialog session is between a user from a plurality of users and an assistant xbot associated with the NLU model;
generate, based on an auto-correction model, a plurality of expected semantic representations associated with the plurality of dialog sessions, wherein the auto-correction model is learned from a plurality of dialog training samples generated based on active learning;
identify, based on a comparison between the predicted semantic representations and the expected semantic representations, one or more incorrect semantic representations of the predicted semantic representations; and
automatically correct the one or more incorrect semantic representations by replacing them with one or more respective expected semantic representations generated by the auto-correction model.

* * * * *